(12) United States Patent
Kobayashi

(10) Patent No.: US 8,503,294 B2
(45) Date of Patent: Aug. 6, 2013

(54) TRANSPORT LAYER RELAY METHOD, TRANSPORT LAYER RELAY DEVICE, AND PROGRAM

(75) Inventor: Masayoshi Kobayashi, Minato-ku (JP)

(73) Assignee: NEC Corporation, Tokyo (JP)

(*) Notice: Subject to any disclaimer, the term of this patent is extended or adjusted under 35 U.S.C. 154(b) by 980 days.

(21) Appl. No.: 10/563,879

(22) PCT Filed: Jul. 7, 2004

(86) PCT No.: PCT/JP2004/009659
§ 371 (c)(1),
(2), (4) Date: Jan. 9, 2006

(87) PCT Pub. No.: WO2005/006664
PCT Pub. Date: Jan. 20, 2005

(65) Prior Publication Data
US 2007/0008883 A1    Jan. 11, 2007

(30) Foreign Application Priority Data
Jul. 11, 2003   (JP) ................................ 2003-273691

(51) Int. Cl.
*G01R 31/08*    (2006.01)
(52) U.S. Cl.
USPC ........................................................ 370/229
(58) Field of Classification Search
USPC ......................................... 370/229, 230, 231
See application file for complete search history.

(56) References Cited

U.S. PATENT DOCUMENTS

| | | | | |
|---|---|---|---|---|
| 6,097,697 A * | 8/2000 | Yao et al. | ....................... | 370/230 |
| 6,226,296 B1 * | 5/2001 | Lindsey et al. | ............... | 370/401 |
| 6,430,157 B1 * | 8/2002 | Uriu et al. | .................. | 370/236.1 |
| 6,760,309 B1 * | 7/2004 | Rochberger et al. | .......... | 370/235 |
| 7,133,407 B2 * | 11/2006 | Jinzaki et al. | ................. | 370/537 |
| 7,136,353 B2 * | 11/2006 | Ha et al. | ....................... | 370/230 |
| 2002/0071387 A1 * | 6/2002 | Horiguchi et al. | ............ | 370/229 |
| 2002/0093980 A1 * | 7/2002 | Trebes, Jr. | ..................... | 370/466 |

FOREIGN PATENT DOCUMENTS

| | | |
|---|---|---|
| JP | 2000-156706 A | 6/2000 |
| JP | 2001-244957 A | 9/2001 |
| JP | 2001-244968 A | 9/2001 |

(Continued)

OTHER PUBLICATIONS

Arata Koike, "Performance Evaluation for TCP Flow Control and ABR Rate Control Interworking", Technical Report IEICE, Mar. 20, 1998, pp. 121-126, vol. 97 No. 62, Institute of Electronics Information and Communication Engineers, Japan.

(Continued)

*Primary Examiner* — Mark Rinehart
*Assistant Examiner* — Mohammad Anwar
(74) *Attorney, Agent, or Firm* — Sughrue Mion, PLLC

(57) ABSTRACT

Relay units (1002-1-1002-*n*) terminate a plurality of transport layer connections from terminals in a transport layer and relay each of these connections to other transport layer connections (relay connections). A transmission rate control unit (1003) determines the total transmission rate of the relay connections according to the number of connections that are being relayed and network congestion conditions such that a desired effective rate is obtained, and moreover, allots the total transmission rate as transmission rates to each of relay units (1002-1-1002-*n*) in accordance with the results of the analysis of information of the applications being carried on the transport layer connections during relay.

34 Claims, 30 Drawing Sheets

Configuration of a transport layer relay device according to the first embodiment

FOREIGN PATENT DOCUMENTS

| JP | 2002-185488 A | 6/2002 |
|---|---|---|
| JP | 2002-237841 A | 8/2002 |
| JP | 2003-8611 A | 1/2003 |
| JP | 2003-125022 A | 4/2003 |
| JP | 2003-198611 A | 7/2003 |

OTHER PUBLICATIONS

Totomu Murase et al., "TCP Overlay Network Architecture", Proceedings of the 2002 Communications Society Conference of IEICE: Traffic Engineering in IP-based Network, Sep. 10-13, 2002, p. 209, Institute of Electronics Information and Communication Engineers, Japan.

Masayoshi Kobayashi et al., "Throughput guarantee method using TCP overlay networks", Proceedings of the 2003 IEICE Communications Society Conference: Network Control, Operation & Management, Sep. 23-26, 2003, p. 187, Institute of Electronics Information and Communications Engineers, Japan.

Masayoshi Kobayashi et al., "Transport layer control for thoughtput guarantee in TCP overlay networks" IEICE Technical Report, Sep. 18, 2003, pp. 23-28, vol. 103 No. 311, Institute of Electronics Information and Communication Engineers, Japan.

* cited by examiner

Network configuration that uses the transport layer relay device of the first embodiment Operation explaining timing chart of the first embodiment Flow chart of the operations of the transmission rate control unit of the first embodiment Configuration of a transport layer relay device according to the second embodiment Network configuration that uses the transport layer relay device of the second embodiment Flow chart of the operations of the transmission rate control unit of the second embodiment Configuration of a transport layer relay device according to the third embodiment Operation explaining timing chart of the third embodiment Flow chart of the operations of the transmission rate control unit of the third embodiment Configuration of a transport layer relay device according to the fourth embodiment Flow chart of the operations of the transmission rate control unit of the fourth embodiment Operation explaining timing chart of the fifth embodiment Flow chart of the operations of the transmission rate control unit of the fifth embodiment Configuration of a transport layer relay device according to the sixth embodiment Network configuration that uses the transport layer relay device of the sixth embodiment Flow chart of the operations of the transmission rate control unit of the sixth embodiment Configuration of a transport layer relay device according to the seventh embodiment Operation explaining timing chart of the seventh embodiment Flow chart of the operations of the transmission rate control unit of the seventh embodiment Flow chart of the operations of the transmission rate control unit of the eighth embodiment Configuration of a transport layer relay device according to the ninth embodiment Configuration of a transport layer relay device according to the tenth embodiment

TRANSPORT LAYER RELAY METHOD, TRANSPORT LAYER RELAY DEVICE, AND PROGRAM

TECHNICAL FIELD

The present invention relates to a communication system realized by means of packet switching, and more particularly to a technology for relaying connections of a protocol layer having a congestion control capability.

BACKGROUND ART

In the network protocol of an OSI reference model, the functions of a data communication network are broadly divided into a hierarchy of seven layers, these layers being, in order from the lowest, the physical layer, the data link layer, the network layer, the transport layer, the session layer, the presentation layer, and the application layer. In a packet network, when applications on terminals communicate data that extend over a plurality of packets, a virtual connection is extended between applications and the application data are sent over this connection. Such a connection is typically established using a protocol that is a higher layer than transport. In addition, among the protocols of the layer in which the connection is extended, there exists a protocol having the capability to implement both flow control for controlling the rate on the transmission side such that the capabilities of the reception process on the receiving side are not exceeded, and congestion control for controlling the rate on the transmission side such that congestion does not occur in the intervening network (the two capabilities together being referred to as "rate control"). In addition, rate control often involves the return of feedback information from the receiving side to the transmitting side (information regarding the sequence numbers of data that have been received correctly or the remaining space in the reception buffer on the receiving side) to implement feedback control for controlling the transmission rate on the transmitting side. Typically, this congestion control capability is realized in the transport layer, and in the following explanation, connections that are extended between transmitting and receiving applications by protocol that relates to the above-described congestion control are therefore referred to as transport layer connections. TCP (also referred to as "Transmission Control Protocol" and "Transport Control Protocol") that is now widely used on the Internet is also a transport layer protocol and has a congestion control capability.

The congestion control capability of transport layer protocol realizes rate control for individual connections independent of each other as described below. When a plurality of transport layer connections exist simultaneously on a particular link and compete for the bandwidth of the link, the components that realize processing of the transport layer protocol that includes the transmission-side congestion control of these connections (referred to as "transport layer connection termination units") implement rate control separately for each connection. In TPC, packet loss or increase in delay is detected based on ACK packets from the reception terminal, whereby control is implemented such that the link bandwidth is used completely by all connections, and moreover, such that the bandwidth that the connections compete for is allotted substantially equally among the connections. It was therefore not possible to realize efficient communication in which high bandwidth is allotted to specific connections or in which bandwidth is circulated among connections. In addition, the congestion control capability of the transport layer realizes transmission at an appropriate rate by learning the state of congestion of the network after establishing a connection. As a result, communication efficiency was poor immediately after the establishment of a connection.

Techniques for dealing with these problems include the following examples of the prior art.

The first example of the prior art is a method realized by packet scheduling of routers in which packets that pertain to a specific connection are identified and priorities established among connections by, for example, allotting higher bandwidths to specific flows.

The second example of the prior art is a method referred to as a "Congestion Manager." According to this method, for a plurality of transport layer connections that are extended between a particular set of terminals (for example terminal A and terminal B), instead of implementing separate congestion control for the transmission rates of each of these connections, the overall transmission rate is taken as a rate that is obtained by congestion control that is the same as for one TCP, and this one transmission bandwidth is then allotted to each of the connections.

The third example of the prior art is a method in which the TCP of a plurality of terminals is first terminated, multiplexed as one TCP and transmitted, and then again separated into the original TCP close to the receiving terminal and relayed (As an example, refer to JP-A 2002-185488).

As the first problem of the methods of the prior art, in the first example of the prior art, the control of priority in packet scheduling and the control of fixed bandwidth allotment must be carried out in all routers on the communication path of transceiving terminals, and as a consequence, the need arises for the replacement of a multiplicity of routers, and this results in the cost of a multiplicity of devices and the inconvenience entailed for replacing the devices.

As the second problem of the prior art, in the second and third examples of the prior art, control of the throughput of all connections being observed is realized by using the congestion control of one already existing TCP, and as a result, the effective rate of all traffic that is being observed (the throughput of data that actually arrive at the receiving side) could not be set to a particular desired value, and priorities could not be established with respect to traffic other than the traffic that is being observed.

As the third problem of the prior art, in the second example of the prior art, although harmony can be obtained in the congestion control for a plurality of transport layer connections that are extended between the same set of terminals, harmony of the congestion control could not be achieved for transport layer connections that are extended between different sets of terminals.

As the fourth problem of the prior art, in the third example of the prior art, the initial transmission rate of a terminal is the TCP slow start, and considerable time is required for the rate to reach a suitable value.

DISCLOSURE OF THE INVENTION

The first object of the present invention is to secure a desired effective rate for a particular set of transport layer connections between a plurality of terminals and to redistribute this bandwidth within this set of connections at low cost.

The second object of the present invention is to, for a particular set of transport layer connections between a plurality of terminals, secure an effective rate that confers priorities to other transport layer connections, and to redistribute bandwidth among this set of connections at a low cost.

The third object of the present invention is to, for a particular set of transport layer connections between a plurality of terminals, redistribute a particular effective rate among this set of connections depending on information of the application that flows over these connections.

The fourth object of the present invention is to, for a particular set of transport layer connections between a plurality of terminals, secure a desired effective rate at low cost and moreover, with high accuracy.

The fifth object of the present invention is to, for a particular set of transport layer connections between a plurality of terminals, secure an effective rate that confers priorities to other transport layer connections with high accuracy.

The sixth object of the present invention is to transmit an initial transmission rate to terminals to improve the efficiency of congestion control of the terminals.

To achieve the above-described first, second and third objects, the first transport layer relay device of the present invention has a plurality of terminal-side connection termination units for terminating transport layer connections from terminals; a plurality of interdevice connection termination units for terminating transport layer connections (relay connections) to relay to opposing transport layer relay devices; and an application information analysis unit for relaying between each terminal-side connection termination unit and each interdevice connection termination unit while reading application information.

The first transport layer relay device of the present invention further includes a transmission rate control unit for determining the total transmission rate of the interdevice connection termination units and the transmission rate of each interdevice connection termination unit; and a relay control unit for managing which of the plurality of terminal-side connection termination units, interdevice connection termination units, and application information analysis units are used.

To achieve the above-described fourth and fifth objects, the second transport layer relay device of the present invention includes, in addition to the configuration of the first transport layer relay device, a network condition estimation unit for estimating the network conditions between opposing devices and reporting to the transmission rate control unit.

To achieve the above-described first, second, and third objects, the third transport layer relay device of the present invention includes a plurality of terminal-side connection termination units for terminating transport layer connections from terminals, and includes one interdevice connection termination unit for terminating transport layer connections (relay connections) to relay these terminal-side connection termination units to opposing transport layer relay devices. The third transport layer relay device further includes a MUX-DEMUX unit for aggregating data from each terminal-side connection termination unit and transferring to one interdevice transport layer termination unit. The third transport layer relay device further includes an application information analysis unit for relaying data while reading application information between each terminal-side connection termination unit and the MUX-DEMUX unit. The third transport layer relay device further includes: a transmission rate control unit for instructing the total transmission rate of the interdevice connection termination units and the proportion of the rate at which the MUX-DEMUX unit groups data from each terminal-side connection termination unit; and a relay control unit for managing which of the plurality of terminal-side connection termination units and the application information analysis units are used.

To achieve the above-described fourth and fifth objects, the fourth transport layer relay device of the present invention includes, in addition to the configuration of the third transport layer relay device, a network condition estimation unit for estimating the network conditions between opposing devices and reporting to the transmission rate unit.

To achieve the above-described sixth object, the fifth transport layer relay device of the present invention includes, in the first transport layer relay device of the present invention: a relay control unit having the additional capability to inquire to the transmission rate control unit regarding the optimum initial transmission rate that is to be reported to a terminal at the time of a request for the establishment of a connection from the terminal; a transmission rate control unit means having the additional capability of determining the optimum initial transmission rate in accordance with this request; and terminal-side connection termination units having the additional capability of reporting the initial transmission rate to the terminal.

To achieve the above-described sixth object, the sixth transport layer relay device of the present invention includes, in the configuration of the second transport layer relay device of the present invention: a relay control unit having the additional capability of inquiring to the transmission rate control unit for the optimum initial transmission rate that is to be reported to a terminal at the time of a request for the establishment of a connection from the terminal; a transmission rate control unit having the additional capability of determining the optimum initial transmission rate in accordance with the request; and terminal-side connection termination units having the additional capability of reporting the initial transmission rate to a terminal.

To achieve the above-described sixth object, the seventh transport layer relay device of the present invention includes in the configuration of the third transport layer relay device of the present invention: a relay control unit having the additional capability of inquiring to the transmission rate control unit for the optimum initial transmission rate that is to be reported to a terminal at the time of a request for the establishment of a connection from a terminal; a transmission rate control unit having the additional capability of determining the optimum initial transmission rate in accordance with the request; and terminal-side connection termination units having the additional capability of reporting the initial transmission rate to a terminal.

To achieve the above-described sixth object, the eighth transport layer relay device of the present invention includes in the configuration of the fourth transport layer relay device of the present invention: a relay control unit having the additional capability of inquiring to the transmission rate control unit for the optimum initial transmission rate that is to be reported to a terminal at the time of a request for the establishment of a connection from the terminal; a transmission rate control unit having the additional capability of determining the optimum initial transmission rate in accordance with the request; and terminal-side connection termination units having the additional capability of reporting the initial transmission rate to a terminal.

The present invention has the following merits:

The first merit of the present invention is the ability to secure a desired effective rate for a particular set of transport layer connections between a plurality of terminals and to redistribute the bandwidth among this set of connections at low cost.

The second merit of the present invention is the ability to secure, for a particular set of transport layer connections between a plurality of terminals, an effective rate that confers priorities to other transport layer connections and to redistribute the bandwidth among this set of connections at low cost.

The third merit of the present invention is the ability to redistribute a particular effective rate for a particular set of transport layer connections between a plurality of terminals among this set of connections depending on information of the application that flows over these connections.

The fourth merit of the present invention is the ability to secure a desired effective rate for a particular set of transport layer connections between a plurality of terminals at low cost, and moreover, with high accuracy.

The fifth merit of the present invention is the ability to, for a particular set of transport layer connections between a plurality of terminals, secure an effective rate that confers priorities to other transport layer connections with high accuracy.

The sixth merit of the present invention is the ability to improve the efficiency of congestion control of terminals by transmitting initial transmission rates to terminals.

BEST MODE FOR CARRYING OUT THE INVENTION

Explanation next regards the details of embodiments of the present invention with reference to the accompanying figures.

First Embodiment of the Present Invention

Explanation of the Configuration of the First Embodiment of the Present Invention Explanation next regards the details of the configuration of the first embodiment of the present invention with reference to the figures.

Figure 1:
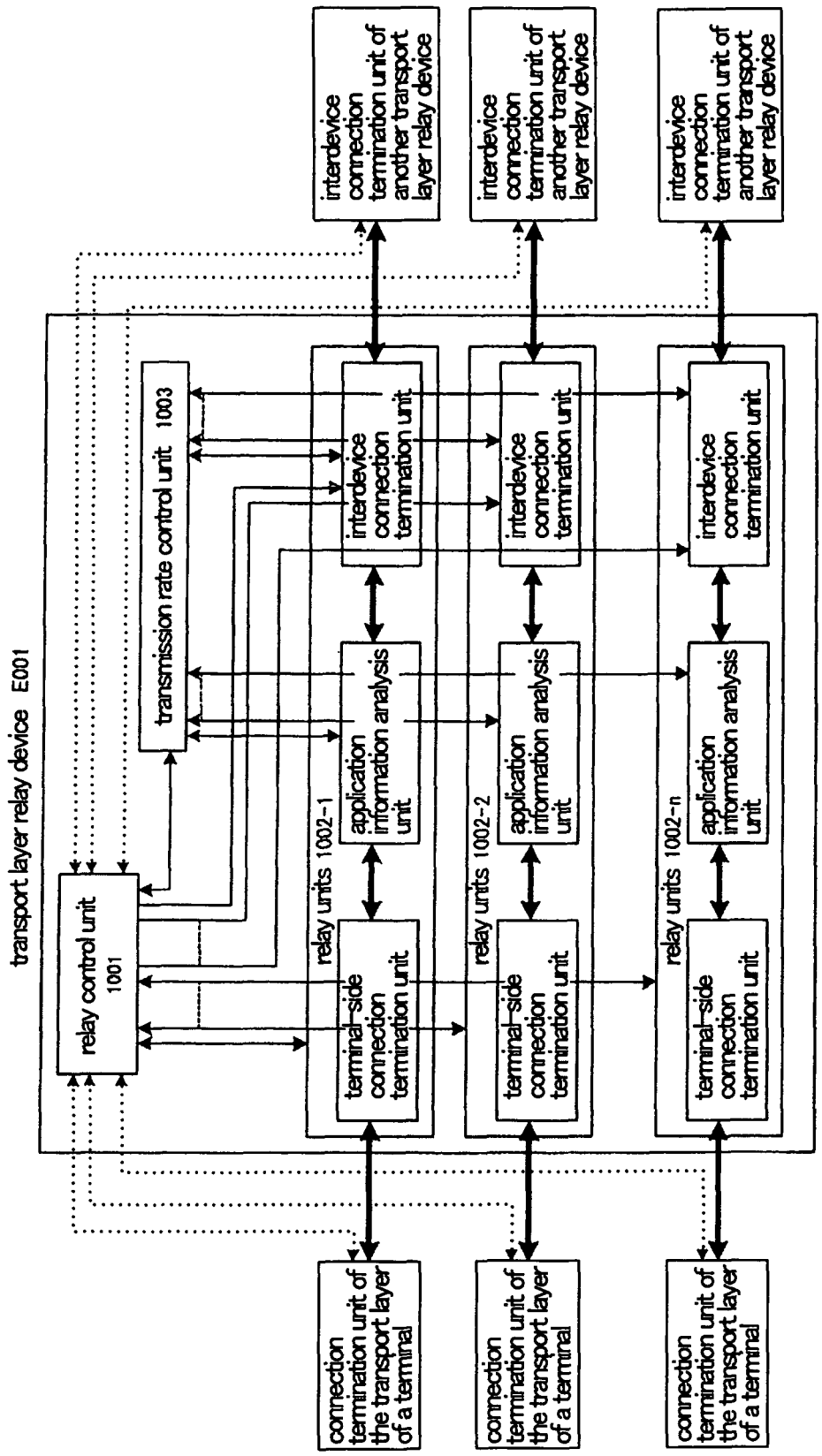
FIG. 1 shows the configuration of a transport layer relay device according to the first embodiment of the present invention.

FIG. 1 is a block diagram of the interior of transport layer relay device E001 of the first embodiment of the present invention. Transport layer relay device E001 includes internally: relay control unit 1001, relay units 1002-1-1002-n, and transmission rate control unit 1003. Transport layer relay device E001 can be realized by a computer. When realized by a computer, a program for realizing relay control unit 1001, relay units 1002-1-1002-n, and transmission rate control unit 1003 is recorded on a disk, a semiconductor memory, or other recording medium. This program is read by a computer, and through the control of the operations of the computer, relay control unit 1001, relay units 1002-1-1002-n, and transmission rate control unit 1003 are realized on the computer. Explanation next regards the constituent elements of each of these components.

Relay Control Unit 1001:

Relay control unit 1001 receives connection establishment requests from the connection termination units of the transport layer of terminals or relay requests from interdevice connection termination units of other transport layer relay devices; and assigns relay units among relay units 1002-1-1002-n that are not currently being used to carry out the relay process of the transport layer connection. A connection establishment request from a terminal includes a set of five items of information (referred to as the "connection identifier"): the port number and IP address of the source terminal of the request to establish a connection, the port number and IP address of the destination terminal of the connection establishment request, and an identifier of the transport protocol that is to be used in the connection. A relay request includes information that is required for establishing an interdevice connection (this being referred to as a "relay connection") of transport layer relay devices together with the connection identifier.

Relay control unit 1001 includes a table (space management table) indicating whether each of relay units 1002-1-1002-$n$ is currently in use or not. Upon receiving a connection establishment request or a relay request, relay control unit 1001 assigns a relay unit and sets the relevant relay unit in the space management table to "in use"; and upon receiving notification of the completion of relay from a relay unit, writes information identifying "not in use"; and thus manages which relay units are currently in use. Relay control unit 1001 further registers to and deletes from transmission rate control unit 1003 the connection identifier of a connection that has been assigned to a relay unit and the identification number (1-$n$) of the relay unit.

Relay control unit 1001 further includes a table (correspondence table) that indicates the correspondence between the IP address of the destination terminal of an establishment request and the transport layer relay device that is the transmission destination of the relay request. Upon receiving a connection establishment request from a terminal, relay control unit 1001 acquires, from the correspondence table, information that indicates the transport layer relay device that corresponds to the IP address of the terminal that is the destination of the establishment request that is contained in the above-described connection establishment request, and transfers the acquired information to the interdevice connection termination unit.

Relay Units 1002-1-1002-$n$:

Relay units 1002-1-1002-$n$ each contain a terminal-side connection termination unit, an application information analysis unit, and an interdevice connection termination unit. Relay units 1002-1-1002-$n$ receive from relay control unit 1001: (1) connection establishment requests from connection termination units of the transport layer of terminals or (2) relay requests from the interdevice connection termination units of other transport layer relay devices and establish transport layer connections for relay between terminals and other transport layer relay devices. The following explanation regards the operations for the cases of receiving (1) and (2).

Upon receiving from relay control unit 1001 (1) a connection establishment request from the connection termination unit of the transport layer of a terminal, a relay unit causes the terminal-side connection termination unit to establish a transport layer connection with that terminal. At this time, the terminal-side connection termination unit uses the information (the IP address, port number, and transport protocol identifier that is to be used in the connection) of the terminal that is the destination of the establishment request in the connection establishment request to display to the terminal as if directly connected with the destination terminal of the connection establishment request. The relay unit further instructs the interdevice connection termination unit to transmit a relay request to the interdevice connection termination unit of the transport layer relay device (here assumed to be device B) that is indicated by the information that has been transferred from relay control unit 1001 and causes the interdevice connection termination unit to establish a transport layer connection with the interdevice connection termination unit of device B.

Upon receiving from relay control unit 1001 (2) a relay request from an interdevice connection termination unit of another transport layer relay device (here assumed to be device B), a relay unit causes the interdevice connection termination unit to establish a transport layer connection with the interdevice connection termination unit of device B. The relay unit further uses the information of the connection identifier that is contained in the relay request to establish a transport layer connection between the terminal-side connection termination unit and the terminal that is the destination of the establishment request. At this time, the terminal-side connection termination unit uses the information (the IP address, port number, and the identifier of the transport protocol that is to be used in the connection) of the establishment request source terminal of the connection establishment request and displays to the terminal the same as if directly connected to the terminal that is the source of the connection establishment request.

Upon receiving connection-disconnected notification from the terminal-side connection termination unit, the relay unit causes the interdevice connection termination unit to disconnect the relay connection and sends relay end notification to relay control unit 1001. Upon receiving connection-disconnected notification from the interdevice connection termination unit, the relay unit similarly causes the terminal-side connection termination unit to disconnect the connection with the connection destination terminal and sends relay end notification to relay control unit 1001.

Terminal-Side Connection Termination Unit:

A terminal-side connection termination unit includes a transmission/reception buffer that is used in communication with a terminal with which a transport layer connection is extended, and carries out the termination process of a transport layer connection. This process of terminating a transport layer connection is performed in accordance with the transport layer protocol that is being used, but is assumed to include at least the functions of establishing, maintaining, and ending a transport layer connection, as well as the functions of flow control and congestion control. The terminal-side connection termination unit carries out the establishment and disconnection of connections with terminals in accordance with instructions from a relay unit. In addition, in the event of a connection disconnection request from a terminal, the terminal-side connection termination unit sends connection-disconnected notification to the relay unit after disconnecting the connection.

During the interval in which a connection is established with a terminal, the terminal-side connection termination unit both sends data in the transmission buffer to the terminal in accordance with the stipulations of the transport layer protocol, receives data from the terminal in accordance with the stipulations of the transport layer protocol, and writes data to the reception buffer. The terminal-side connection termination unit further receives data from the application information analysis unit to which it is connected and writes the data to the transmission buffer; and reads data from the reception buffer and transfers the data to the application information analysis unit to which it is connected.

Application Information Analysis Unit:

The application information analysis unit transfers data of the transport layer between the terminal-side connection termination unit and the interdevice connection termination unit. In other words, the application information analysis unit reads transport layer data from the reception buffer of the terminal-side connection termination unit and writes to the transmission buffer of the interdevice connection termination unit.

The application information analysis unit also reads transport layer data from the reception buffer of the interdevice connection termination unit and writes to the transmission buffer of the terminal-side connection termination unit. During these transfers of transport layer data, the application information analysis unit acquires application information and reports to transmission rate control unit 1003.

When carrying out data transmission and reception that uses HTTP (HyperText Transfer Protocol) on transport layer protocol, the application information is, for example, the content of a content-type tag and the value of a content-length tag in the HTTP header, the content of the content-type tag indicating the type of data that are being sent, and the value of the content-length tag indicating the size of the data that are being sent. As another example, the application information may be the streaming rate or the connection identifier of streaming that are designated in a RTSP (Real Time Streaming Protocol) connection. As yet another example, the application information may be the connection identifier of an FrP data connection that is designated in an FTP control connection.

Interdevice Connection Termination Unit:

As with the terminal-side connection termination unit, the interdevice connection termination unit has a transmission/reception buffer that is used in communication with a partner with which a transport layer connection is extended, and performs termination processing of a transport layer connection. In addition, the interdevice connection termination unit establishes and disconnects connections with other transport layer relay devices in accordance with the instructions of a relay unit. In the event of a connection disconnect request from another transport layer relay device, the interdevice connection termination unit disconnects the connection and then sends a connection-disconnected notification to the relay unit.

Regarding the termination process of transport layer connections, although the interdevice connection termination unit has the functions for establishing, maintaining, and ending a transport layer connection, the interdevice connection termination unit differs from the terminal-side connection termination unit in that the transmission rate control unit carries out the transmission rate calculation for flow control and congestion control and the interdevice connection termination unit transmits at the rate that accords with the instructions of the transmission rate control unit. As an additional difference, the interdevice connection termination unit uses feedback information from the communication partner to find congestion information (to be explained) for each connection with the current communication partner and reports this information to transmission rate control unit 1003.

The use of a transport layer protocol having reliability is assumed in this transport layer connection, and ACK packets that include sequence numbers (ACK numbers) of data that were able to be received from the receiving side are received for retransmit control. ACK numbers may be simply the value of the last sequence number+1 (RR: Receive Ready) that has been received consecutively without loss, or may be a value that enumerates RR and sequence number blocks that were able to be received, such as a SACK (Selective ACK). ACK packets may further contain information that is necessary for flow control, such as the residual quantity of the receiving-side reception buffer.

An interdevice connection termination unit according to the foregoing description can be realized by, for example, altering one portion of a connection termination unit of transport layer protocol that carries out sliding-window congestion control—flow control such as TCP Reno, TCP NewReno, or TCP SACK. More specifically, in these transport protocols, the smaller value of the value of the congestion window and the residual quantity of the reception buffer of the transmission partner is found as the value of the final transmission window, and the portion of this congestion window (referred to as "cwnd") that is altered is changed as follows: the target congestion window value (referred to as "TW") is first determined (the method of determination to be described hereinbelow), and cwnd is changed such that:

(a) cwnd=1 at the initiation of a connection, when the connection is idle (when packets have not been sent for a time interval of one RTT or more), or when a TCP time-out occurs; and (b) cwnd=cwnd+1 if cwnd is equal to or less than TW/2 when ACK is received, and in other cases, cwnd=cwnd+1.0/cwnd.

Alternatively, when the target window value is changed, cwnd may be overwritten by this target window value. As the method of determining the target window value, the target window value may be a value that is obtained by dividing the rate that is instructed by the transmission rate control unit by the current RTT (Round Trip Time). Alternatively, the physical bandwidth B (bit/second) of the bottleneck link through which the TCP connection passes that is terminated by the interdevice connection termination unit and the maximum value RTT_max (sec) of RTT (Round Trip Time) observed by TCP may be used to produce W_max=RTT_max·B/(8·MSS) (where MSS is the maximum segment size of TCP), and based on the rate (taken as R (bit/sec)) instructed by the transmission rate control unit, the value of W_max·R/B may be found and the value of the window overwritten. Alternatively, if N is the number of TCP flows of cross-traffic that flows through the bottleneck link through which passes the TCP connection that is terminated by interdevice connection termination unit, then the value of (4·N−1)·W_max·R/(4·N·B−R) may be written over the value of the window.

Regarding the TCP retransmission control, in normal TCP protocol, in addition to an operation referred to as "retransmission" in which retransmission is carried out if ACK do not come during the time interval from sending a particular packet until a time-out time, control referred to as "fast retransmit" is carried out in which, when a particular threshold value (referred to as the "fast retransmit threshold value" and typically a value of "3") of instances of duplicate ACK occur, the packet of the next sequence number of the ACK number is retransmitted one time. In the interdevice connection termination unit of the present embodiment, a "re-retransmit" as described below may be carried out in addition to this operation. A "re-retransmit" is an operation in which, for a duplicate ACK number that initiates fast retransmit, the number of duplicate ACK that successively arrive is counted even after the fast retransmit, and when this number exceeds a particular threshold value (called the "re-retransmit threshold value"), retransfer is again carried out. Re-retransmit may be carried out repeatedly. The re-retransmit threshold value may be a value obtained by subtracting the sum of the duplicate ACK number and fast retransmit threshold value from the maximum value of the sequence number that has been sent thus far when fast retransmit is carried out.

During the interval in which a connection is being established, the transport layer connection with the interdevice connection termination unit of the partner that established the connection is maintained in accordance with the stipulations of the transport layer protocol, data in the transmission buffer are sent to the partner's interdevice connection termination unit (in accordance with the stipulations of transport layer protocol), and further, data from the interdevice connection termination unit that established the connection are received (in accordance with the stipulations of the transport layer protocol) and written to the reception buffer. In addition, data are received from the application information analysis unit that is connected and written to the transmission buffer. Data are read from the reception buffer and transferred to the application information analysis unit that is connected. However, the rate at which data in the transmission buffer are sent to the interdevice connection termination unit is assumed to accord with the rate that has been instructed from transmission rate control unit 1003. In addition, connection-specific congestion information that is collected from ACK packets that are obtained when receiving data from a partner's interdevice connection termination unit is transferred to transmission rate control unit 1003.

Explanation next regards the connection-specific congestion information. Typically, in transport layer protocol, ACK packets are received as feedback information from a communication partner to which a connection is extended, these ACK packets containing the partner's current reception capability (such as the amount of space in the reception buffer) and the sequence number of data that have been received. Based on the ACK packets, the current Round Trip Time (RTT) can be calculated and events that can be inferred to be the packet loss can be detected. The RTT can be calculated as follows:

When packets are transmitted, the sequence number of the data that are contained in the packets and the transmission time are stored, and upon the reception of ACK packets that report that these sequence numbers have been received, the RTT can be obtained by finding the difference between the reception time and the transmission time that has been stored. As for packet loss, if the ACK sequence numbers are sequence numbers of the last data that were heretofore consecutively received without loss, as with TCP, the possibility that packet loss has occurred can be detected at the time of receiving duplicate ACK. The possibility of packet loss can also be detected when partial ACK is received in the case of a retransmit algorithm such as Fast Retransmit in TCP for carrying out Fast Retransmit that is not Go-back-N at the time of receiving duplicate ACK. This information that includes RTT and events that may be packet loss is referred to as "connection-specific congestion information."

Transmission Rate Control Unit 1003:

Transmission rate control unit 1003 takes the total transmission rate of a connection that is currently being relayed as R_total and divides and allots this total transmission rate to each relay connection. Regarding the determination method, the total transmission rate R_total may be determined depending on the number of connections that are currently being relayed, the application information from each application information analysis unit, and the connection-specific congestion information from each interdevice connection termination unit, and may be a method such as described hereinbelow.

Total Transmission Rate Determination Method A1

Using a multiplication value $\alpha$ ($\alpha>1$) that has been determined in advance for the desired effective rate R_target, a set value is taken as R_total=$\alpha$·R_target. In this case, $\alpha$ is made greater than "1" so that packets can be transmitted at desired effective rate R_target despite packet loss.

Total Transmission Rate Determination Method B1

R_total is determined depending on the number of connections that are currently being relayed so that the desired effective rate R_target will be a value that corresponds to the number of connections that are currently being relayed. It is determined that a rate of R_o per connection is to be assigned, and R_total is then determined as $\alpha$·R_o·m based on the current number m of connections that are registered by relay control unit 1001. The value $\alpha$ is a previously determined multiplication value $\alpha$ ($\alpha>1$).

Total Transmission Rate Determination Method C1

R_total is determined using the connection-specific congestion information from each interdevice connection termination unit such that a desired effective rate R_target is obtained. For example, it is assumed that the total transmission rate is updated for each time interval T, that m connections are currently being relayed at time t, that each relay connection transmits Ci (i=1, . . . , m) packets during the time interval from time t−T to time t, that Li (i=1, . . . , m) instances of packet loss are detected, and that the average packet size of each relay connection is Di (i=1, . . . , m). During the interval from time t−T to time t, the transmission of the following amount of data is attempted:

$$\sum_{i=1}^{m} C_i D_i \qquad \text{[Equation 1]}$$

The following amount of data could not be transmitted due to packet loss:

$$\sum_{i=1}^{m} L_i D_i \qquad \text{[Equation 2]}$$

The loss rate of data is thus:

$$P = \left(\sum_{i=1}^{m} L_i D_i\right) / \left(\sum_{i=1}^{m} C_i D_i\right) \qquad \text{[Equation 3]}$$

If it is assumed that the same congestion conditions remain in effect, R_total is determined as R_target/(1−P) in order to attain the target rate (R_target). However, in order to avoid extreme congestion, for a threshold value P_0 of a particular data loss rate, R_total is determined as R_target/(1−P_0) when P>P_0.

Total Transmission Rate Determination Method D1

R_total is determined using connection-specific congestion information from each interdevice connection termination unit so as to obtain the highest possible effective rate. For example, it is assumed that the total transmission rate is updated for each time interval T, that m connections are currently being relayed at time t, that each relay connection transmits Ci (i=1, . . . , m) packets during the time interval from time t−T to time t, that Li (i=1, . . . , m) instances of packet loss are detected, and that the average packet size of each relay connection is Di (i=1, . . . , m). During time interval from time t−T to time t, the transmission of the following amount of data is attempted:

$$\sum_{i=1}^{m} C_i D_i \qquad \text{[Equation 4]}$$

The following amount of data cannot be sent due to packet loss:

$$\sum_{i=1}^{m} L_i D_i \quad \text{[Equation 5]}$$

And the packet loss rate is:

$$P = \left(\sum_{i=1}^{m} L_i D_i\right) \bigg/ \left(\sum_{i=1}^{m} C_i D_i\right) \quad \text{[Equation 6]}$$

Based on the past transmission rate R_total and the data loss rate P at that time, a table is prepared that finds the relation between the transmission rate and the rate of data that actually reached the receiving side (=R_total·(1−P)). The data for preparing this table are assumed to be successively updated. R_total is taken as the value of the transmission rate for which the rate of actual arrival at the reception side is a maximum. However, if sufficient past transmission rates R_total have not been accumulated, a preset R_total is used.

Total Transmission Rate Determination Method E1

R_total is also determined using information from an application information analysis unit such that a desired effective rate R_target is obtained that corresponds to the application that is currently relayed. For example, when only streaming connections are being relayed, streaming rate information is obtained from the application information analysis unit, the sum values of this information is taken as R_target, and R_total is found in accordance with transmission rate determination method C1.

Total Transmission Rate Determination Method F1

R_total is determined using the number m of current connections and connection-specific congestion information from interdevice connection termination units so as to obtain an effective rate that confers priorities to other traffic that shares bottlenecks. As an example, the packet loss rate p and the RTT of the network through which the relay connections pass that are obtained from connection-specific congestion information may be used to estimate the effective rate per TCP, and an a-multiple of this rate may then be multiplied by m. The method for estimating the effective rate per TCP may be the equation that is given by X in the "throughput equation" of Section 3.1 in "TCP Friendly Rate Control (TFRC): Protocol Specification" by M. Handley, S. Floyd, J. Padhye, and J. Widmer (Internet Society, RFC 3448, January 2003). In other words, using the connection-specific congestion information from interdevice connection termination units, and with the rate of occurrence of packet loss p (when calculating p, calculation is carried out taking packet loss within RTT as one loss event), the index average value R of RTT, the estimated value t_RTO of the time-out time interval of TCP (for example, two times R), the average value s (bytes) of the TCP packet size of the network in which the relay connections exist (s may be a value learned from experience), and b=2; X is found as follows:

$$X = \frac{s}{R \cdot \sqrt{2 \cdot b \cdot p / 3} + \left(t\_RTO \cdot \left(3\sqrt{3 \cdot b \cdot p / 8} \cdot p \cdot (1 + 32 \cdot p^2)\right)\right)} \text{(bit/sec)} \quad \text{[Equation 7]}$$

R_total is thus determined as m·α·X (bit/sec). If α is made greater than 1, the transmission rate per TCP can be made higher than for other traffic and the priority of traffic that is being relayed can be raised relative to other traffic. On the other hand, if α is made less than 1, the transmission rate per TCP can be made lower than for other traffic, and the priority of traffic that is being relayed can be lowered relative to other traffic.

R_total that has been determined in this way is allotted to each relay connection. The allotment may be determined according to the number of current connections or information from the application information analysis unit, the following examples being methods that can be considered:

Transmission Rate Allotment Method 1

Rates are allotted equally to all connections. In other words, if there are m connections, a rate of R_total/m is allotted to each connection.

Transmission Rate Allotment Method 2

Rates are allotted according to rules that are determined depending on the port number information of the connection identifiers. For example, a priority is conferred to each port number, and rates are allotted in accordance with these priorities.

Transmission Rate Allotment Method 3

Rates are determined depending on information from the application information analysis unit. As an example, when relaying a plurality of connections of an application that performs data transfer by HTTP connections, bandwidth allotment is performed that confers priorities depending on the value of the HTTP Content-type field that is obtained from the application information analysis unit. As another example, when relaying a plurality of connections of an application that acquires files by HTTP, higher bandwidth is allotted to connections that transfer data of shorter size depending on information of the HTTP Content-length field that is obtained from the application information analysis unit. As yet another example, a case is considered for relaying Ns streaming-type application connections and Nf file transfer-type application connections that use HTTP. Each streaming rate that is obtained from the application information analysis unit is RSi (i=1, . . . , Ns), and each file size of the Nf file transfer-type connections that is obtained from the application information analysis unit is FLi (i=1, . . . , Nf). For the streaming-type connections, the streaming rates RSi (i=1, . . . , Ns) are allotted to connections having a lower rate than an equal rate (in which R_total is divided by the number of current connections Ns+Nf). The remaining rate:

$$\left(R\_total - \sum_{i=1}^{N_{S0}} RS_i\right) \quad \text{[Equation 8]}$$

is allotted with priority given to streaming connections that have not yet been allotted, and the still remaining rate is then allotted with higher rates being allotted in order to file transfer-type connections in which the file size is shorter.

Explanation of the Operations

Figure 2:
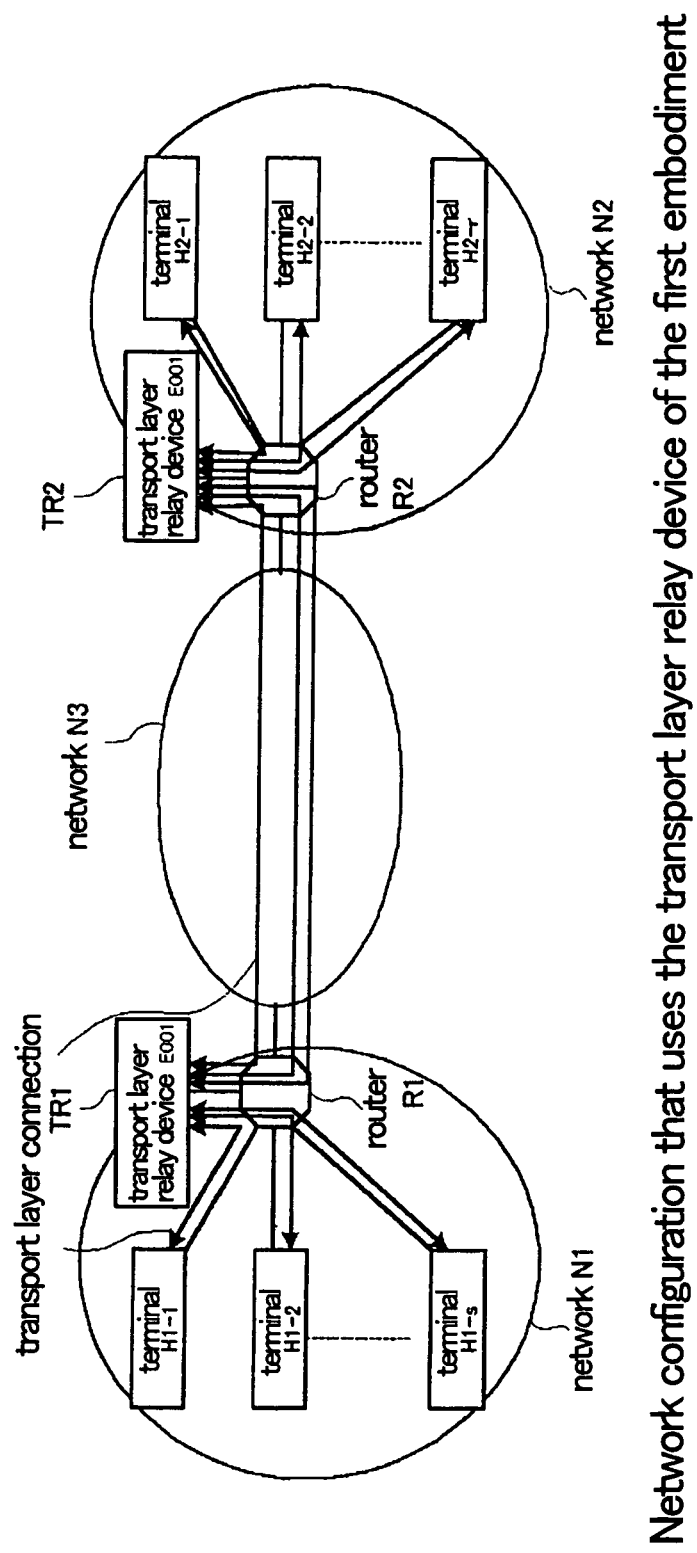
FIG. 2 shows the network configuration that uses the transport layer relay device of the first embodiment of the present invention.

Explanation next regards the details of the operations of the first embodiment of the present invention with reference to the accompanying figures. FIG. 2 shows an example of the configuration of a communication network that uses transport layer relay device E001 of the first embodiment of the present invention. Network N1 includes s terminals H1-1-H1-s and is connected to network N3 by way of router R1. Network N2 includes r terminals H2-1-H2-r and is connected to network N3 by way of router R2. It is assumed that communication between terminals H1-1-H1-*s* in N1 and terminals H2-1-H2-*r* in N2 is implemented through network N3. In addition, transport layer relay devices E001 according to the first embodiment of the present invention are arranged in networks N1 and N2, these transport layer relay devices E001 being referred to as TR1 and TR2, respectively. Router R1 transfers all packets from terminals H1-1-H1-*s* or from network N3 to transport layer relay device TR1, and transfers packets from transport layer relay device TR1 in the same way as a normal router. Similarly, router R2 transfers all packets from terminals H2-1-H2-*r* or from network N3 to transport layer relay device TR2, and transfers packets from transport layer relay device TR2 in the same way as for a normal router.

In the above-described configuration, transport layer relay device TR1 and router R1, and transport layer relay device TR2 and router R2 may be in the same device and may carry out the same transfer as described above.

Figure 3:
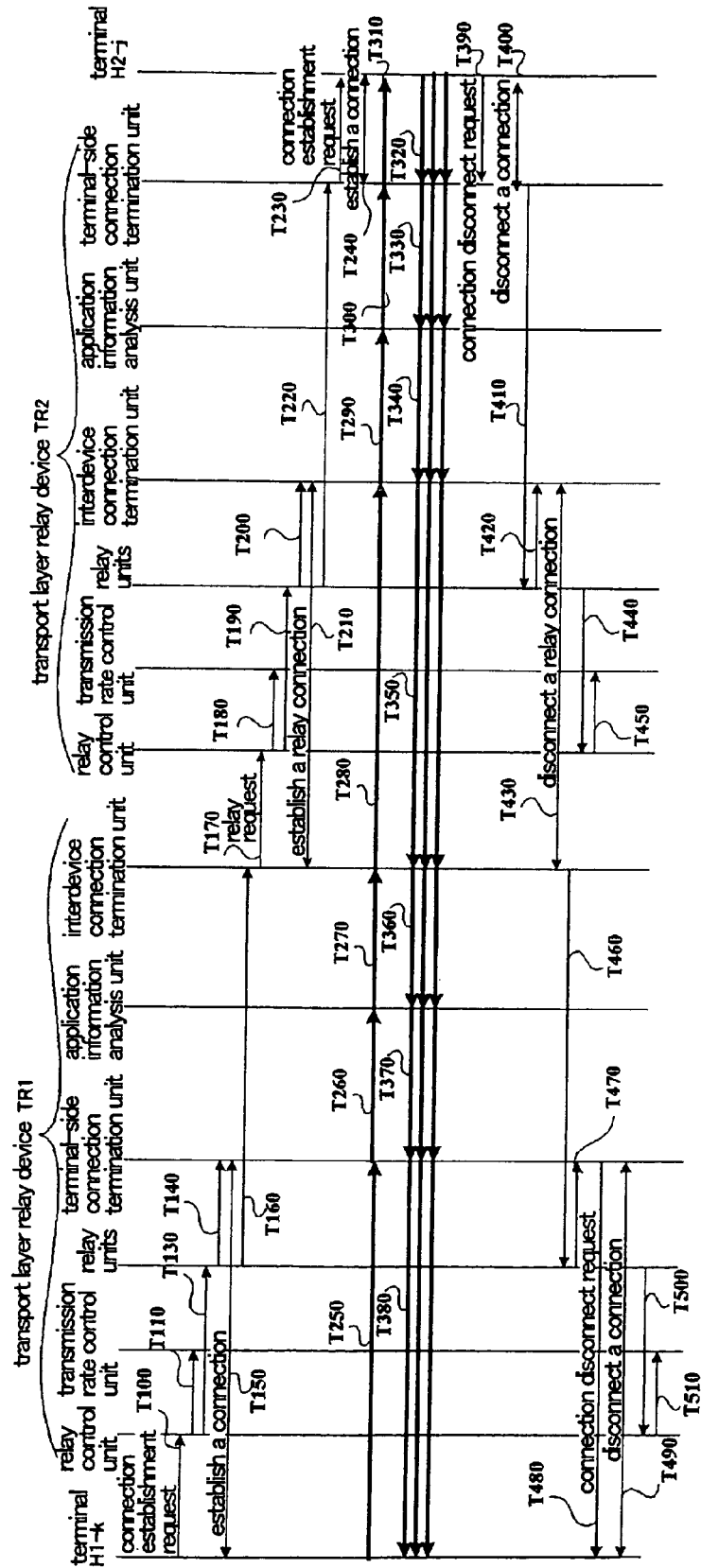
FIG. 3 is a timing chart of the relay operations of the transport layer relay device of the first embodiment of the present invention.

FIG. 3 shows the operations of transport layer relay devices E001 (TR1 and TR2 in FIGS. 2 and 3) according to the first embodiment that are arranged in network N1 and network N2 when terminal H1-*k* in network N1 of FIG. 2 implements communication with terminal H2-*j* in network N2. Terminal H1-*k*, when initiating communication with terminal H2-*j*, transmits a connection establishment request packet to terminal H2-*j*, router R1 sends this packet to transport layer relay device TR1, and the relay control unit in transport layer relay device TR1 receives this packet (T100 in FIG. 3).

In transport layer relay device TR1, the relay control unit receives this connection establishment request, finds a relay unit that is not being currently used, and registers the number of this relay unit and the connection identifier to the transmission rate control unit (T110). The relay control unit further transfers the connection establishment request to this relay unit (T130). The relay unit instructs the internal terminal-side connection termination unit (T140) to establish a connection with terminal H1-*k* (T150). The relay unit further instructs the interdevice connection termination unit that is in the relay unit (T160) to send a relay request to the relay control unit of transport layer relay device TR2 (T170), and establish a relay connection with the interdevice connection termination unit (in accordance with the procedures of T180-T210 that are explained below). The relay control unit of transport layer relay device TR2, having received the relay request, finds a relay unit that is not currently being used, and registers the number of this relay unit and the connection identifier that is contained in the relay request to the transmission rate control unit (T180). The relay control unit further transfers the relay request to the relay unit (T190). The relay unit, having received the relay request, instructs the interdevice connection termination unit that is in the relay unit (T200) to establish a relay connection with the interdevice connection termination unit of transport layer relay device TR1 that initiated the relay request (T210). The relay unit further instructs the internal terminal-side connection termination unit (T220) to establish a connection with terminal H2-*j* (in accordance with the procedures of T230 and T240 that are explained hereinbelow). In other words, terminal-side connection termination unit sends a connection establishment request to terminal H2-*j* (T230) and establishes a connection (T240).

If terminal H1-*k* is to use the HTTP GET method to acquire a file from H2-*j*, terminal H1-*k* transmits an HTTP GET request (T250) after the establishment of the connection with TR (T150). This request is received by the terminal-side connection termination unit in transport layer relay device TR1, is transferred to the interdevice connection termination unit by way of the application information analysis unit (T260 and T270) and then is transferred to the interdevice connection termination unit of transport layer relay device TR2 through the use of the relay connection (T280). The request then again passes by way of an application information analysis unit to the terminal-side connection termination unit (T290 and T300), and finally arrives at terminal H2-*j* (T310).

In response to this request, terminal H2-*j* returns data to terminal H1-*k* (T320). The data of this response is again relayed by transport layer relay devices TR2 and TR1 and is delivered to terminal H1-*k* (T330-T380). The details of this portion of the operation will be described later.

When communication is completed, either of the terminals, for example terminal H2-*j*, sends a connection disconnect request (T390). Terminal-side connection termination unit of transport layer relay device TR2 receives this request and disconnects the connection (T-400). Terminal-side connection termination unit sends a connection-disconnected notification to the relay unit (T410). The relay unit, having received this notification, sends a relay end notification to the interdevice connection termination unit (T420), and the interdevice connection termination unit then disconnects the relay connection with the connection destination (T430). The relay unit also transmits the relay end notification to the relay control unit (T440). The relay control unit, having received the relay end notification, notifies the transmission rate control unit to delete the registration of the connection identifier and the number of the relay unit (T450). The interdevice connection termination unit of transport layer relay device TR1 that has disconnected the relay connection sends a connection disconnected notification to the relay unit (T460), and the relay unit, notifies the terminal-side connection termination unit (T470) to disconnect the connection with the terminal (terminal H1-*k*) that is connected (T480 and T490). The relay unit subsequently sends the relay end notification to the relay control unit (T500), and the relay control unit, having receiving this notification, notifies the transmission rate control unit to delete the registration of the connection identifier and the number of the relay unit (T510).

By means of the above-described operations, transport layer relay devices TR1 and TR2 according to the first embodiment of the present invention can be used to relay communication between any terminal within network N1 and any terminal within network N2.

Figure 4:
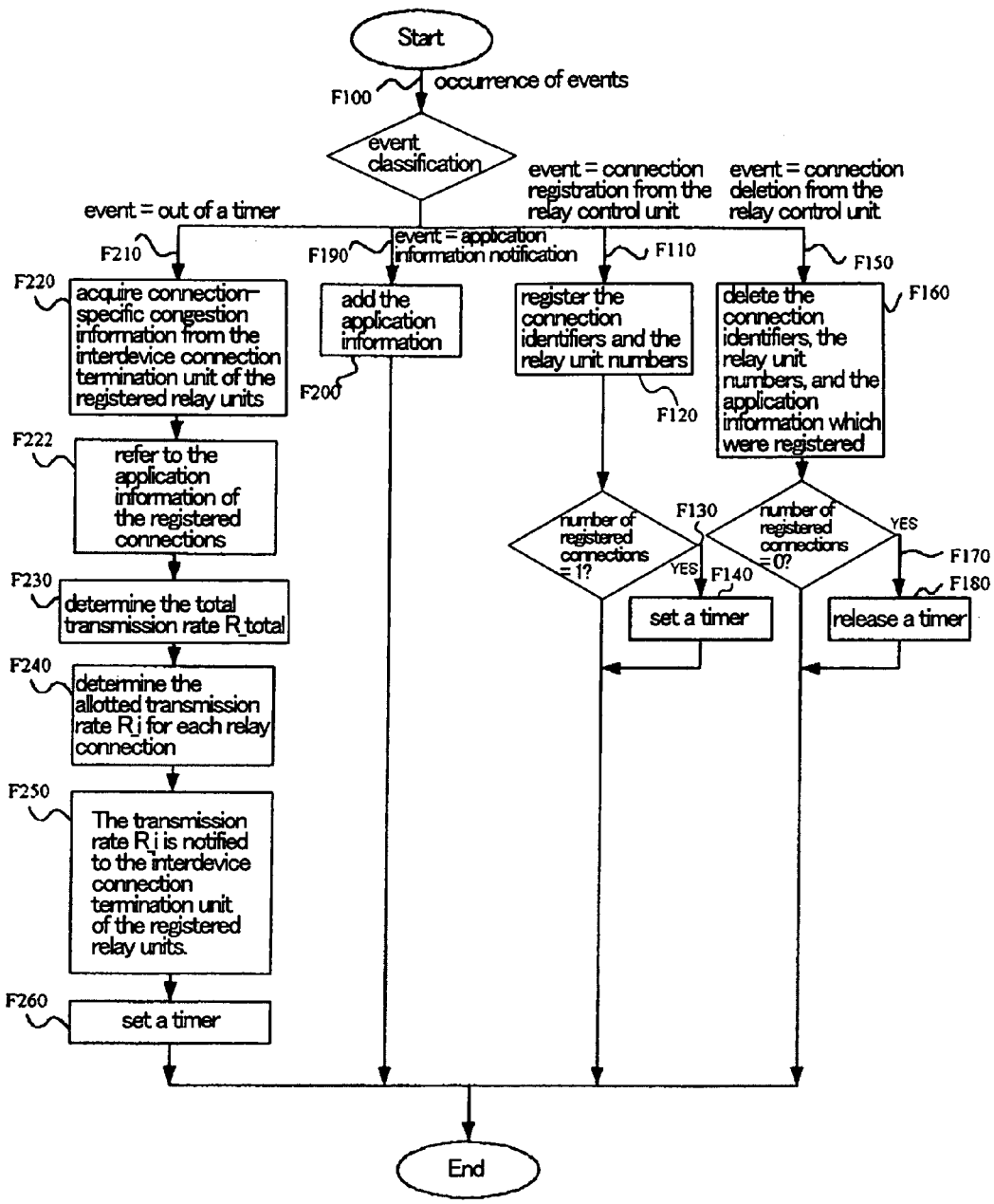
FIG. 4 is a flow chart of the operations of the rate control unit of the first embodiment of the present invention.

Explanation next regards the details of the operations of the transmission rate control unit of the transport layer relay device when transferring data from a terminal in network N2 to a terminal in network N1 as shown by T320-T380 in FIG. 3 in the operations of the foregoing explanation. FIG. 4 shows a flow chart of the operation of the transmission rate control unit. The transmission rate control unit is activated by the occurrence of events that include: the timing out of a timer, the registration or deletion of a relay unit from the relay control unit, or an application information notification from an application information analysis unit (F100). When the event is a registration from the relay control unit (F110), the transmission rate control unit registers the connection identifiers and the relay unit numbers (F120). If the number of registered connections is "1" (F130), the transmission rate control unit sets a timer that times out after time interval T (F140). If the event is a deletion from the relay control unit (F150), the transmission rate control unit deletes the connection identifiers, the relay unit numbers, and the application information (if application information exists) (F160). If the number of registered connections is "0" (F170), the transmission rate control unit releases the timer (F180). If the event is an application information notification from an application information analysis unit (F190), the transmission rate control unit adds the application information relating to that connection identifier to the registered information (F200). If the event is the timing out of a timer (F210), the transmission rate control unit acquires connection-specific congestion information from the interdevice connection termination unit of the relay units that correspond to the registered relay unit numbers (F220). The transmission rate control unit further refers to the application information of the connections that are currently registered (the information that was added at F200) (F222). Then, further using the number of connections that are currently registered, the transmission rate control unit determines the total transmission rate R_total (F230). As the method for this determination, a method can be employed such as one of total transmission rate determination methods A1, B1, C1, D1, E1, and F1 that were described in the explanation of transmission rate control unit 1003. The transmission rate control unit next determines the transmission rate for each connection that is currently registered (F240).

As the method for this determination, a method can be adopted such as Transmission Rate Allotment Methods 1, 2, and 3 that were described in the explanation of transmission rate control unit 1003. The transmission rate of each connection that is determined here is then notified to the corresponding interdevice connection termination unit (F250). Finally, the transmission rate control unit sets the timer to T.

Merits of the First Embodiment of the Present Invention

As the first merit of the present invention that is obtained by the first embodiment, compared to the first method of the prior art, a reduction in equipment cost and a reduction in the inconvenience of replacing the multiplicity of routers in network N3 with routers capable of bandwidth control can be achieved because the arrangement of one transport layer relay device in each of network N1 and network N2 allows a desired effective rate to be secured for a particular set of transport layer connections between a plurality of terminals, and allows this effective rate to be redistributed among this set of connections. This merit is achieved in the method of the present invention because, when the traffic of relay connections and other traffic (cross-traffic) share the same bottlenecks, if the transport layer protocol (for example, TCP) that carries the cross-traffic implements congestion control, properties for regulating the transmission rate are used in accordance with the total transmission rate of the relay connections and a particular effective rate is secured in accordance with the total transmission rate. The total transmission rate is used by dividing the total transmission rate among the connections that are being relayed, whereby, even if the transmission rate of connections that are being relayed is lowered, the rate can be used as the transmission rate of other connections that are being relayed and the effective rate can be redistributed without the rate being taken over by cross-traffic.

The second merit of the present invention that is obtained by the first embodiment of the present invention is realized by using the total transmission rate determination methods A1-E1 in the transmission rate control unit to allow a desired effective rate to be secured for sets of transport layer connections, an effect that was not possible in the second and third examples of the prior art.

The third merit of the present invention that is obtained by the first embodiment of the present invention is realized by using the method of total transmission rate determination method F1 in the transmission rate control unit to allow an effective rate to be obtained for a plurality of connections between terminals while conferring priorities to other traffic, an effect that was not possible in the second and third example of the prior art.

The fourth merit of the present invention that is obtained by the first embodiment of the present invention is realized by using transmission rate allotment method 3 to allow redistribution of a particular effective rate for a particular set of transport layer connections between a plurality of terminals among the set of connections depending on information of applications that flows over the connections.

Second Embodiment of the Present Invention

Explanation of the Configuration

Explanation next regards the details of the configuration of the second embodiment of the present invention with reference to the accompanying figures.

Figure 5:
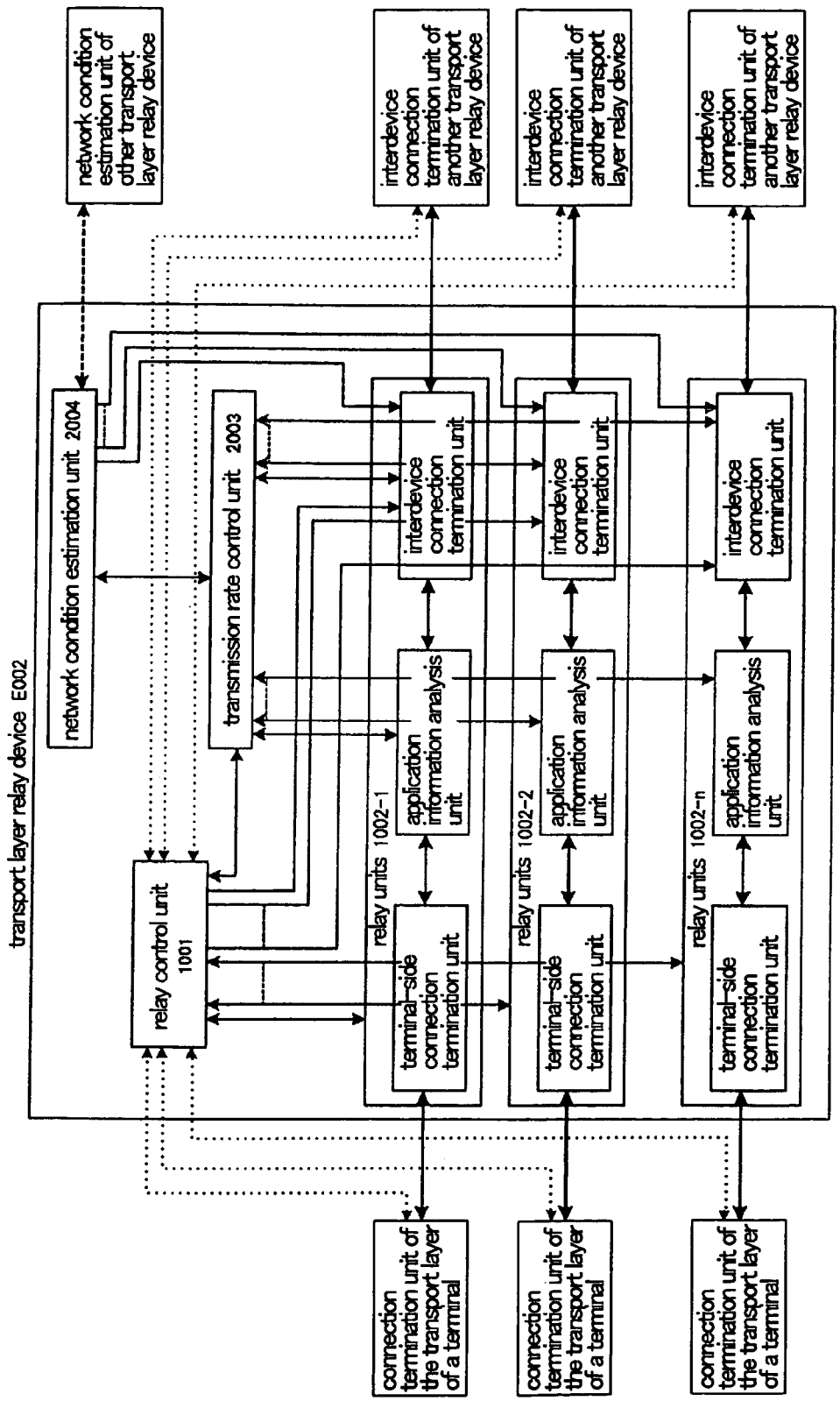
FIG. 5 shows the configuration of the transport layer relay device of the second embodiment of the present invention.

FIG. 5 is a block diagram showing the interior of transport layer relay device E002 of the second embodiment of the present invention. This transport layer relay device E002 differs from transport layer relay device E001 of the first embodiment of the present invention only in the addition of network condition estimation unit 2004 and the connection to transmission rate control unit 2003. The operations of relay control unit 1001, relay units 1002-1-1002-n, the terminal-side connection termination units that are inside the relay units, the application information analysis units, and interdevice connection termination units are the same as the operations of the equivalent components of transport layer relay device E001 of the first embodiment, and redundant explanation is therefore here omitted. In the following description, only network condition estimation unit 2004 and transmission rate control unit 2003 are described. Transport layer relay device E002 can be realized by a computer. When realized by a computer, a program for realizing relay control unit 1001, relay units 1002-1-1002-n, transmission rate control unit 2003, and network condition estimation unit 2004 is recorded on a disk, semiconductor memory, or other recording medium. This program is read by a computer and then, through the control of the operation of the computer, relay control unit 1001, relay units 1002-1-1002-n, transmission rate control unit 2003, and network condition estimation unit 2004 are realized on the computer.

Network Condition Estimation Unit 2004:

Network condition estimation unit 2004 is connected to network condition estimation units 2004 of other transport layer relay devices E002 of the second embodiment of the present invention that are arranged in a network, and by allowing the flow of measurement traffic, estimates conditions of the network that is interposed between the other transport layer relay devices E002 of the second embodiment of the present invention, these conditions including, for example, packet loss rates, one-way/round-trip times, the physical bandwidth of bottlenecks, and the available bandwidth of bottlenecks. The estimation of the packet loss rate may be realized by, for example, transmitting measurement packets to which sequence numbers have been appended on the transmitting side, detecting gaps in the sequence numbers of packets that arrive on the receiving side, and then supplying feedback of the measurement results to the transmitting side. One-way time may be measured by synchronizing times between transport layer relay devices, sending measurement packets from the transmitting side in which the time is written, observing the arrival time on the receiving side, and supplying feedback of the difference in times to the transmitting side. The measurement of Round-Trip Time may be realized by, on the receiving side, returning response packets in response to measurement packets, and then measuring the time interval from the transmission of the measurement packets to the response. The physical bandwidth of a bottleneck can be found by, for example, using the "packet—pair" method (S. Keshav, B. Landfeldt, A. Seneviratne, B. Melander, P. Gunningberg, "Packet-Pair Flow Control," IEEE/ACM Transactions on Networking, February 1995). The "packet-pair" method is a method for finding by L/D the physical bandwidth of bottlenecks in the network from the transmitting side to the receiving side of measurement packets. In this method, measurement packets of the same size L are transmitted successively (without interposing time intervals), and the arrival interval D of the measurement packets then observed on the receiving side (alternatively, the receiving side may also return response packets having a short length in response to the measurement packets, and the transmitting side may then measure the arrival interval of this response). The available bandwidth of bottlenecks can be measured by using, for example, a method known as SLoPS (M. Jain, C. Dovrolis, "End-to-End Available Bandwidth: Measurement Methodology, Dynamics, and Relation with TCP Throughput," Proc. of ACM SIGCOMM, August 2002). In this method, approximately 100 measurement packets are successively transmitted at rate R and the one-way time observed (this observation being possible if time synchronization is established between the transmitting and receiving parties). If the one-way time of successive packets progressively lengthens, R is greater than the available bandwidth, and if the one-way time does not lengthen, R is smaller than the available bandwidth.

The available bandwidth can be found by using this determination method and examining by a binary search that begins from a particular R.

Interdevice Connection Termination Unit:

This interdevice connection termination unit is identical to the first interdevice connection termination unit of the present invention, but when determining the target window value, the interdevice connection termination unit may use a value that is estimated by network condition estimation unit 2004 as the value of the physical bandwidth B of a bottleneck link through which pass the TCP connections that are terminated by the interdevice connection termination unit.

Transmission Rate Control Unit 2003:

Transmission rate control unit 2003 takes the total transmission rate of the connections that are currently being relayed as R_total, and divides this total transmission rate to allot a rate to each relay connection. The total transmission rate R_total may be determined depending on the number of connections that are currently being relayed, connection-specific congestion information from each interdevice connection termination unit, application information from the application information analysis unit, and information from network condition estimation unit 2004. The method for determining the total transmission rate R_total may include the following methods.

Total Transmission Rate Determination Method A2

The total transmission rate is determined based on information that is obtained from network condition estimation unit 2004. For example, the network physical bandwidth that is obtained from network condition estimation unit 2004 is Rb, and the available bandwidth is Ra. If the desired effective rate R_target is smaller than the available bandwidth Ra of a bottleneck, then R_total is determined as R_target·α; and if R_target is greater than Ra but less than Rb, then R_total is determined as R_target·β. The constants α and β are values that have been determined in advance such that 1<α and 1<β.

Total Transmission Rate Determination Method B2

The R_total is determined depending on the number of connections that are currently being relayed such that the desired effective rate R_target corresponds to the number of connections that are currently being relayed.

When a rate of R_o per connection is desired, R_target is determined as R_o*m based on the number of current connections that are registered by the relay control unit. If the desired bandwidth R_target is smaller than the available bandwidth Ra of bottlenecks, R_total is determined as R_target·α, and if the bandwidth R_target is greater than Ra but less than Rb, R_total is determined as R_target·β. The constants α and β are values that have been determined in advance, α being greater than 1 and β also being greater than 1.

Total Transmission Rate Determination Method C2

The total transmission rate is determined using connection-specific congestion information from each interdevice connection termination unit and information from network condition estimation unit 2004. As an example, it will be assumed that the total transmission rate is to be updated each time interval T, the current m connections are relayed at time t, and during the time interval from time t−T to time t, each relay connection transmits Ci (i=1, . . . , m) packets and detects Li (i=1, . . . , m) instances of packet loss.

If C_1+C_2+ . . . +C_m<C_threshold, the number of packets that are used in the measurement is insufficient and the accuracy of the packet loss rate will be poor, and the packet loss rate is taken as P, which is obtained from network condition estimation unit 2004. Otherwise, it is assumed that during time interval from time t−T to time t, each relay connection transmits Ci (i=1, . . . , m) packets and detects Li (i=1, . . . , m) instances of packet loss, and the average packet size of each relay connection is Di (i=1, . . . , m). During the time interval from time t−T to time t, the following amount of data is sent:

$$\sum_{i=1}^{m} C_i D_i \qquad \text{[Equation 9]}$$

And because the following data can not be sent due to packet loss:

$$\sum_{i=1}^{m} L_i D_i \qquad \text{[Equation 10]}$$

the data loss rate is:

$$P = \left(\sum_{i=1}^{m} L_i D_i\right) / \left(\sum_{i=1}^{m} C_i D_i\right) \qquad \text{[Equation 11]}$$

If it is assumed that the same congestion conditions continue, R_total is determined as R_target/(1−P) in order to guarantee the effective rate R_target. However, in order to avoid extreme congestion, R_total is determined as R_target/(1−P_0) when P is greater than the threshold value P_0 of a particular packet loss rate.

Total Transmission Rate Determination Method D2

In order to obtain the greatest possible effective rate, R_total is determined by using the connection-specific congestion information from each interdevice connection termination unit and information from network condition estimation unit 2004. As an example, it is assumed that the total transmission rate is updated for each time interval T, the current m connections are relayed at time t, and during the time interval from time t−T to time t, each relay connection transmits C_i (i=1, . . . , m) packets and detects L_i (i=1, . . . , mm) instances of packet loss.

If C_1+C_2+ . . . +C_m<C_threshold, the number of packets used in the measurement is insufficient and the accuracy of the packet loss rate will be poor, and the packet loss rate is therefore taken as P, which is obtained from network condition estimation unit 2004. Otherwise, it is assumed that during the interval from time t−T to time t, each relay connection transmits Ci (i=1, . . . m) packets and detects Li (i=1, . . . , m) instances of packet loss, and the average packet size of each connection is Di (i=1, . . . , m). During the interval from time t−T to time t, the amount of data that is to be sent is:

$$\sum_{i=1}^{m} C_i D_i \qquad \text{[Equation 12]}$$

The amount of data that are not sent due to packet loss is:

$$\sum_{i=1}^{m} L_i D_i \qquad \text{[Equation 13]}$$

As a result, the data loss rate is:

$$P = \left(\sum_{i=1}^{m} L_i D_i\right) \bigg/ \left(\sum_{i=1}^{m} C_i D_i\right) \qquad \text{[Equation 14]}$$

A table is prepared for finding the relation between the transmission rate and the rate of actual arrival on the receiving side (=R_total*(1−P)) based on the past transmission rate R_total and the data loss rate P at that time. The data for preparing this table are successively updated. The value of the transmission rate for which the rate of actual arrival on the receiving side reaches a maximum is taken as R_total. However, if a sufficient number of past transmission rates R_total have not been accumulated, R_total that has been set in advance is used.

Total Transmission Rate Determination Method E2

R_total is determined by further using information from the application information analysis unit such that a desired effective rate R_target is obtained that corresponds to the application that is currently being relayed. As an example, when only a streaming connection is being relayed, streaming rate information is obtained from the application information analysis units, the sum value is taken as R_target, and R_total then found in accordance with transmission rate determination method C2.

Total Transmission Rate Determination Method F2

R_total is determined using the number of current connections, connection-specific congestion information from the interdevice connection termination units, and information from network condition estimation unit 2004 such that an effective rate is obtained that confers priorities to other traffic that shares bottlenecks. As an example, connection-specific congestion information or the RTT and the packet loss rate p of the network through which relay connections pass that are obtained from the network condition estimation unit are used to estimate the effective rate per connection of TCP, and the multiple of α of this rate is multiplied by m. The method of estimating the effective rate per TCP may employ the calculation equation that gives X in "throughput equation" of Section 3.1 in M. Handley, S. Floyd, J. Padhye, J. Widmer; "TCP Friendly Rate Control (TFRC): Protocol Specification," Internet Society, RFC 3448, January 2003.

In other words, using connection-specific congestion information from the relay connection termination units and the packet loss occurrence rate p, RTT index average value R, the estimated value of the TCP time-out time interval t_RTO (for example, two times R), the average value s (bytes) of the TCP packet size of the network of the relay connections (s may be a value learned through experience), and b as "2", X is found from:

$$X = \frac{s}{R \cdot \sqrt{2 \cdot b \cdot p / 3} + \left(t\_RTO \cdot \left(3\sqrt{3 \cdot b \cdot p / 8} \cdot p \cdot (1 + 32 \cdot p^2)\right)\right)} \text{(bit/sec)} \qquad \text{[Equation 15]}$$

and R_total is determined as m·α·X (bit/sec). If α is made greater than 1, the transmission rate per TCP can be made higher than for other traffic, and the priority of traffic that is being relayed can be raised relative to other traffic. Conversely, making a less than 1 can lower the transmission rate per TCP with respect to other traffic, and the priority of traffic that is being relayed can be lowered relative to other traffic.

R_total that has been determined in this way is allotted to each relay connection. This allotment of rates may be determined depending on the current number of connections and information from the application information analysis units, the following methods being examples of methods that can be considered.

Transmission Rate Allotment Method 1

Rates are allotted equally to all connections. In other words, if there are m connections, a rate of R_total/m is allotted to each connection.

Transmission Rate Allotment Method 2

Rates are allotted according to rules that have been determined depending on port number information of connection identifiers. As an example, priorities are conferred to each port number, and rates are allotted in accordance with these priorities.

Transmission Rate Allotment Method 3

Rates are determined depending on information from the application information analysis unit. As an example, when relaying a plurality of connections of an application that performs data transfer by HTTP connections, bandwidth allotment is performed that confers priorities depending on the value of the HTTP Content-type field that is obtained from the application information analysis unit. As another example, when relaying a plurality of connections of an application that acquires files by HTTP, higher bandwidth is allotted to connections that transfer data of shorter size depending on information of the HTTP Content-length field that is obtained from the application information analysis unit. As yet another example, a case is considered for relaying Ns streaming-type application connections and Nf file transfer-type application connections that use HTTP. Each streaming rate that is obtained from the application information analysis unit is RSi (i=1, ..., Ns), and each file size of the Nf file transfer-type connections that is obtained from the application information analysis unit is FLi (i=1, ..., Nf. For the streaming-type connections, the streaming rates RSi (i=1, ..., NsO) are allotted to connections having a lower rate than an equal rate (in which R_total is divided by the number of current connections Ns+Nf). The remaining rate:

$$\left( R\_total - \sum_{i=1}^{N_{SO}} RS_i \right)$$ [Equation 16]

is allotted with priority given to streaming connections that have not yet been allotted, and the still remaining rate is then allotted with higher rates being allotted in order to file transfer-type connections in which the file size is shorter.

Explanation of Operations

Explanation next regards the operations of the second embodiment of the present invention.

Figure 6:
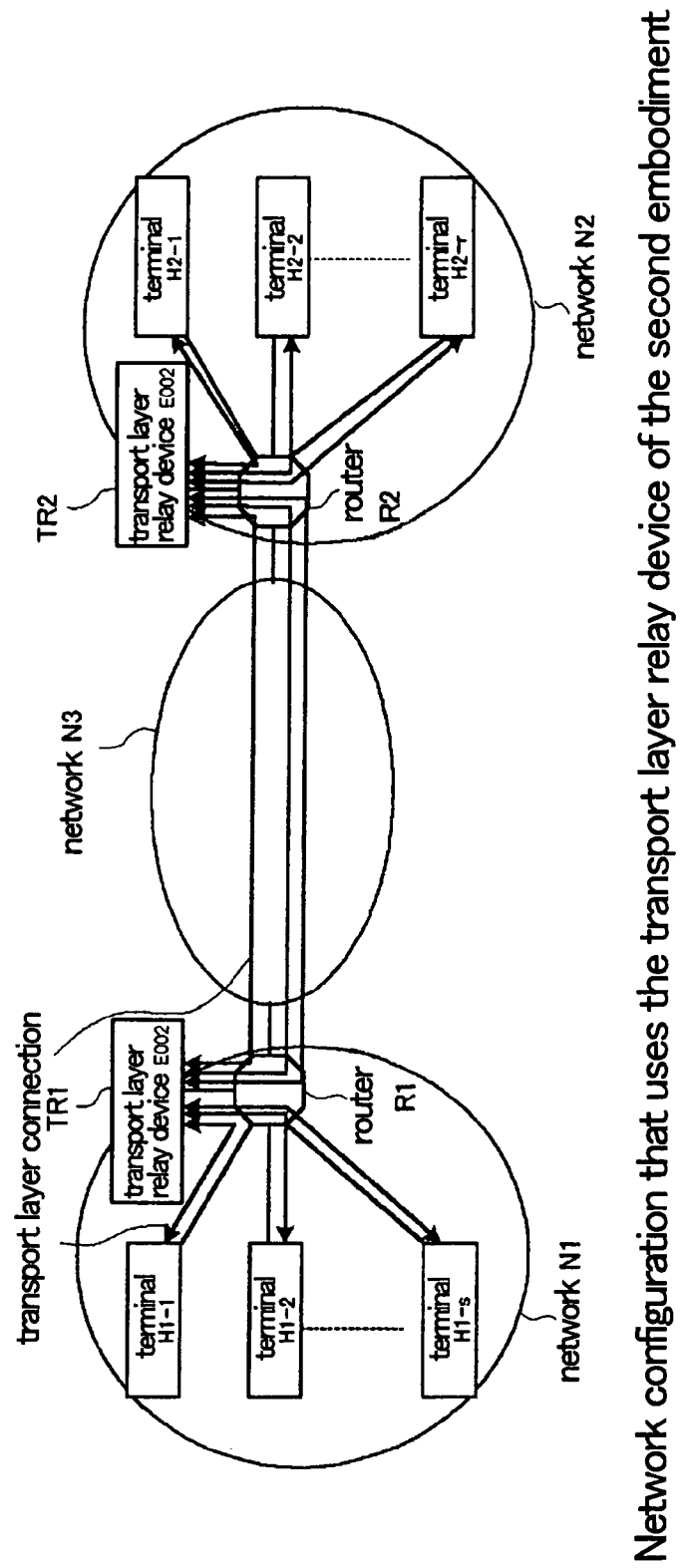
FIG. 6 shows a network configuration that uses the transport layer relay device of the second embodiment of the present invention.

FIG. 6 is an example of a network configuration that uses transport layer relay device E002 of the second embodiment of the present invention. Compared to the example of the network configuration of FIG. 2 that was used in the explanation of the first embodiment of the present invention, the configuration is identical with the exception of the substitution of transport layer relay device E002 of the second embodiment of the present invention for transport layer relay device E001.

Operations that employ transport layer relay devices TR1 and TR2 for initiating and ending the relay of communication between any terminal in network N1 and any terminal in network N2 are identical to the operations of the first embodiment of the present invention that was explained using FIG. 3, and redundant explanation is therefore here omitted.

Figure 7:
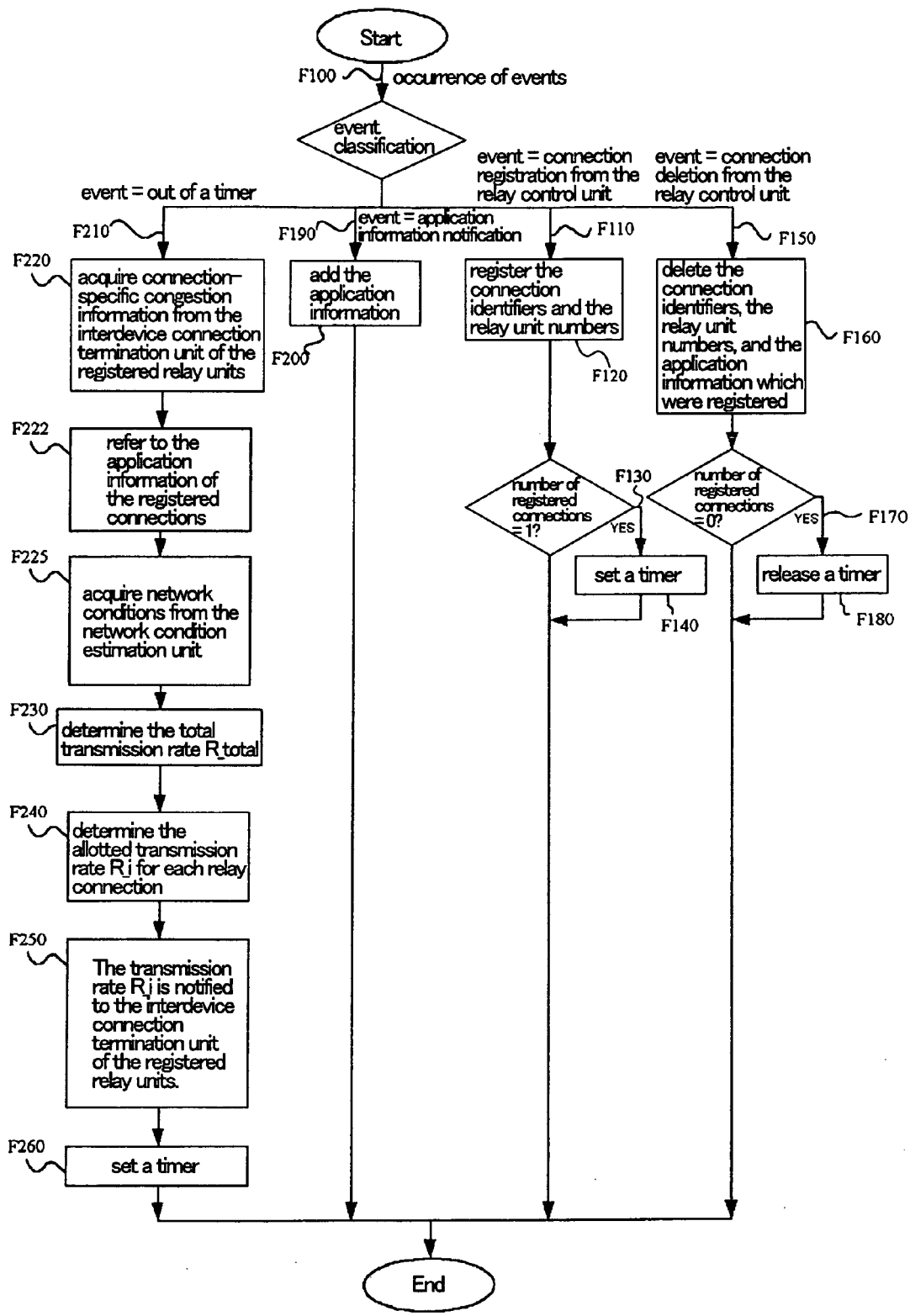
FIG. 7 is a flow chart of the operations of the rate control unit of the second embodiment of the present invention.

Explanation next regards the operations of the transmission rate control unit of a transport layer relay device when data are transferred from a terminal in network N2 to a terminal in network N1. FIG. 7 is a flow chart of the operations of the transmission rate control unit. The transmission rate control unit is activated by the occurrence of any one of events such as the timing-out of a timer, the registration or deletion of a relay unit from the relay control unit, and an application information notification from an application information analysis unit (F100).

When the event is a registration from the relay control unit (F110), the connection identifier and relay unit number are registered (F120), and if the number of registered connections is "1" (F130), a timer is set that times out after time interval T (F140). If the event is a deletion from the relay control unit (F150), the connection identifier, relay unit number, and application information (if application information exists) are deleted (F160), and if the number of registered connections is "0" (F170), the timer is released (F180). If the event is an application information notification from an application information analysis unit (F190), application information that relates to a connection identifier is added to the registered information (F200). If the event is the timing-out of a timer (F210), connection-specific congestion information is acquired from the interdevice connection termination units of relay units that correspond to the relay unit numbers that have been registered (F220). In addition, the transmission rate control unit refers to the application information (the information that was added in F200) of connections that are currently registered (F222). The transmission rate control unit then acquires network conditions from the network condition estimation unit (F225) and also uses the number of connections that are currently registered to determine the total transmission rate R_total (F230). As the method of determining the total transmission rate R_total, any method such as the total transmission rate determination methods A2, B2, C2, D2, E2 and F2 described in the explanation of transmission rate control unit 2003 can be adopted. The transmission rate control unit next determines the transmission rate of each connection that is currently registered (F240). As the method of determining the transmission rate, any method such as the transmission rate allotment methods 1, 2, and 3 that were described in the explanation of transmission rate control unit 2003 can be adopted. The transmission rate of each connection that is here determined is then reported to the corresponding interdevice connection termination unit (F250). Finally, the timer is set to T (F260).

Merits of the Second Embodiment of the Present Invention

The first merit of the present invention that is obtained by the second embodiment of the present invention can be realized by arranging one transport layer relay device in each of network N1 and network N2, whereby a desired effective rate can be secured for a particular set of transport layer connections between a plurality of terminals, and this bandwidth can be redistributed among this set of connections. As a result, compared to the first method of the prior art in which a plurality of routers in network N3 are replaced by routers capable of controlling bandwidth, a reduction in equipment cost and a reduction of the trouble of replacement can be achieved. This merit is achieved because, if the transport layer protocol (for example, TCP) that carries cross-traffic implements congestion control when the traffic of relay connections and other traffic (cross-traffic) share the same bottleneck, the method of the present invention uses properties for regulating the transmission rate in accordance with the total transmission rate of the relay connections and secures a particular effective rate in accordance with the total transmission rate.

In addition, the total transmission rate is used by dividing the total transmission rate among the connections that are being relayed, whereby, even if the transmission rate of the connections that are being relayed is lowered, the rate can be used as the transmission rate of other connections that are being relayed and the effective rate can be redistributed without the rate being taken over by cross-traffic.

The second merit of the present invention that is obtained by the second embodiment of the present invention is realized by using the total transmission rate determination methods A2-E2 in the transmission rate control unit to allow a desired effective rate to be secured for sets of transport layer connections, an effect that was not possible in the second and third examples of the prior art.

Further, regarding the method of determining the transmission rate, the combined use of information of a network condition estimation unit allows a desired effective rate to be secured with high accuracy.

The third merit of the present invention that is obtained by the second embodiment of the present invention is realized by using the method of total transmission rate determination method F2 in the transmission rate control unit to enable the allotment of bandwidth to a plurality of connections between terminals while setting priorities to other traffic, an effect that was not possible in the second and third examples of the prior art. Further, regarding the method of determining the transmission rate, the combined use of information of a network condition estimation unit allows an effective rate to be secured at high accuracy while setting priorities.

The fourth merit of the present invention that is obtained by the second embodiment of the present invention is realized by using transmission rate allotment method 3 to enable redistribution of a particular effective rate for a particular set of transport layer connections between a plurality of terminals depending on information of applications that flows over the connections among the set of connections.

Third Embodiment of the Present Invention

Explanation of the Configuration of the Third Embodiment of the Present Invention The following explanation regards the details of the configuration of the third embodiment of the present invention with reference to the accompanying figures.

Figure 8:
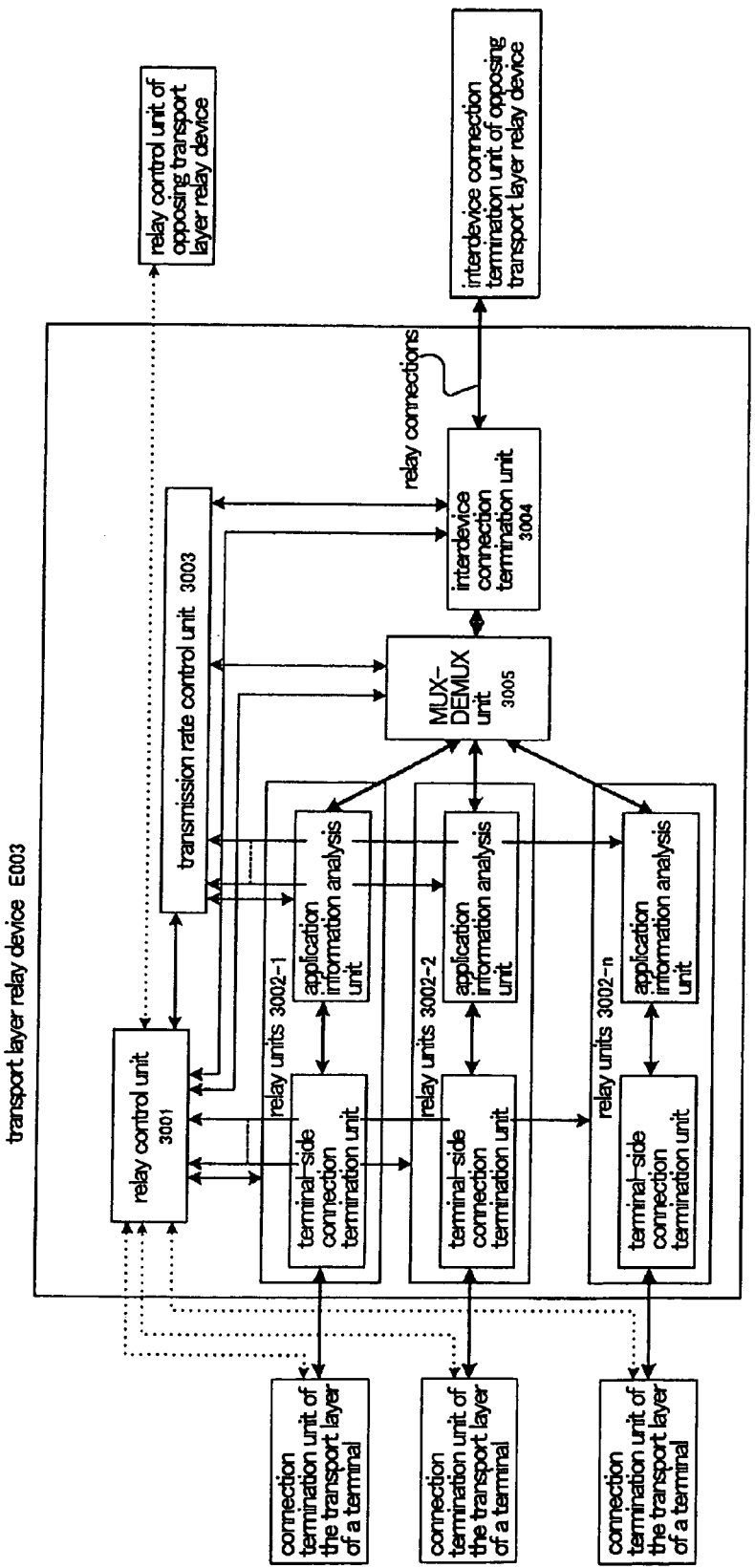
FIG. 8 shows the configuration of the transport layer relay device of the third embodiment of the present invention.

FIG. 8 is a block diagram of the interior of transport layer relay device E003 of the third embodiment of the present invention. Transport layer relay device E003 includes: relay control unit 3001, relay units 3002-1-3002-n, transmission rate control unit 3003, interdevice connection termination unit 3004, and MUX-DEMUX unit 3005. Transport layer relay device E003 can be realized by a computer. When transport layer relay device E003 is realized by a computer, a program for realizing relay control unit 3001, relay units 3002-1-3002-n, transmission rate control unit 3003, interdevice connection termination unit 3004, and MUX-DEMUX unit 3005 is recorded on a disk, semiconductor memory, or other recording medium. The program is read by the computer, and through the control of the operations of the computer, relay control unit 3001, relay units 3002-1-3002-n, transmission rate control unit 3003, interdevice connection termination unit 3004, and MUX-DEMUX unit 3005 can be realized on the computer. The following explanation regards each of these constituent elements.

Relay Control Unit 3001:

Relay control unit 3001 receives: connection establishment requests from connection termination units of the transport layer of terminals; relay start requests from opposing transport layer relay devices E003; connection disconnected notifications from relay units; and relay end requests from opposing transport layer relay devices E003. The operations when receiving each of these requests and notifications is next described.

When Receiving a Connection Establishment Request from a Terminal:

A connection establishment request from a terminal includes a set of five items of information (referred to as a "connection identifier"): the IP address and port number of the terminal that is the source of the request to establish a connection, the IP address and port number of the terminal that is the destination of the connection establishment request, and an identifier of the transport protocol that is to be used in the connection. The relay control unit that has received a connection establishment request transmits to the relay control unit of the opposing transport layer relay device E003 a relay start request that contains the information of the connection establishment request. At this time, the relay control unit exchanges with the partner's relay control unit numbers (1-n) of relay units (3002-1-3002-n) that are not being used to determine relay unit numbers that are not being used on either side. The relay control unit next registers in the transmission rate control unit the identification numbers (1-n) of relay units that have been determined and the connection identifiers of the connections. The relay control unit then registers the relay unit numbers that have been determined in the MUX-DEMUX unit.

The relay control unit further instructs relay units (3002-1-3002-n) of the relay unit numbers that have been determined to establish connections from the terminal. The relay control unit further instructs the interdevice connection termination unit to establish connections if transport layer connections (relay connections) for relay are not already extended to the opposing transport layer relay device.

When Receiving a Relay Start Request from Opposing Transport Layer Relay Device E003:

Upon receiving a relay start request from an opposing transport layer relay device E003, the relay control unit exchanges with the partner relay control unit the numbers (1-n) of relay units (3002-1-3002-n) that are not being used to determine relay unit numbers that are not being used on either side. The relay control unit next registers the identification numbers (1-n) of relay units that have been determined and the connection identifiers of connections in the transmission rate control unit. The relay control unit then registers the relay unit numbers that have been determined in the MUX-DEMUX unit. The relay control unit further causes the relay units (3002-1-3002-n) of the relay unit numbers that have been determined to establish connections with the terminal that is the destination of the connection establishment request based on the information of the connection establishment request that is contained in the relay start request.

When Receiving a Connection Disconnected Notification from a Relay Unit:

The relay control unit sends to the relay control unit of the opposing transport layer relay device E003 a relay end request that includes the number of the relay unit that supplied the connection disconnected notification. The relay control unit further instructs the MUX-DEMUX unit to delete the registration of the relay unit number of the relay unit that supplied the connection-disconnected notification. Finally, the relay control unit reports the relay unit number of the relay unit to the transmission rate control unit and thus deletes the registration.

When Receiving a Relay End Request from an Opposing Transport Layer Relay Device E003:

The relay control unit instructs the relay unit of the relay unit number that is contained in the relay end request to disconnect the connection with the terminal. The relay control unit further instructs the MUX-DEMUX unit to delete the registration of the relay unit number of the relay unit that supplied the connection-disconnected notification. The relay control unit further reports the relay unit number of the relay unit to the transmission rate control unit and thus deletes the registration. If there are no relay units that are being used at this time, the relay control unit instructs the interdevice connection termination unit to disconnect the connection.

Relay control unit 3001 has a space management table showing whether each of relay units 3002-1-3002-n are currently being used or not, and upon receiving a connection establishment request relay request from a terminal or a relay start request from an opposing transport layer relay device E003, assigns relay units and sets the relevant relay unit to "in use" in the space management table; and upon receiving a connection disconnected notification from a relay unit or a relay end request from an opposing transport layer relay device E003, writes information identifying the relay unit as "not in use"; and thus manages which of the relay units is currently in use.

Relay Units 3002-1-3002-*n*

Relay units 3002-1-3002-*n* each contain a terminal-side connection termination unit and an application information analysis unit. In accordance with instructions from the relay control unit, the relay units each cause the terminal-side connection termination units to either establish transport layer connections with terminals or disconnect connections with terminals.

Terminal-Side Connection Termination Unit:

The terminal-side connection termination unit has a transmission/reception buffer that is used in communication with terminals with which transport layer connections have been extended and carries out termination processing for transport layer connections. This termination processing for transport layer connections is carried out in accordance with the transport layer protocol that is used, and includes at least functions for establishing, maintaining, and ending transport layer connections as well as capabilities for flow control and congestion control. The terminal-side connection termination unit establishes and disconnects connections with terminals in accordance with the instructions of the relay unit. In addition, in the event of a connection disconnect request from a terminal, the terminal-side connection termination unit disconnects the connection and then sends a connection-disconnected notification to the relay unit.

During the interval in which a connection is established with a terminal, a terminal-side connection termination unit both sends data in the transmission buffer to the terminal in accordance with the stipulations of the transport layer protocol, and in accordance with the stipulations of the transport layer protocol, receives data from the terminal and writes the data to the reception buffer. The terminal-side connection termination unit also receives data from the application information analysis unit that is connected and writes the data to the transmission buffer. The terminal-side connection termination unit further reads data from the reception buffer and transfers the data to the application information analysis unit that is connected.

Application Information Analysis Unit:

The application information analysis unit transfers data of the transport layer between the terminal-side connection termination unit and MUX-DEMUX unit 3005. The application information analysis unit reads transport layer data from the reception buffer of the terminal-side connection termination unit, and transfers the data to MUX-DEMUX unit 3005. In addition, the application information analysis unit receives data from MUX-DEMUX unit 3005 and writes the data to the transmission buffer of the terminal-side connection termination unit. During the transfer of these transport layer data, the application information analysis unit acquires application information and reports to transmission rate control unit 3003. When data are being transmitted and received using HTTP (HyperText Transfer Protocol) in transport layer protocol, the application information is, for example, the content of the Context-type tag in the HTTP header that shows the type of data that are being transmitted and the value of the Context-length tag in the HTTP header that shows the data size that is being sent. As another example, the application information may be the streaming connection identifier and streaming rate that are specified in an RTSP (RealTime Streaming Protocol) connection. As yet another example, the application information may be the connection identifier of an FTP data connection that is specified in an FTP control connection.

MUX-DEMUX Unit 3005:

MUX-DEMUX unit 3005 stores the number of relay units that are currently being used in accordance with instructions from relay control unit 3001 to register or delete the numbers of relay units that are currently being used. MUX-DEMUX unit 3005 receives data from application information analysis unit regarding relay units that are currently being used, divides into pieces of a particular fixed size (performing padding when the size is inadequate), attaches tags having relay unit numbers, and writes to the transmission buffer of interdevice connection termination unit 3004. At this time, MUX-DEMUX unit 3005 follows the instructions of the transmission rate control unit when setting which of the relay units that are currently being used data are to be read from and the rate for reading the data.

In addition, MUX-DEMUX unit 3005 reads pieces of data for every fixed size unit from the reception buffer of interdevice connection termination unit 3004 and removes the tags, and transfers the pieces to the application information analysis unit of the relay units of the relay unit numbers that are shown by the tags that are attached to the pieces.

Interdevice Connection Termination Unit 3004:

Interdevice connection termination unit 3004 has transmission/reception buffers that are used in communication with a partner that extends a transport layer connection, and performs a process for terminating transport layer connections. In accordance with the instructions of the relay control unit, interdevice connection termination unit 3004 also extends transport layer connections for relaying with the opposing transport layer relay device E003.

As to the difference between interdevice connection termination unit 3004 and terminal-side connection termination unit, in the process of terminating transport layer connections, although interdevice connection termination unit 3004 has functions for establishing, maintaining, and ending transport layer connections, the calculations of the transmission rate for flow control and congestion control are performed by the transmission rate control unit, and interdevice connection termination unit 3004 transmits at the rate that accords with the instructions of the transmission rate control unit. Interdevice connection termination unit 3004 also differs from the terminal-side connection termination unit in that interdevice connection termination unit 3004 reports to transmission rate control unit the connection-specific congestion information (to be described) with a current communication partner that has been found by using feedback information from the communication partner.

It is further assumed that a reliable transport layer protocol is used in this transport layer connection, and it is assumed that ACK packets are received for retransmission control that include sequence numbers (ACK numbers) of data that can be received from the receiving side. The ACK numbers may be only the value of the last sequence number+1 (RR: Receive Ready) that has been continuously received without loss, or may be a list of RR and a block of sequence numbers that were able to be subsequently received as SACK (Selective ACK). The ACK packet is also assumed to contain information such as the remainder of the reception buffer of the receiving side that is necessary for flow control.

As previously described, the interdevice connection termination unit can be realized by, for example, altering a portion of a connection termination unit of the transport layer protocol that carries out sliding window congestion control/flow control such as TCP Reno, TCP NewReno, or TCP SACK. More specifically, in these transport layer protocols, either the congestion window value or the residual amount of the reception buffer of the transmission partner, whichever has the smaller value, is sought as the final value of the transmission window, and the portion of this congestion window (called "cwnd") that is changed is changed as follows. First, the target congestion window value (called "TW") is determined (the method of determination to be explained), and cwnd is changed such that: (a) cwnd=1 when a connection is started, at a connection idle time (when packets are not sent for a time interval of one RTT or more), or when a TCP time-out occurs; and (b) when ACK are received, cwnd is set to cwnd+1 if cwnd is equal to or less than TW/2, and cwnd is otherwise set to cwnd+1.0/cwnd.

When the target window value is changed, cwnd may be overwritten by the target window value. As the method of determining the target window value, the target window value may be a value that is obtained by dividing the rate that is instructed by the transmission rate control unit by the current RTT (Round Trip Time). Alternatively, using the physical bandwidth B (bits/sec) of the bottleneck link through which passes the TCP connection that is terminated by the interdevice connection termination unit and the maximum value RTT_max (sec) of the RTT (Round Trip Time) that is observed by TCP:

$$W\_max = RTT\_max \cdot B / (8 \cdot MSS)$$

(where MSS is the maximum segment size of TCP), and the value of W_max R/B may be found from the rate (taken as R (bit/sec)) that is instructed by the transmission rate control unit and written over the value of the window. Alternatively, the value of $(4 \cdot N - 1) \cdot W\_max\_R / (4 \cdot N \cdot B - R)$ may be written over the value of the window, where N is the number of TCP flows of cross-traffic that flows through bottleneck link through which passes a TCP connection that is terminated by an interdevice connection termination unit.

Regarding the TCP retransmission control, in normal TCP protocol, in addition to an operation referred to as "retransmission" in which retransmission is carried out if ACK do not come during the time interval from sending a particular packet until a time-out time, control referred to as "fast retransmit" is carried out in which, when a particular threshold value (referred to as the "fast retransmit threshold value" and typically a value of "3") of instances of duplicate ACK occur, the packet of the next sequence number of the ACK number is retransmitted one time. In the interdevice connection termination unit of the present embodiment, the following "re-retransmission" may be carried out in addition to this operation. Re-retransmission is an operation in which, for duplicate ACK numbers that were prompted by fast retransmit, the number of duplicate ACK that arrive continuously after fast retransmit is counted, and when this number exceeds a particular threshold value (called the "re-retransmit threshold value"), retransmission is again carried out. Re-retransmission may be carried out repeatedly. The re-retransmission threshold value may be a value obtained by subtracting the sum of the duplicate ACK numbers and the fast retransmit threshold value from the maximum value of the sequence numbers that have been sent so far when fast retransmission is carried out.

During the interval in which a connection is established, a transport layer connection is maintained with the interdevice connection termination unit of the partner with which a connection has been established in accordance with the stipulations of the transport layer protocol; data in the transmission buffer are transmitted to the interdevice connection termination unit of the partner (in accordance with the stipulations of the transport layer protocol); and data are received from the interdevice connection termination unit of the partner with which the connection has been established and written to the reception buffer (in accordance with the stipulations of the transport layer protocol). In addition, data are received from the application information analysis unit that is connected and written to the transmission buffer. Data are read from the reception buffer and transferred to the application information analysis unit that is connected. However, the rate for transmitting data in the transmission buffer to the interdevice connection termination unit of the partner accords with the rate that is instructed from transmission rate control unit 3003. In addition, connection-specific congestion information that is collected from ACK packets that are obtained when receiving data from a partner's interdevice connection termination unit is transferred to transmission rate control unit 3003.

Regarding the connection-specific congestion information, in transport layer protocol, the partner's current reception capability (such as the residual amount of the reception buffer) and ACK packets that contain the sequence number of received data are received as feedback information from a communication partner with which a connection is extended. Based on the ACK packets, the Round Trip Time (RTT) of the current packet can be measured and events that can be inferred to be packet loss can be detected. The RTT can be calculated as follows. When packets are transmitted, the sequence numbers of the data that are included in the packets and the transmission time are stored, and when ACK packets are received that report the reception of these sequence numbers, the difference between the reception time and the transmission time that has been stored is found to obtain the RTT. Regarding packet loss, as with TCP, if the ACK sequence numbers are sequence number of the last item of data that has been received continuously without loss up to the present time and returned, the possibility of packet loss can be detected when a duplicate ACK is received. Further, in the case of a retransmit algorithm such as the Fast Retransmit of TCP for implementing Fast Retransmit and not "Go-back-N" when a duplicate ACK has been received, the possibility of packet loss can also be detected when a partial ACK is received. Information that includes this RTT and events that indicate the possibility of packet loss is referred to as connection-specific congestion information.

Transmission Rate Control Unit 3003:

R_total is the total transmission rate of connections that are currently being relayed, and the R_total is the transmission rate of the relay connections. The method for determining the total transmission rate R_total may make the determination depending on the number of connections that are currently being relayed and the connection-specific congestion information from the interdevice connection termination units. As examples, the following methods can be used:

Total Transmission Rate Determination Method A3

The desired effective rate R_target is multiplied by a multiplier $\alpha$ (where $\alpha > 1$) that has been determined in advance to obtain a set value of R_total=$\alpha \cdot$R_target.

Total Transmission Rate Determination Method B3

R_total is determined depending on the number of connections that are currently being relayed such that the desired effective rate R_target corresponds to the number of connections that are currently being relayed. The allotment of a rate of R_o per connection is determined, and based on the number of current connections m that are registered by the relay control unit, R_total is determined to be $\alpha \cdot$R_o*m. The value $\alpha$ is a predetermined multiplier $\alpha$ (where $\alpha > 1$).

Total Transmission Rate Determination Method C3

R_total is determined using connection-specific congestion information from the interdevice connection termination unit such that the desired effective rate R_target is obtained.

As an example, if it is assumed that the total transmission rate is updated each time interval T, each relay connection transmits C packets during the interval from time t−T to time t, and L instances of packet loss are detected, the packet loss rate P is L/C. Assuming that the same congestion conditions continue, R_total is set to R_target/(1−P) to attain the target rate (R_target). However, to avoid extreme congestion, for a particular threshold value P_0 of the data loss rate, R_total is set to R_target/(1−P_0) when P>P_0.

Total Transmission Rate Determination Method D3

R_total is determined using connection-specific congestion information from each interdevice connection termination unit such that the maximum possible effective rate is obtained. As an example, if it is assumed that the total transmission rate is updated each time interval T, and that during the interval from time t−T to time t, each relay connection transmits C packets, and detects L instances of packet loss, the packet loss rate P is L/C. Based on a past transmission rate R_total and the data loss rate P at that time, a table is prepared in which the relation between the transmission rate and the rate of actual arrival on the receiving side (R_total*(1−P)) is found. The data for preparing this table are assumed to be successively updated.

R_total is taken as the value of the transmission rate for which the rate of actual arrival on the receiving side reaches a maximum. However, if sufficient past transmission rates R_total have not yet been accumulated, a preset R_total is used.

Total Transmission Rate Determination Method E3

R_total is also determined using information from the application information analysis unit so as to obtain a desired effective rate R_target that corresponds to the application that is currently being relayed. As an example, when only streaming connections are being relayed, streaming rate information is obtained from the application information analysis unit, the sum value is taken as R_target, and R_total is then found in accordance with transmission rate determination method C3.

Total Transmission Rate Determination Method F3

R_total is determined using the current number of connections m and connection-specific congestion information from the interdevice connection termination unit such that an effective rate is obtained that confers priorities to other traffic that shares bottlenecks. As an example, the packet loss rate P and RTT of the network through which the relay connections pass that are obtained from connection-specific congestion information may be used to estimate the effective rate per TCP connection, and an α-multiple of this rate may then be multiplied by m. As the method of estimating the effective rate per TCP, a calculation equation that gives X may be used such as the "throughput equation" in section 3.1 of M. Handley, S. Floyd, J. Padhye, and J. Widmer, "TCP Friendly Rate Control (TFRC): Protocol Specification" (Internet Society, RFC 3448, January 2003). In other words, using connection-specific congestion information from the interdevice connection termination units and with the packet loss occurrence rate p (when calculating p, calculation is carried out with the packet loss within one RTT being taken as one loss event), index average value R of RTT, estimated value t_RTO of the TCP time-out interval (for example, two times R), the average TCP packet size s (bytes) of the network of the relay connection (where s may be a value learned through experience), and b as "2," X is found from:

$$X = \frac{s}{R \cdot \sqrt{2 \cdot b \cdot p / 3} + (t\_RTO \cdot (3\sqrt{3 \cdot b \cdot p / 8} \cdot p \cdot (1 + 32 \cdot p^2)))} \text{(bit/sec)} \quad \text{[Equation 17]}$$

and R_total is determined to be m·αX (bit/sec). If α is made greater than "1," the transmission rate per TCP can be made higher than for other traffic, and the priority of traffic that is relayed can be raised relative to other traffic. Conversely, if α is set to less than "1," the transmission rate per TCP can be made lower than for other traffic, and the priority of traffic that is relayed can be lowered relative to other traffic.

The rate allotment of R_total that has been determined in this way to each relay connection may be determined depending on the number of current connections and information from the application information analysis unit, the following methods being examples that can be considered.

Transmission Rate Allotment Method 1

Rates are allotted equally to all connections. In other words, if there are m connections, a rate of R_total/m is allotted to each connection.

Transmission Rate Allotment Method 2

The rates are allotted in accordance with rules that have been determined depending on the port number information of the connection identifiers. As an example, priorities are conferred to each port number, and rates are allotted in accordance with these priorities.

Transmission Rate Allotment Method 3

Rates are determined depending on information from the application information analysis unit. As an example, when relaying a plurality of connections of an application that performs data transfer by HTTP connections, bandwidth allotment is performed that confers priorities depending on the value of the HTTP Content-type field that is obtained from the application information analysis unit. As another example, when relaying a plurality of connections of an application that acquires files by HTTP, higher bandwidth is allotted to connections that transfer data of shorter size depending on information of the HTTP Content-length field that is obtained from the application information analysis unit. As yet another example, a case is considered for relaying Ns streaming-type application connections and Nf file transfer-type application connections that use HTTP. Each streaming rate that is obtained from the application information analysis unit is RSi (i=1, ..., Ns), and each file size of the Nf file transfer-type connections that is obtained from the application information analysis unit is FLi (i=1, ..., Nf). For the streaming-type connections, the streaming rates RSi (i=1, ..., NsO) are allotted to connections having a lower rate than an equal rate (in which R_total is divided by the number of current connections Ns+Nf). The remaining rate:

$$\left( R\_total - \sum_{i=1}^{N_{SO}} RS_i \right) \quad \text{[Equation 18]}$$

is allotted with priority given to streaming connections that have not yet been allotted, and the still remaining rate is then allotted with higher rates being allotted in order to file transfer-type connections in which the file size is shorter.

Explanation of Operations

The following explanation regards the details of the operations of the third embodiment of the present invention with reference to the accompanying figures.

Figure 9:
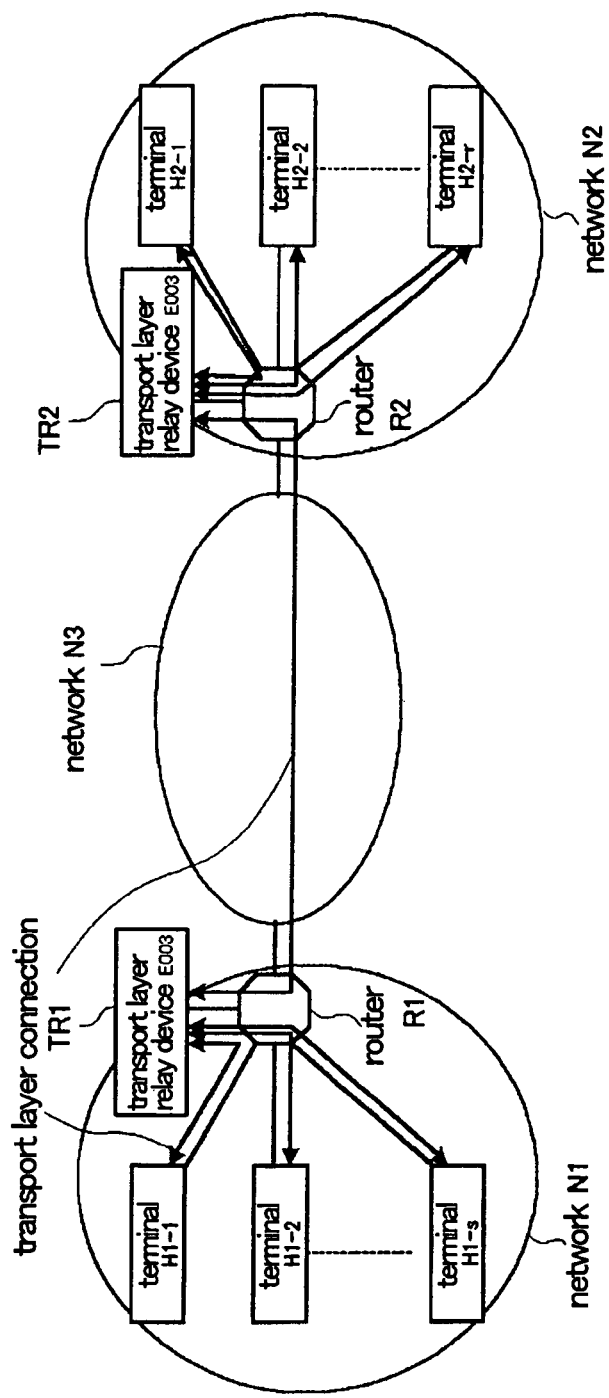
FIG. 9 shows a network configuration that uses the transport layer relay device of the third embodiment of the present invention.

FIG. 9 shows an example of the configuration of a communication network that uses transport layer relay device E003 according to the third embodiment of the present invention. Network N1 includes s terminals H1-1-H1-s and is connected to network N3 by way of router R1. Network N2 includes r terminals H2-1-H2-r and is connected to network N3 by way of router R2.

Communication between terminals H1-1-H1-s in network N1 and terminals H2-1-H2-r in N2 is realized by way of network N3. In addition, transport layer relay devices E003 according to the third embodiment of the present invention are arranged in networks N1 and N2, these transport layer relay device E003 being identified as TR1 and TR2, respectively. Router R1 transfers all packets from terminals H1-1-H1-s or from network N3 to transport layer relay device TR1, and transfers packets from transport layer relay device TR1 similar to a normal router. Similarly, router R2 transfers all packets from terminals H2-1-H2-r or from network N3 to transport layer relay device TR2 and transfers packets from transport layer relay device TR2 similarly to a normal router.

Figure 10:
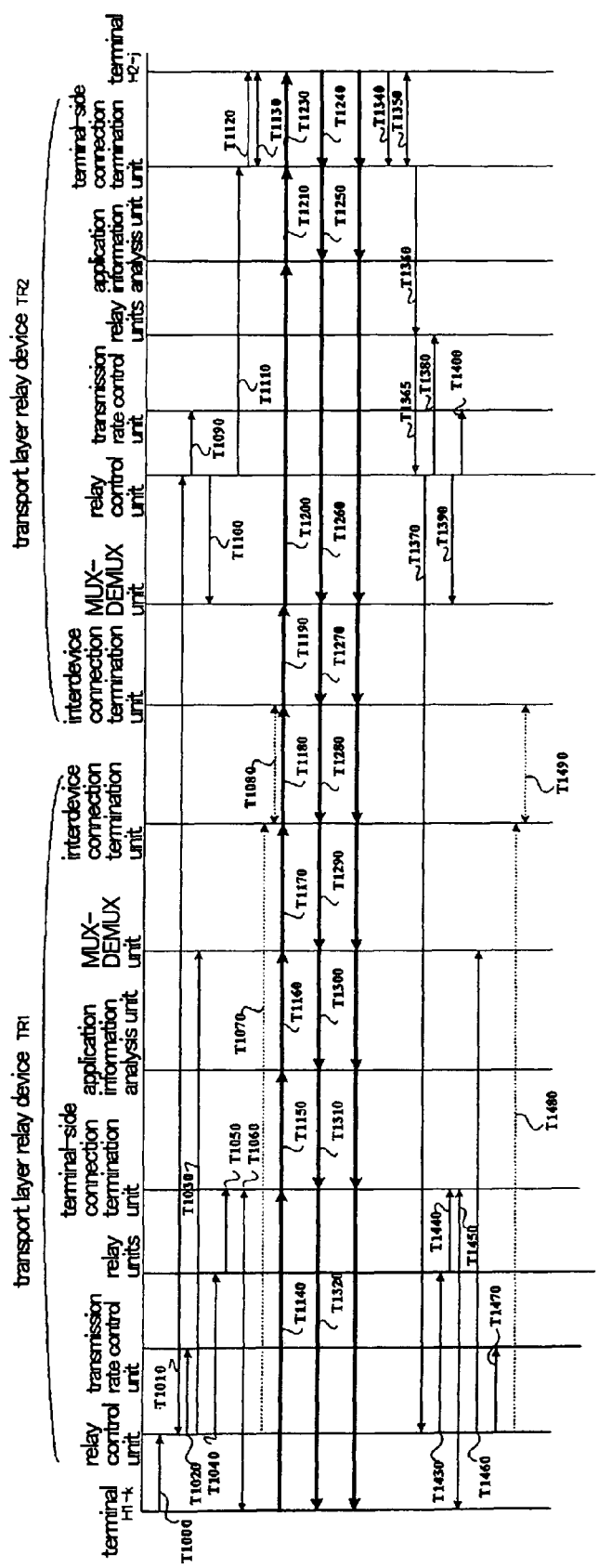
FIG. 10 is a timing chart of the relay operations of the transport layer relay device of the third embodiment of the present invention.

In the above-described configuration, transport layer relay device TR1 and router R1, and transport layer relay device TR2 and router R2 may be in the same device, and may perform the same transfer as described above. FIG. 10 shows the operations of transport layer relay devices E003(TR1 and TR2 in FIGS. 9 and 10) of the third embodiment that are arranged in network N1 and network N2 when performing communication between terminal H1-k in network N1 and terminal H2-j in network N2 of FIG. 9. Terminal H1-k, as a preliminary to communication with terminal H2-j, sends packets of a connection establishment request toward terminal H2-j. Router R1 sends these packets to transport layer relay device TR1, and the relay control unit of transport layer relay device TR1 receives these packets (T1000 in FIG. 10). The relay control unit, having received the connection establishment request sends a relay start request that includes information of the connection establishment request to the relay control unit of the opposing transport layer relay device TR2. At this time, the relay control units exchange numbers (1-n) of relay units (3002-1-3002-n) that are not currently being used in the relay control units and determine relay unit numbers that are not being used on either side (T1010).

The relay control unit next registers the identification numbers (1-n) of the relay units that have been determined and a connection identifier of the connection in the transmission rate control unit (T1020). The relay control unit next registers the relay unit numbers that have been determined in the MUX-DEMUX unit (T1030). The relay control unit next instructs relay units (3002-1-3002-n) of the relay unit numbers that have been determined to establish connections from the terminal (T1040). The relay units that were instructed to establish connections at T1040 cause the terminal-side connection termination unit to establish connections with the terminal (T1050 and T1060).

The relay control unit further instructs the interdevice connection termination unit to establish connections if transport layer connections for relay (relay connections) are not already established with the opposing transport layer relay device (T070 and T1080).

Upon receiving the relay start request from TR1, the opposing transport layer relay device TR2 exchanges with transport layer relay device TR1 the numbers (1-n) of relay units (3002-1-3002-n) that are not being used in the relay control units to determine the relay unit numbers that are not being used on either side (T1010). The identification numbers (1-n) of the relay units that have been determined and the connection identifiers of the connections are next registered in transmission rate control unit (T1090), and the relay unit numbers are then registered in MUX-DEMUX unit (T100). The relay control unit then causes the relay units (3002-1-3002-n) of the relay unit numbers that have been determined to establish connections with the terminal that is the destination of the connection establishment request based on information of the connection establishment request that is contained in the relay start request (T110, T1120, and T1130).

If terminal H1-k is to use the HTTP GET method to acquire a file from H2-j, terminal H1-k establishes connections with TR (T1060), and then transmits an HTTP GET request (T1140). This request is received by terminal-side connection termination unit of transport layer relay device TR1 and then transferred to the application information analysis unit (T1150). The MUX-DEMUX unit receives data from the application information analysis unit at the rate that accords with the instructions of the transmission rate control unit (T1160) and then divides the data into a pieces of a particular fixed size (padding the data when the size is inadequate), confers tags with the relay unit numbers, and writes the data to the transmission buffer of interdevice connection termination unit 3004 (T1170). The interdevice connection termination unit transmits the data in the transmission buffer at the rate that is instructed by the transmission rate control unit and uses the relay connections to transfer to the interdevice connection termination unit of transport layer relay device TR2 (T1180). The MUX-DEMUX unit of transport layer relay device TR2 reads the data pieces for each fixed size from the reception buffer of the interdevice connection termination unit (T1190), removes the tags that are attached to the pieces, and transfers the pieces to the application information analysis unit of the relay units of the relay unit numbers indicated by the tags (T1200). These data are transferred by way of the application information analysis unit to the terminal-side connection termination unit (T1210), and finally reach terminal H2-j (T1230). Terminal H2 returns data to terminal H1-k in response to this request (T1240). This response data is again relayed by transport layer relay devices TR2 and TR1 and delivered to terminal H1-k (T1250-T1320). At this time, the application information analysis unit of TR2 transfers application information in this response such as the HTTP Content-length information to the transmission rate control unit. This portion of the operation will be described in detail later. When communication ends, either one of the terminals, for example, terminal H2-j sends a connection disconnect request (T1340), this request is received by the terminal-side connection termination unit of transport layer relay device TR2, which disconnects the connection (T1350). The terminal-side connection termination unit sends a connection-disconnected notification to the relay units (T1360). The relay units that receive this notification send connection-disconnected notification to the relay control unit (T1365). The relay control unit, having received this notification, supplies a relay end request that contains the numbers of the relay unit that supplied the connection disconnected notification to the relay control unit of opposing transport layer relay device TR (T1370). The relay control unit further instructs the MUX-DEMUX unit to delete the registration of the relay unit numbers of the relay units that supplied the connection-disconnected notification (T1390). The relay control unit further reports the relay unit numbers of the relay units to the transmission rate control unit and deletes the registration (T1400). The relay control unit of transport layer relay device TR1 that has received the relay end request instructs the relay units of the relay unit numbers that were contained in the relay end request to disconnect the connections with the terminal (T1430). The relay units, having received these instructions, instruct the terminal-side connection termination unit to disconnect the connections with the terminal that is currently connected (T1440 and 1450).

The relay control unit further instructs the MUX-DEMUX unit to delete the registration of relay unit numbers of the relay units that supplied the connection-disconnected notification (T1460). The relay control unit further reports the relay unit number of the relay units to the transmission rate control unit and thus deletes the registration (T1470).

If the relay units that were used at this time are eliminated, the relay control unit instructs the interdevice connection termination unit to disconnect connections and thus causes disconnection of connections (T1480 and T1490).

By means of the above-described operations, communication between any terminal in network N1 and any terminal in network N2 can be relayed by using transport layer relay devices TR1 and TR2 of the third embodiment of the present invention.

Figure 11:
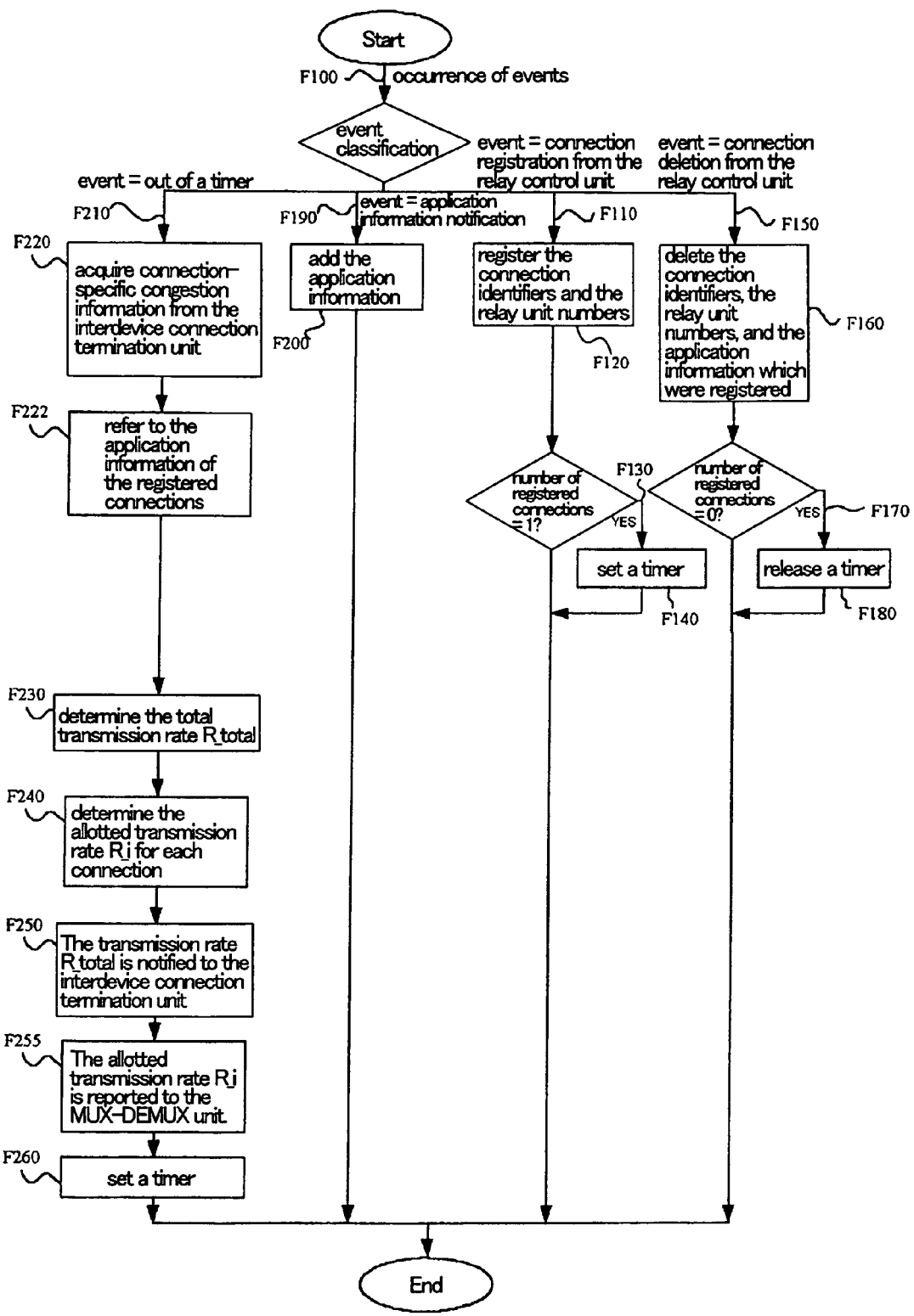
FIG. 11 is a flow chart of the operation of the rate control unit of the third embodiment of the present invention.

Explanation next regards the details of the operation of the transmission rate control units of the transport layer relay devices when data are transferred from a terminal in network N2 to a terminal in network N1 such as is shown by T1240-T1320 in FIG. 10 in the operations described in the foregoing explanation. FIG. 11 shows a flow chart of the operations of the transmission rate control unit. The transmission rate control unit is activated by the occurrence of an event such as any of: a timing-out of a timer, the registration or deletion of a relay unit from the relay control unit, or an application information notification from the application information analysis unit (F100).

When the event is a registration from the relay control unit (F110), the transmission rate control unit registers the connection identifiers and the relay unit numbers (F120), and if the number of registered connections is "1" (F130), sets a timer that times out after a time interval T (F140). When the event is a deletion from the relay control unit (F150), the transmission rate control unit deletes the connection identifiers, relay unit numbers, and application information (if application information exists) (F160), and if the number of registered connections is "0" (F170), releases the timer (F180). If the event is an application information notification from the application information analysis unit (F190), the transmission rate control unit adds the application information that relates to the connection identifiers to the registration information (F200). If the event is the timing-out of a timer (F210), the transmission rate control unit acquires connection-specific congestion information from the interdevice connection termination unit (F220). The transmission rate control unit also refers to the application information (the information that was added in F200) of connections that are currently registered (F222). The transmission rate control unit then uses the number of connections that are currently registered to determine the total transmission rate R_total (F230). As the determination method, a method such as the total transmission rate determination methods A3, B3, C3, D3, E3, and F3 that were described in the explanation of transmission rate control unit 3003 can be adopted. The transmission rate control unit next determines the transmission rate of each connection that is currently registered (F240). As the determination method, a method such as the transmission rate allotment methods 1, 2, and 3 that were described in the hexplanation of transmission rate control unit 3003 can be adopted. The total transmission rate R_total is next reported to the interdevice connection termination unit (F250). The transmission rates of each connection that were determined in F240 are further reported to the MUX-DEMUX unit (F255). Finally, the timer is set to T (F260).

Transport layer relay device E003 that is shown in FIG. 8 can establish relay connections with no more than one opposing transport layer relay device that has been determined in advance, but the following measures may be taken to enable the establishment of relay connections with a plurality of opposing transport layer relay devices.

Relay control unit 3001 is provided in transport layer relay device E003, and further, the set of relay units 3002-1-3002-$n$, transmission rate control unit 3003, interdevice connection termination unit 3004, and MUX-DEMUX unit 3005 is provided for each of a plurality of opposing transport layer relay devices.

Upon receiving a connection establishment request, relay control unit 3001, based on the content of a correspondence table and the IP address of the terminal that is the destination of connection establishment request that is contained in the connection establishment request, determines the transport layer relay device of the partner with which relay connections are to be established and sends a relay start request to the partner transport layer relay device that has been determined. At this time, relay control unit 3001 communicates the relay unit numbers of relay units that are unused and that are contained in the set that corresponds to the aforementioned partner's transport layer relay device that has been determined and thus determines the relay unit numbers of relay units that are to be used in this case. Relay control unit 3001 next registers the identification numbers of the relay units that have been determined and the connection identifiers of the connections in transmission rate control unit 3003 that belongs to the aforementioned set.

Relay control unit 3001 further registers the relay unit numbers that have been determined in MUX-DEMUX unit 3005 that belongs to the aforementioned set. Relay control unit 3001 further instructs the relay units of the relay unit numbers that have been determined to establish connections from the terminal. Relay control unit 3001 also instructs the interdevice connection termination unit that belongs to the aforementioned set to establish connections if transport layer connections (relay connections) for relay with the opposing transport layer relay device are not extended.

Relay control unit 3001, upon receiving a relay start request from a particular transport layer relay device among a plurality of opposing transport layer relay devices, communicates the relay unit numbers of relay units that are still unused and that belong to the set that corresponds to the aforementioned opposing transport layer relay device and thus determines the relay unit number that are to be used in this case. Relay control unit 3001 next registers the relay unit numbers that have been determined and the connection identifiers of the connections in transmission rate control unit 3003 that belongs to the aforementioned set. Relay control unit 3001 then registers the relay unit numbers that have been determined in MUX-DEMUX unit 3005 that belongs to the aforementioned set. Relay control unit 3001 further causes the relay units of the relay unit numbers that have been determined to establish connections with the terminal that is the destination of the connection establishment request based on the information of the connection establishment request that is contained in the relay start request.

Upon receiving a connection disconnected notification from a relay unit that belongs to a particular set, relay control unit 3001 supplies, to the relay control unit that corresponds to the set of the opposing transport layer relay device, a relay end request that contains the number of the relay unit that supplied the connection disconnected notification. Relay control unit 3001 further instructs MUX-DEMUX unit 3005 that belongs to the aforementioned set to delete the registration of the relay unit number of the relay unit that supplied the connection disconnected notification. Relay control unit 3001 further reports the relay unit number of the relay unit to transmission rate control unit 3003 that belongs to the aforementioned set and thus deletes the registration.

Relay control unit 3001, upon receiving a relay end request from a particular transport layer relay device among the plurality of opposing transport layer relay devices, instructs relay units of the relay unit numbers that are contained in the above-described relay end request and that belong to the set that corresponds to the aforementioned particular transport layer relay device to disconnect the connections with the terminal. Relay control unit 3001 further instructs MUX-DEMUX unit 3005 that belongs to the aforementioned set to delete the registration of the relay unit number of the relay unit that supplied the connection disconnected notification. Relay control unit 3001 further reports the relay unit number of the relay unit to transmission rate control unit 3003 that belongs to the aforementioned set and thus deletes the registration. When there are no relay units that are being used at this time, relay control unit 3001 instructs the interdevice connection termination unit to disconnect the connections.

Merits of the Third Embodiment of the Present Invention

As the first merit of the present invention that is obtained by the third embodiment of the present invention, a desired effective rate can be secured for a particular set of transport layer connections between a plurality of terminals, and this rate can be redistributed among this set of connections by arranging one transport layer relay device in each of network N1 and network N2. As a result, compared to the first method of the prior art in which a multiplicity of routers in network N3 are replaced by routers capable of bandwidth control, a reduction in equipment cost and a reduction of the trouble of replacement can be achieved. This merit is achieved because, if the transport layer protocol (for example, TCP) that carries cross-traffic implements congestion control when the traffic of relay connections and other traffic (cross-traffic) share the same bottleneck, the method of the present invention uses properties for regulating the transmission rate in accordance with the total transmission rate of the relay connections and secures a particular effective rate in accordance with the total transmission rate. In addition, the total transmission rate is used by dividing the total transmission rate among the connections that are being relayed, whereby, even if the transmission rate of the connections that are being relayed is lowered, the rate can be used as the transmission rate of other connections that are being relayed and the effective rate can be redistributed without the rate being taken over by cross-traffic.

The second merit of the present invention that is obtained by the third embodiment of the present invention is realized by using the total transmission rate determination methods A3-E3 in the transmission rate control unit to secure a desired effective rate for sets of transport layer connections, an effect that was not possible in the second and third examples of the prior art.

The third merit of the present invention that is obtained by the third embodiment of the present invention is realized by using the method of total transmission rate determination method F3 in the transmission rate control unit to obtain effective rates for a plurality of connections between terminals while conferring priorities to other traffic, an effect that was not possible in the second and third examples of the prior art.

The fourth merit of the present invention that is obtained by the third embodiment of the present invention is realized by using transmission rate allotment method 3 to enable redistribution of a particular effective rate to a particular set of transport layer connections between a plurality of terminals depending on information of applications that flows over the connections among the set of connections.

Fourth Embodiment of the Present Invention

Explanation of the Configuration of the Fourth Embodiment of the Present Invention Explanation next regards the details of the configuration of the fourth embodiment of the present invention with reference to the accompanying figures.

Figure 12:
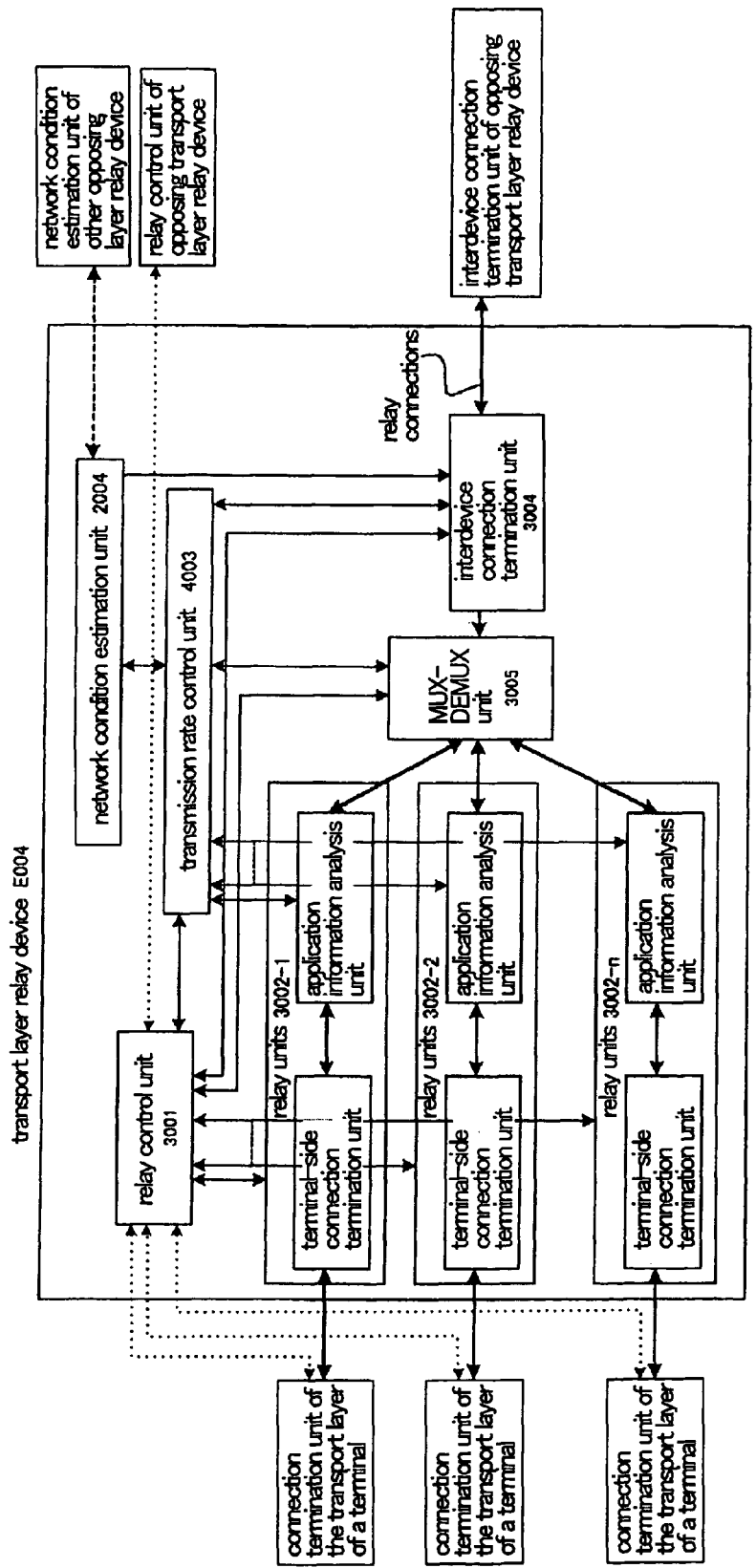
FIG. 12 shows the configuration of the transport layer relay device of the fourth embodiment of the present invention.

FIG. 12 is a block diagram of the interior of transport layer relay device E004 of the fourth embodiment of the present invention. Compared to transport layer relay device E003 of the third embodiment of the present invention, transport layer relay device E004 differs only in that network condition estimation unit 2004 is added and connected to transmission rate control unit 4003. The operations of relay control unit 3001, relay units 3002-1-3002-*n* and the terminal-side connection termination units and application information analysis units within the relay units, and MUX-DEMUX unit 3005 are all the same as the equivalent components of transport layer relay device E003 of the third embodiment of the present invention, and explanation of the operations of these components is therefore here omitted. In addition, the operation of network condition estimation unit 2004 is the same as the operation of network condition estimation unit 2004 of transport layer relay device E002 of the second embodiment of the present invention, and further explanation is therefore here omitted. The operation of interdevice connection termination unit 3004 is also similar to the operation of interdevice connection termination unit 3004 of transport layer relay device E003 of the third embodiment of the present invention, but when determining target window values, a value that is estimated by network condition estimation unit 2004 may be used as the value of the physical base station B of bottleneck links through which pass TCP connections that are terminated by interdevice connection termination unit.

Only transmission rate control unit 4003 is described in the following explanation. Transport layer relay device E004 can be realized by a computer.

When realized by a computer, a program for realizing relay control unit 3001, relay units 3002-1-3002-*n*, transmission rate control unit 4003, network condition estimation unit 2004, interdevice connection termination unit 3004, and MUX-DEMUX unit 3005 is recorded on a disk, a semiconductor memory, or another recording medium. This program is read by the computer, and through the control of the operations of the computer, relay control unit 3001, relay units 3002-1-3002-*n*, transmission rate control unit 4003, network condition estimation unit 2004, interdevice connection termination unit 3004, and MUX-DEMUX unit 3005 can be realized on the computer.

Transmission Rate Control Unit 4003:

Transmission rate control unit 4003 takes the total transmission rate of the connections that are currently being relayed as R_total, and allots this R_total to each of the relay connections. The method of determining the total transmission rate R_total may make this determination depending on the number of connections that are currently relayed, connection-specific congestion information from the interdevice connection termination unit, information from the application information analysis unit, and information from the network condition estimation unit; the following methods being examples.

Total Transmission Rate Determination Method A4

The total transmission rate is determined based on information that is obtained from network condition estimation unit 2004. As an example, it is assumed that the physical bandwidth Rb and available bandwidth Ra of a bottleneck are obtained from network condition estimation unit 2004. If the desired bandwidth R_target is smaller than the available bandwidth Ra of the bottleneck, R_total is determined as R_target·α, but if R_target is greater than Ra but less than Rb, R_total is determined to be R_target·β. The values of α and β are determined in advance and 1<α and 1<β.

Total Transmission Rate Determination Method B4

R_total is determined depending on the number of connections that are currently being relayed such that the desired bandwidth R_target corresponds to the number of connections that are currently being relayed. When a rate of R_o per connection is desired, R_target is determined as R_o*m based on the number of connections m that are currently registered by the relay control unit. If the desired bandwidth R_target is smaller than the available bandwidth Ra of the bottleneck, R_total is determined as R_target·α, but if R_target is greater than Ra but less than Rb, R_total is determined as R_target·β. The values of α and β are determined in advance such that 1<α and 1<β.

Total Transmission Rate Determination Method C4

The total transmission rate is determined using connection-specific congestion information from the interdevice connection termination unit and information from the network condition estimation unit. As an example, it is assumed that the total transmission rate is updated each time interval T, and that during the interval from time t−T to time t, each relay connection sends C packets and detects L instances of packet loss.

If C is less than C_threshold, the number of packets used in the measurement is insufficient and the accuracy of the packet loss rate will therefore be poor, and a packet loss rate is therefore taken as P that is obtained from the network condition estimation unit. The value of P is otherwise taken as L/C.

If it is assumed that the same congestion conditions continue, R_total is taken as R_target/(1−P) in order to attain the target rate (R_target). However, in order to avoid extreme congestion, a particular threshold value P_0 of packet loss rate is established and R_total is taken as R_target/(1−P_0) when P is greater than P_0.

Total Transmission Rate Determination Method D4

R_total is determined using connection-specific congestion information from each interdevice connection termination unit and information from network condition estimation unit 2004 such that the greatest possible bandwidth can be obtained. As an example, it is assumed that the total transmission rate is updated each time interval T and that during the interval from time t−T to time t, each relay connection sends C packets and L instances of packet loss are detected.

If C is less than C_threshold, the number of packets that is used in the measurement is insufficient and the accuracy of the packet loss rate will be poor, and the packet loss rate is therefore taken as P that is obtained from the network condition estimation unit. The value of P is otherwise taken as L/C.

A table is prepared in which the relation between transmission rates and the rates of actual arrival on the receiving side (=R_total*(1−P)) is found based on past transmission rates R_total and the data loss rates P at these times. It is assumed that the data for preparing this table are successively updated.

R_total is taken as the value of the transmission rate for which the rate of actual arrival on the receiving side reaches a maximum. However, if sufficient past transmission rates R_total have not been accumulated, R_total that has been set in advance is used.

Total Transmission Rate Determination Method E4

R_total is determined using information from the application information analysis unit such that a desired bandwidth R_target is obtained that corresponds to the application that is currently being relayed. As an example, when only streaming connections are being relayed, streaming rate information is obtained from the application information analysis unit, the total value of these rates is taken as R_target, and R_total is found in accordance with transmission rate determination method C4.

Total Transmission Rate Determination Method F4

R_total is also determined using the current number of connections m, connection-specific congestion information from the interdevice connection termination unit, and information from network condition estimation unit 2004. As an example, the RTT and the packet loss rate p of the network through which the relay connections pass that are obtained from connection-specific congestion information or the network condition estimation unit are used to estimate the transmission rate per TCP connection, and an a-multiple of this rate is then multiplied by m. As the method of estimating the transmission rate per TCP, a calculation equation that gives X may be used such as the "throughput equation" in section 3.1 of M. Handley, S. Floyd, J. Padhye, and J. Widmer, "TCP Friendly Rate Control (TFRC): Protocol Specification" (Internet Society, RFC 3448, January 2003). In other words, using connection-specific congestion information from the interdevice connection termination units and with the packet loss occurrence rate p, index average value R of RTT, estimated value t_RTO of the TCP time-out interval (for example, two times R), the average TCP packet size s (bytes) of the network of the relay connections (where s may be a value learned through experience), and b as "2," X is found from:

$$X = \frac{s}{R \cdot \sqrt{2 \cdot b \cdot p / 3} + \left(t\_RTO \cdot (3\sqrt{3 \cdot b \cdot p / 8} \cdot p \cdot (1 + 32 \cdot p^2))\right)} \text{(bit/sec)} \quad \text{[Equation 19]}$$

and R_total is determined to be m·α·X (bit/sec). If α is made greater than "1," the transmission rate per TCP can be made higher than for other traffic, and the priority of traffic that is relayed can be raised relative to other traffic.

Conversely, if α is set to less than "1," the transmission rate per TCP can be made lower than for other traffic, and the priority of traffic that is relayed can be lowered relative to other traffic.

R_total that has been determined in this way is allotted to each relay connection. This rate allotment may be determined depending on the number of current connections and information from the application information analysis unit, the following methods being examples that can be considered.

Transmission Rate Allotment Method 1

Rates are allotted equally to all connections. In other words, if there are m connections, a rate of R_total/m is allotted to each connection.

Transmission Rate Allotment Method 2

Rates are allotted in accordance with rules that have been determined depending on the port number information of the connection identifiers. As an example, priorities are conferred to each port number, and rates are allotted in accordance with these priorities.

Transmission Rate Allotment Method 3

Rates are determined depending on information from the application information analysis unit. As an example, when relaying a plurality of connections of an application that performs data transfer by HTTP connections, bandwidth allotment is performed that confers priorities depending on the value of the HTTP Content-type field that is obtained from the application information analysis unit. As another example, when relaying a plurality of connections of an application that acquires files by HTTP, higher bandwidth is allotted to connections that transfer data of shorter size depending on information of the HTTP Content-length field that is obtained from the application information analysis unit. As yet another example, a case is considered for relaying Ns streaming-type application connections and Nf file transfer-type application connections that use HTTP. Each streaming rate that is obtained from the application information analysis unit is RSi (i=1, . . . , Ns), and the file sizes of the file transfer-type connections that are obtained from the application information analysis unit is FLi (i=1, . . . , Ns). For the streaming-type connections, the streaming rates RSi (i=1, . . . , NsO) are allotted to connections having a lower rate than an equal rate (in which R_total is divided by the number of current connections Ns+Nf). The remaining rate:

$$\left( R\_total - \sum_{i=1}^{N_{SO}} RS_i \right)$$ [Equation 20]

is allotted with priority given to streaming connections that have not yet been allotted, and the still remaining rate is then allotted with higher rates being allotted in order to file transfer-type connections in which the file size is shorter.

Figure 13:
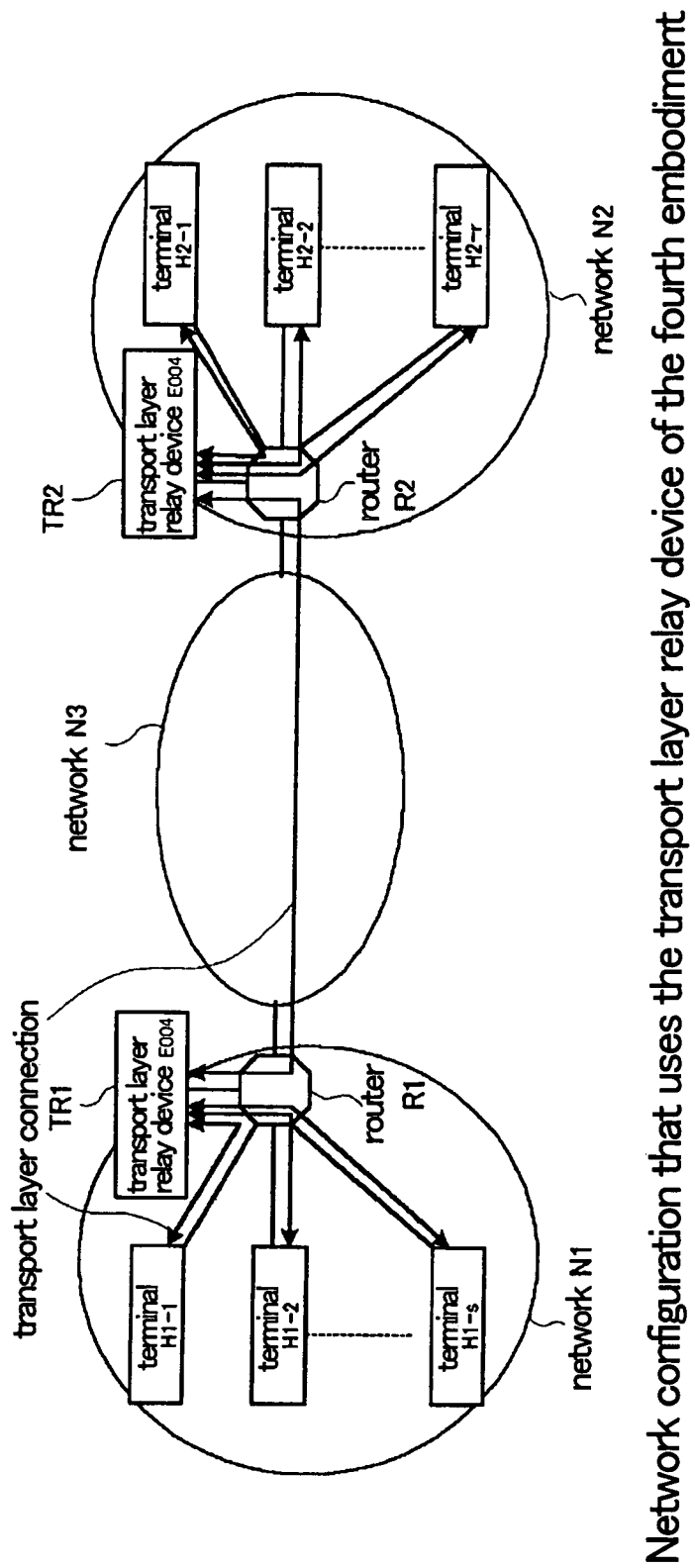
FIG. 13 shows a network configuration that uses the transport layer relay device of the fourth embodiment of the present invention.

Explanation of Operations the Following Explanation Regards the Operations of the Fourth Embodiment of the Present Invention FIG. 13 shows an example of the configuration of a network that uses transport layer relay device E004 according to the fourth embodiment of the present invention. Compared to FIG. 9 of the example of the network configuration that was used in the explanation of the third embodiment of the present invention, this configuration is identical with the exception of the replacement of transport layer relay device E003 by transport layer relay device E004 of the fourth embodiment of the present invention.

The operations for using transport layer relay devices TR1 and TR2 to start and end relay of communication between any terminal in network N1 and any terminal in network N2 are the same as the operations of the third embodiment that were explained using FIG. 10, and the explanation is therefore here omitted.

Figure 14:
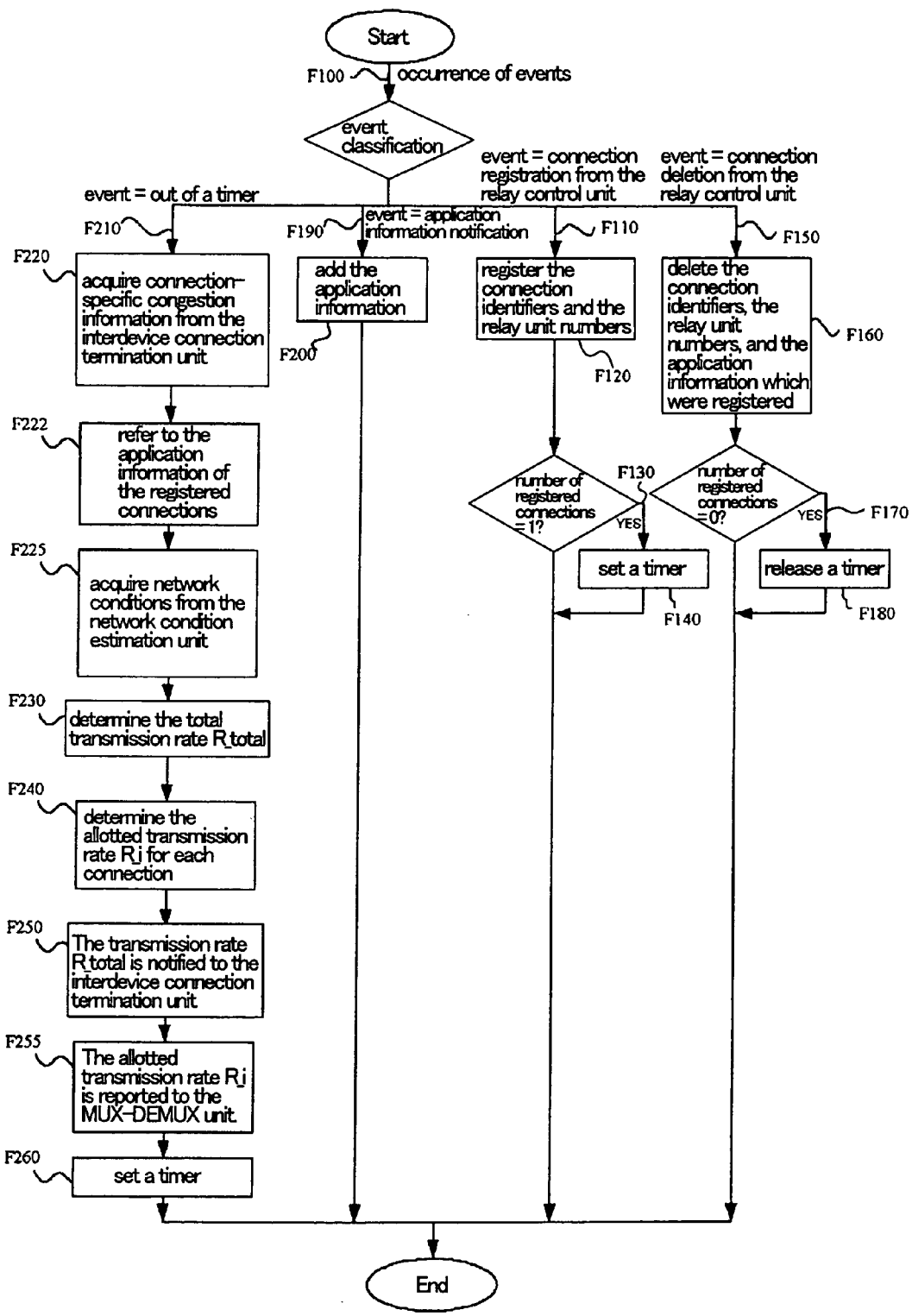
FIG. 14 is a flow chart of the operations of the rate control unit of the fourth embodiment of the present invention.

The following explanation regards the operations of the transmission rate control unit of a transport layer relay device when data are transferred from a terminal in network N2 to a terminal in network N1. FIG. 14 is a flow chart of the operations of the transmission rate control unit.

The transmission rate control unit is activated by the occurrence of any of events that include the timing out of a timer, the registration or deletion of a relay unit from the relay control unit, or the application information notification from an application information analysis unit (F100). When the event is a registration from the relay control unit (F110), the transmission rate control unit registers the connection identifiers and the relay unit numbers (F120), and if the number of registered connections is "1" (F130), sets a timer that times out after a time interval T (F140). When the event is a deletion from the relay control unit (F150), the transmission rate control unit deletes the connection identifiers, relay unit numbers, and application information (if application information exists) (F160), and if the number of registered connections is "0" (F170), releases the timer (F180). If the event is an application information notification from the application information analysis unit (F190), the transmission rate control unit adds the application information that relates to the connection identifiers to the registration information (F200). If the event is the timing-out of a timer (F210), the transmission rate control unit acquires connection-specific congestion information from the interdevice connection termination unit (F220). The transmission rate control unit also refers to the application information (the information that was added in F200) of connections that are currently registered (F222). The transmission rate control unit then acquires network conditions from the network condition estimation unit (F225) and also uses the number of connections that are currently registered to determine the total transmission rate R_total (F230). As the determination method, a method such as the total transmission rate determination methods A4, B4, C4, D4, E4, and F4 that were described in the explanation of transmission rate control unit 4003 can be adopted. The transmission rate control unit next determines the transmission rate of each connection that is currently registered (F240). As the determination method, a method such as the transmission rate allotment methods 1, 2, and 3 that were described in the explanation of transmission rate control unit 4003 can be adopted. The total transmission rate R_total is next reported to the interdevice connection termination unit (F250). The transmission rates of each connection that were determined in F240 are further reported to the MUX-DEMUX unit (F255). Finally, the timer is set to T (F260).

Merits of the Fourth Embodiment of the Present Invention

As the first merit of the present invention that is obtained by the fourth embodiment of the present invention, a desired effective rate can be secured for a particular set of transport layer connections between a plurality of terminals, and this bandwidth can be redistributed among this set of connections by arranging one transport layer relay device in each of network N1 and network N2. As a result, compared to the first method of the prior art in which a multiplicity of routers in network N3 are replaced by routers capable of bandwidth control, a reduction in equipment cost and a reduction of the trouble of replacement can be achieved. This merit is achieved because, if the transport layer protocol (for example, TCP) that carries cross-traffic implements congestion control when the traffic of relay connections and other traffic (cross-traffic) share the same bottleneck, the method of the present invention uses properties for regulating the transmission rate in accordance with the total transmission rate of the relay connections and secures a particular effective rate in accordance with the total transmission rate. In addition, the total transmission rate is used by dividing the total transmission rate among the connections that are being relayed, whereby, even if the transmission rate of particular connections that are being relayed is lowered, the rate can be used as the transmission rate of other connections that are being relayed and the effective rate can be redistributed without the rate being taken over by cross-traffic.

The second merit of the present invention that is obtained by the fourth embodiment of the present invention is realized by using the total transmission rate determination methods A4-E4 in the transmission rate control unit to allow a desired effective rate to be secured for sets of transport layer connections, an effect that was not possible in the second and third examples of the prior art, and moreover, relating to the method of determining this transmission rate, by combining the use of information of a network condition estimation unit to allow a desired effective rate to be secured at high accuracy.

The third merit of the present invention that is obtained by the fourth embodiment of the present invention is realized by using the method of total transmission rate determination method F4 in the transmission rate control unit to enable allotment of bandwidth to a plurality of connections between terminals while conferring priorities to other traffic, an effect that was not possible in the second and third examples of the prior art; and moreover, relating to the method of determining this transmission rate, by combining the use of information of a network condition estimation unit, to secure effective rates while conferring priorities at high accuracy.

The fifth merit of the present invention that is obtained by the fourth embodiment of the present invention is realized by using transmission rate allotment method 3 to enable redistribution of a particular effective rate to a particular set of transport layer connections between a plurality of terminals depending on information of applications that flows over the connections among the set of connections.

Fifth Embodiment of the Present Invention

Explanation of the Configuration of the Fifth Embodiment of the Present Invention The following explanation regards the details of the configuration of the fifth embodiment of the present invention with reference to the accompanying figures.

Figure 15:
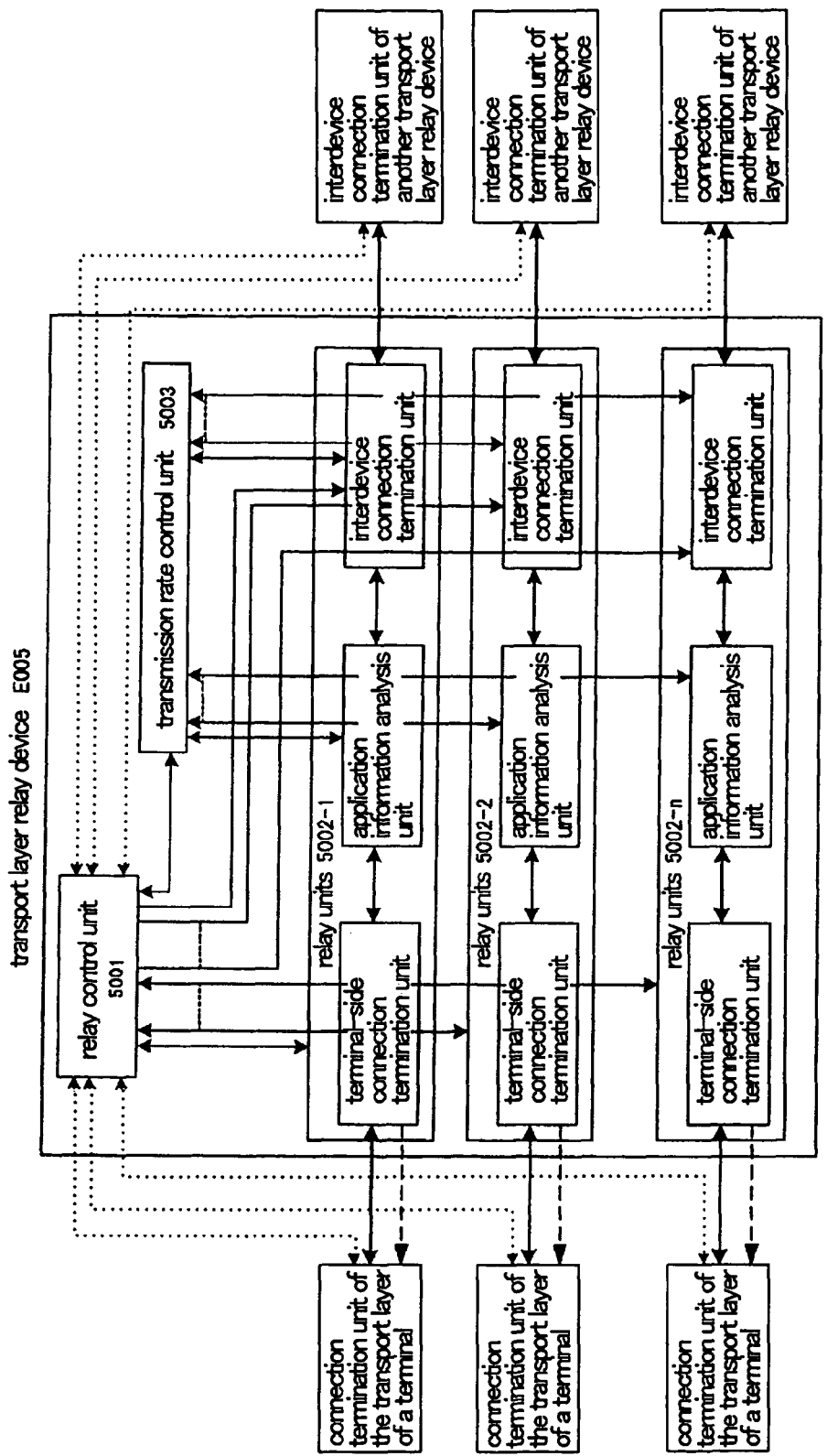
FIG. 15 shows the configuration of the transport layer relay device of the fifth embodiment of the present invention.

FIG. 15 is a block diagram of the interior of transport layer relay device E005 of the fifth embodiment of the present invention. Compared to transport layer relay device E001 of the first embodiment of the present invention, only the operations of transmission rate control unit 5003, relay control unit 5001, relay units 5002-1-5002-$n$, and the terminal-side connection termination units inside the relay units are changed. In addition, it is assumed that the transport layer connection termination units of the terminals, when given an initial transmission rate from the partner of a connection that is to be established when establishing a connection, begin transmission at that rate and subsequently transmits at a rate that accords with normal rate control (flow control and congestion control). Explanation will be limited to changed portions. In addition, transport layer relay device E005 can be realized by a computer. When realized by a computer, a program for realizing relay control unit 5001, relay units 5002-1-5002-$n$, and transmission rate control unit 5003 is recorded on a disk, a semiconductor memory, or another recording medium.

This program is read by the computer, and through the control of the operations of the computer, relay control unit 5001, relay units 5002-1-5002-$n$, and transmission rate control 5003 are realized on the computer.

Relay Control Unit 5001:

Relay control unit 5001 receives: connection establishment requests from connection termination units of the transport layer of terminals and relay requests from the interdevice connection termination unit of other transport layer relay devices and assigns one relay unit that is not currently in use in relay units 5002-1-5002-$n$. Relay control unit 5001 then registers the connection identifier of the connection that is assigned to the relay unit and the identification number (1-$n$) of the relay unit to transmission rate control unit 5003. At this time, relay control unit 5001 receives the optimum initial transmission rate value relating to this connection from transmission rate control unit 5003. Relay control unit 5001 both transfers this initial transmission rate value to the relay unit that was assigned in this case and causes a relay process of the transport layer connection to be carried out. A connection establishment request from a terminal includes a set of five items of information (referred to as a "connection identifier"): the IP address and port number of the terminal that is the source of the request for establishing a connection, the IP address and port number of the terminal that is the destination of the connection establishment request, and the identifier of the transport protocol that is to be used in the connection. A relay request contains both the connection identifier and information that is required for establishing a connection between transport layer relay devices (referred to as a "relay connection").

Relay control unit 5001 has a table (space management table) that shows whether each of relay units 5002-1-5002-$n$ is currently in use or not. Relay control unit 5001 manages which of the relay units are currently in use by setting the relevant relay unit in the space management table to "in use" after having received a connection establishment request or a relay request and assigning a relay unit and writing information identifying "not in use" after receiving a relay end notification from a relay unit. In addition, upon receiving a relay end notification from a relay unit, relay control unit 5001 instructs transmission rate control unit 5003 to delete the connection identifiers of the connections that are assigned to the relay unit and the identification number (1-$n$) of the relay unit.

Relay control unit 5001 further has a table (correspondence table) that shows the correlation between the IP address of a terminal that is the destination of an establishment request and the transport layer relay device that is to be the transmission destination of a relay request. After receiving a connection establishment request from a terminal, relay control unit 5001 acquires from the correspondence table information that indicates the transport layer relay device that corresponds to the IP address of the terminal that is the destination of the establishment request that is contained in the above-described connection establishment request and transfers the acquired information to the interdevice connection termination unit.

Relay Units 5002-1-5002-$n$:

Relay units 5002-1-5002-$n$ each contain: an application information analysis unit, a terminal-side connection termination unit, and an interdevice connection termination unit. The relay units: receive from the relay control unit (1) a connection establishment request from a connection termination unit of the transport layer of a terminal, or (2) a relay request from an interdevice connection termination unit of another transport layer relay device; and establish transport layer connections for relay with the terminal and with the other transport layer relay device, respectively. The following explanation regards the operations for the reception of (1) and (2).

Upon receiving from relay control unit 5001 (1) connection establishment request from a transport layer connection termination unit of a terminal, a relay unit causes the terminal-side connection termination unit to establish a transport layer connection with the terminal. At this time, the relay unit reports the initial transmission rate value that was transferred from relay control unit 5001 to the transport layer connection termination unit of the terminal. The terminal-side connection termination unit uses information of the terminal that is the destination of the establishment request (IP address, port number, and transport protocol identifier that is to be used in the connection) included in the connection establishment request to cause the terminal to see the same as if directly connected to the terminal that is the destination of the connection establishment request. The relay unit further instructs the interdevice connection termination unit to transmit a relay request to the relay control unit of the transport layer relay device (for example, transport layer relay device B) that is indicated by the information from relay control unit 5001 and establish a transport layer connection with the interdevice connection termination unit of transport layer relay device B.

Upon receiving from the relay control unit (2) a relay request from the interdevice connection termination unit of other transport layer relay devices (for example, device B), a relay unit causes the interdevice connection termination unit to establish a transport layer connection with the interdevice connection termination unit of device B. The relay unit further uses information of the connection identifier that is contained in the relay request to establish a transport layer connection between the terminal-side connection termination unit and the destination terminal of the establishment request. At this time, the relay unit reports the initial transmission rate value that was transferred from the relay control unit to the transport layer connection termination unit of the terminal. In addition, the terminal-side connection termination unit uses information of the terminal that is the source of the establishment request (the IP address, port number, and identifier of the transport protocol that is to be used in the connection) that is in the connection establishment request to cause the terminal to see as if directly connected to the terminal that is the source of the connection establishment request.

Upon receiving a connection-disconnected notification from the terminal-side connection termination unit, the relay unit causes the interdevice connection termination unit to disconnect the relay connection and sends a relay end notification to the relay control unit. Similarly, upon receiving a connection disconnected notification from the interdevice connection termination unit, the relay unit causes the terminal-side connection termination unit to disconnect the connection with the terminal that is the connection destination and sends a relay end notification to the relay control unit.

Terminal-side Connection Termination Unit:

The terminal-side connection termination unit has a transmission/reception buffer that is used in communication with terminals to which transport layer connections are extended, and carries out termination processing of transport layer connections. This termination processing of transport layer connections is carried out in accordance with the transport layer protocol that is used, but includes at least functions for establishing, maintaining, and ending transport layer connections as well as functions for flow control and congestion control.

The terminal-side connection termination unit establishes and disconnects connections with terminals in accordance with the instructions of relay units. In the event of a connection disconnect request from a terminal, the terminal-side connection termination unit disconnects the connection and then further sends a connection-disconnected notification to the relay unit. However, when establishing a connection with a terminal, the terminal-side connection termination unit communicates the initial transmission rate value that was transferred from the relay unit to the connection termination unit of the transport layer of the terminal.

During the time interval in which a connection is established with a terminal, the terminal-side connection termination unit both sends data in the transmission buffer to the terminal in accordance with the stipulations of the transport layer protocol and, in accordance with the stipulations of the transport layer protocol, receives data from the terminal and writes the data to the reception buffer. The terminal-side connection termination unit also receives data from the application information analysis unit that is connected, and writes the data to the transmission buffer. The terminal-side connection termination unit reads data from the reception buffer and transfers the data to the application information analysis unit that is connected.

Transmission Rate Control Unit 5003:

As with transmission rate control unit 1003 of the first embodiment of the present invention, transmission rate control unit 5003 takes the total transmission rate of connections that are currently being relayed as R_total, and divides and allots this rate to each relay connection. However, transmission rate control unit 5003 also carries out this allotment in the event of a request from the relay control unit to register a connection, and reports the transmission rate that has been allotted to that connection as the initial transmission rate to the relay control unit. The details of these operations are explained hereinbelow. Transmission rate control unit 5003 is otherwise the same as transmission rate control unit 1003 of the first embodiment of the present invention.

Explanation of Operations

The following explanation regards the operations of the fifth embodiment of the present invention with reference to the accompanying figures.

Figure 16:
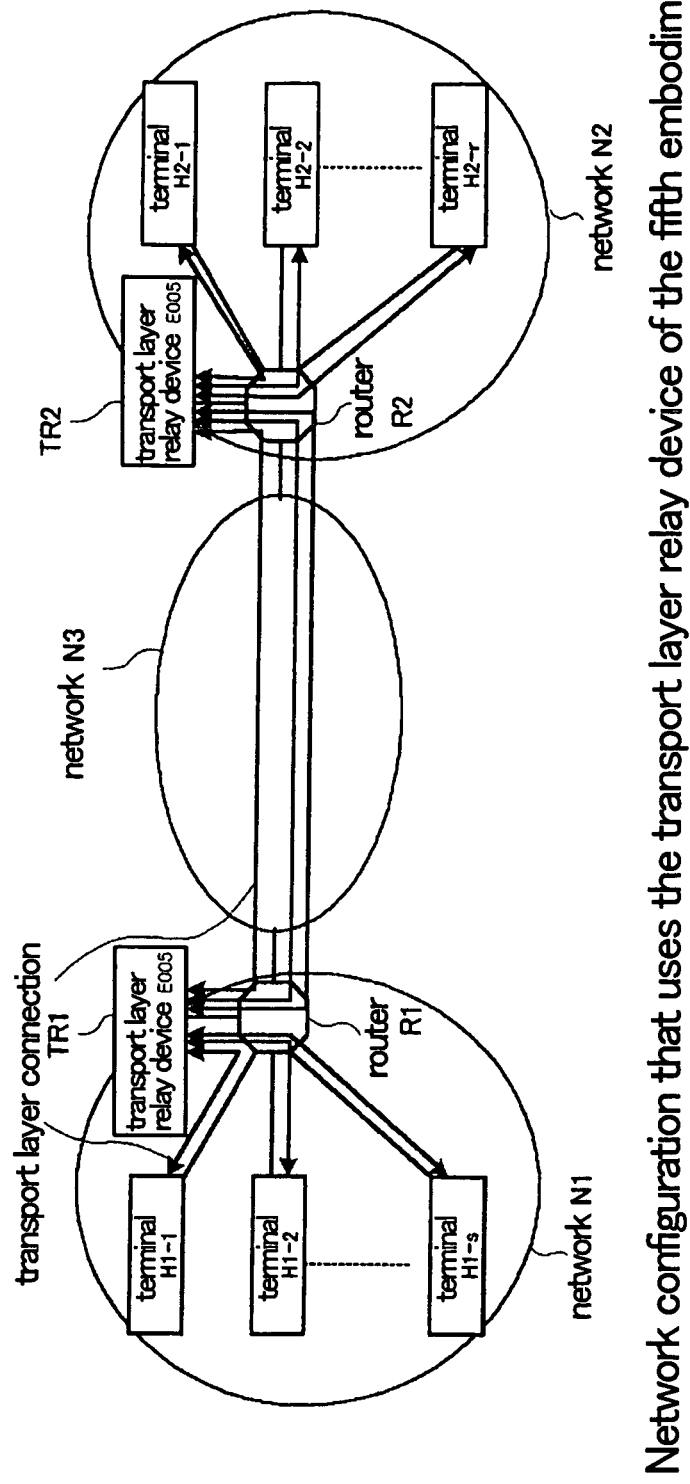
FIG. 16 shows a network configuration that uses the transport layer relay device of the fifth embodiment of the present invention.

FIG. 16 shows an example of the configuration of a communication network that uses transport layer relay device E005 of the fifth embodiment of the present invention. Compared with the network configuration shown in FIG. 2 that uses the first embodiment of the present invention, the configuration is the same with the exception that transport layer relay devices TR1 and TR2 were transport layer relay devices E001 of the first embodiment of the present invention in FIG. 2, but these are replaced by transport layer relay devices E005 of the fifth embodiment of the present invention.

Figure 17:
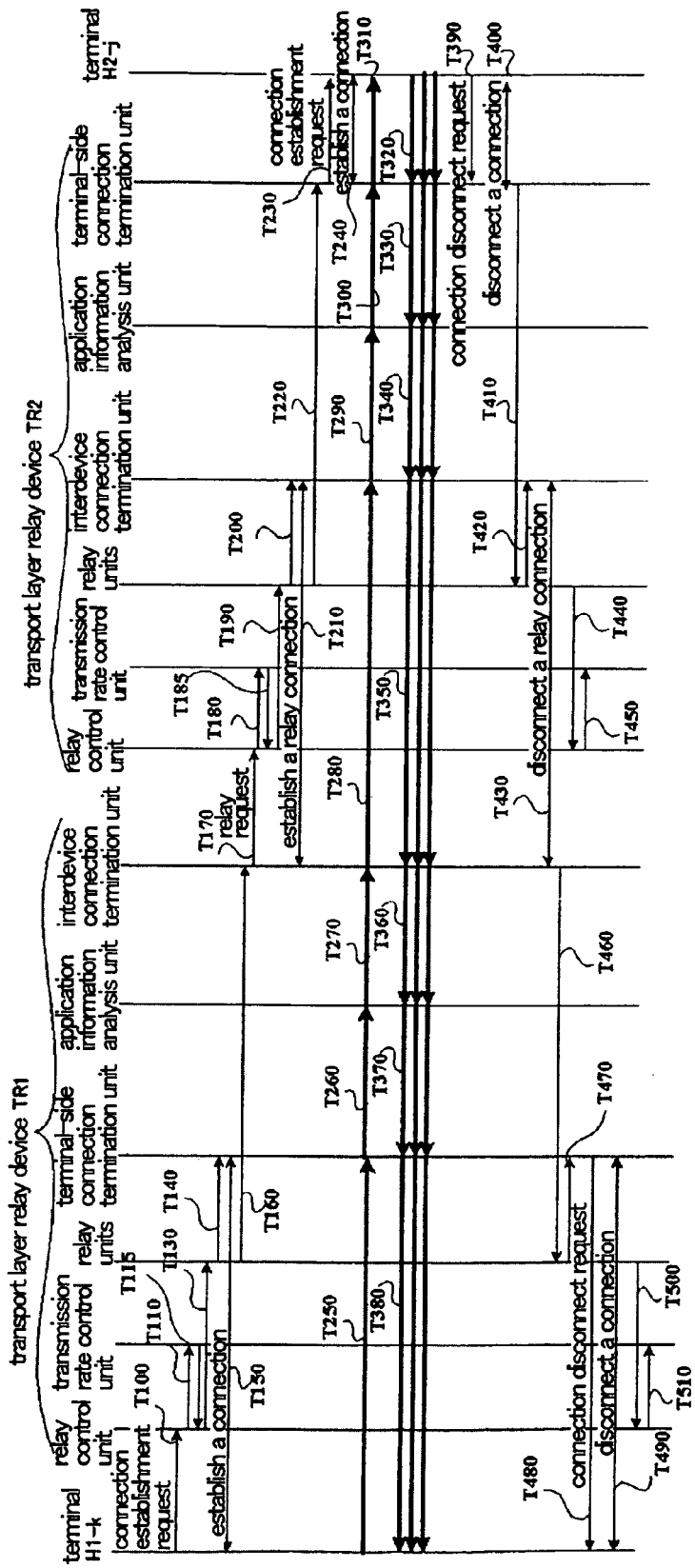
FIG. 17 is a timing chart of the relay operations of the transport layer relay device of the fifth embodiment of the present invention.

FIG. 17 shows the operations of transport layer relay devices E005 of the fifth embodiment that are arranged in network N1 and network N2 when communication is realized between terminal H1-$k$ in network N1 and terminal H2-$j$ in network N2. Because these operations are almost identical to the operations of the first embodiment of the present invention that was described using FIG. 3, only the differences will be explained. As the first difference: (1) after registration to the transmission rate control unit at T110, the initial transmission rate is received (T115) and reported to the relay unit at T130. In addition: (2) the relay unit reports the initial transmission rate to the terminal-side connection termination unit at T140. Still further: (3) the terminal-side connection termination unit communicates the initial transmission rate to terminal H1-$k$ when establishing the connection at T150. (4) At T180, after registration to the transmission rate control unit, the initial transmission rate is received (T185) and then communicated to relay units at T190. (5) The relay units communicate the initial transmission rate to the terminal-side connection termination unit at T220. (6) The terminal-side connection termination unit communicates this initial transmission rate to terminal H2-$j$ when establishing a connection at T240. Other than the above six points, the operations are completely identical. Because the operations are completely identical to the operations of the first embodiment of the present invention that were explained using FIG. 3, explanation is here omitted for operations other than these six points.

Figure 18:
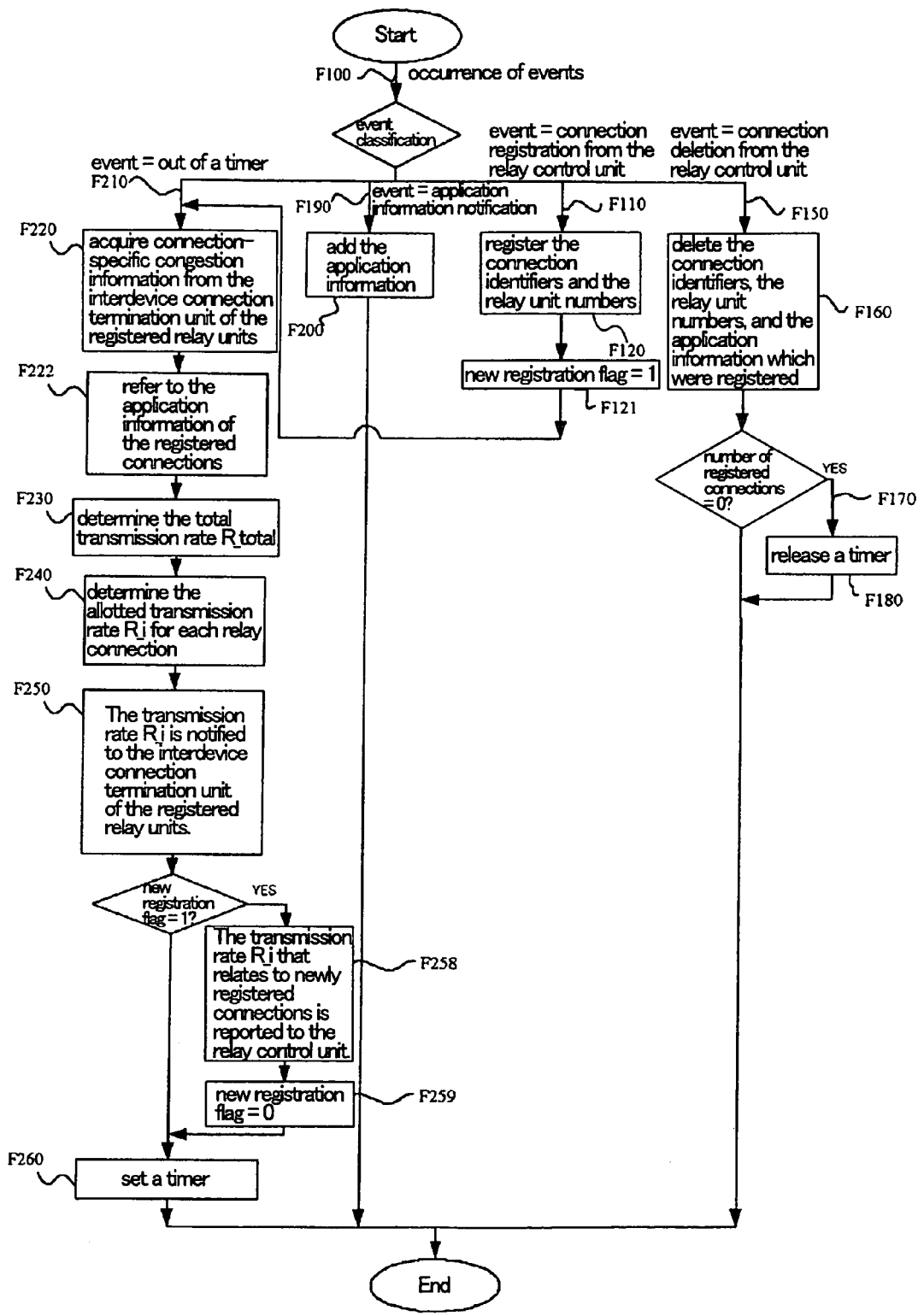
FIG. 18 is a flow chart of the operations of the rate control unit of the fifth embodiment of the present invention.

Points of difference regarding the operations of transmission rate control unit 5003 of transport layer relay device E005 will also be described. FIG. 18 shows a flow chart of the operations of transmission rate control unit. The transmission rate control unit is activated by the occurrence of any of various events including: the timing out of a timer, the registration or deletion of a relay unit from the relay control unit, or the application information notification from an application information analysis unit (F100). When the event is a registration from the relay control unit (F110), the transmission rate control unit registers the connection identifiers and relay unit numbers (F120), sets the new registration flag to "1," (F121) and proceeds to F220. If the event is the deletion from the relay control unit (F150), the transmission rate control unit deletes the connection identifiers, relay unit numbers, and application information (if application information exists) (F160) and if the number of registered connections is "0" (F170), releases the timer (F180). If the event is an application information notification from an application information analysis unit (F190), the transmission rate control unit adds the application information that relates to the connection identifiers to the registration information (F200). If the event is the timing-out of the timer (F210), the transmission rate control unit acquires connection-specific congestion information from the interdevice connection termination units of relay units that correspond to the relay unit numbers that have been registered (F220). The transmission rate control unit also refers to the application information (information that was added in F200) of the connections that are currently registered (F222). The transmission rate control unit then further uses the number of connections that are currently registered to determine the total transmission rate R_total (F230). As the method of this determination, any of total transmission rate determination methods A1, B1, C1, D1, E1, and F1 that were described in the explanation of transmission rate control unit 1003 can be adopted. The transmission rates of each connection that is currently registered are next determined (F240). As the method of this determination, a method such as transmission rate allotment methods 1, 2, and 3 that were described in the explanation of transmission rate control unit 1003 can be adopted. The transmission rates of each connection that are determined here are reported to the corresponding interdevice connection termination unit (F250). If the new registration flag is "1," the transmission rate R_i that relates to newly registered connections is reported to the relay control unit (F258), and the new registration flag is set to "0" (F259). Finally, the timer is set to T (F260).

Merits of the Fifth Embodiment of the Present Invention

As the merit of the invention that is obtained by the fifth embodiment of the present invention, in addition to the merits that were obtained by the first embodiment of the present invention, by giving information of the initial transmission rate at the time of establishing a connection with a terminal, the time interval required for a terminal to learn the conditions of the network can be shortened, thus enabling the efficient implementation of congestion control.

Sixth Embodiment of the Present Invention

Explanation of the Configuration of the Sixth Embodiment of the Present Invention Explanation next regards the details of the configuration of the sixth embodiment of the present invention with reference to the accompanying figures.

Figure 19:
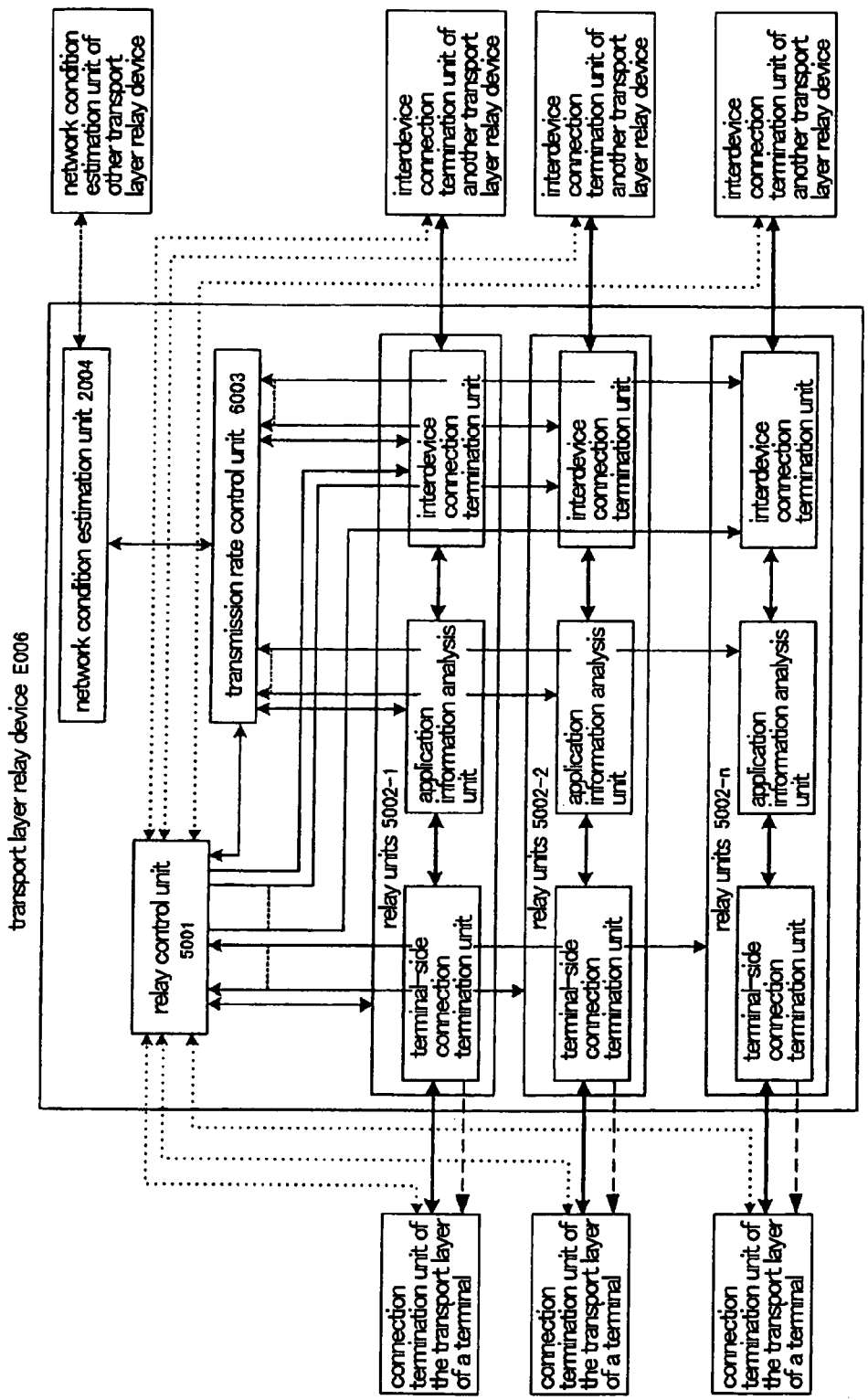
FIG. 19 shows the configuration of the transport layer relay device of the sixth embodiment of the present invention.

FIG. 19 is a block diagram of the interior of transport layer relay device E006 of the sixth embodiment of the present invention. Compared to the transport layer relay device E002 of the second embodiment of the present invention, transmission rate control unit 6003, relay control unit 5001, relay units 5002-1-5002-n, and the terminal-side connection termination units that are inside the relay units are substituted for the corresponding components of transport layer relay device E002. It is further assumed that when the transport layer connection termination unit of a terminal is supplied with the initial transmission rate from the partner of a connection establishment when establishing a connection, the transport layer connection termination unit begins transmission at this rate, and subsequently transmits at a rate that accords with normal rate control (flow control and congestion control). Because the operations of relay control unit 5001 and relay units 5002-1-5002-n were explained in the fifth embodiment of the present invention, only the operation of transmission rate control unit 6003 will be explained.

Transport layer relay device E006 can be realized by a computer. When realized by a computer, a program for realizing relay control unit 5001, relay units 5002-1-5002-n, transmission rate control unit 6003, and network condition estimation unit 2004 is recorded on a disk, a semiconductor memory, or other recording medium. This program is read by the computer, and through the control of the operations of the computer, relay control unit 5001, relay units 5002-1-5002-n, transmission rate control unit 6003, and network condition estimation unit 2004 are realized on the computer.

Transmission Rate Control Unit 6003:

As with transmission rate control unit 2003 of the second embodiment of the present invention, transmission rate control unit 6003 takes the total transmission rate of connections that are currently being relayed as R_total and allots this rate to each relay connection. However, this allotment is also carried out in the event of a request to register a connection from the relay control unit, and the transmission rate that is allotted to this connection is communicated to the relay control unit as the initial transmission rate. The details of this operation are described below. Transmission rate control unit 6003 is otherwise identical to transmission rate control unit 2003 of the second embodiment of the present invention.

Explanation of Operations

The following explanation regards the operation of the sixth embodiment of the present invention with reference to the accompanying drawings.

Figure 20:
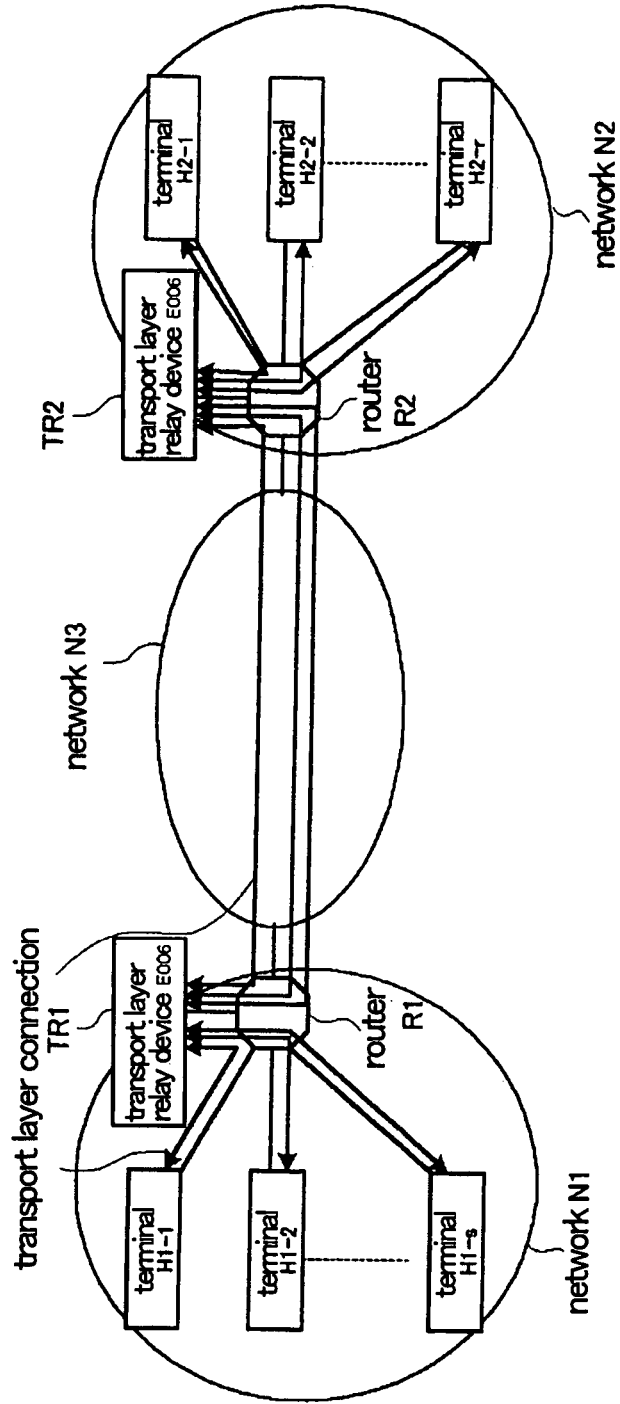
FIG. 20 shows a network configuration that uses the transport layer relay device of the sixth embodiment of the present invention.

FIG. 20 is an example of the configuration of a communication network that employs transport layer relay device E006 according to the sixth embodiment of the present invention. Compared with the figure of the network configuration that uses the second embodiment of the present invention shown in FIG. 6, the configuration is the same with the exception that transport layer relay devices TR1 and TR2 in FIG. 20, which were transport layer relay devices E002 of the second embodiment of the present invention, are replaced by transport layer relay devices E006 of the sixth embodiment of the present invention.

The operations that use transport layer relay devices TR1 and TR2 to begin and end relay of communication between any terminal in network N1 and any terminal in network N2 are identical to the operations of the fifth embodiment of the present invention that were described using FIG. 17, and explanation is therefore here omitted.

Figure 21:
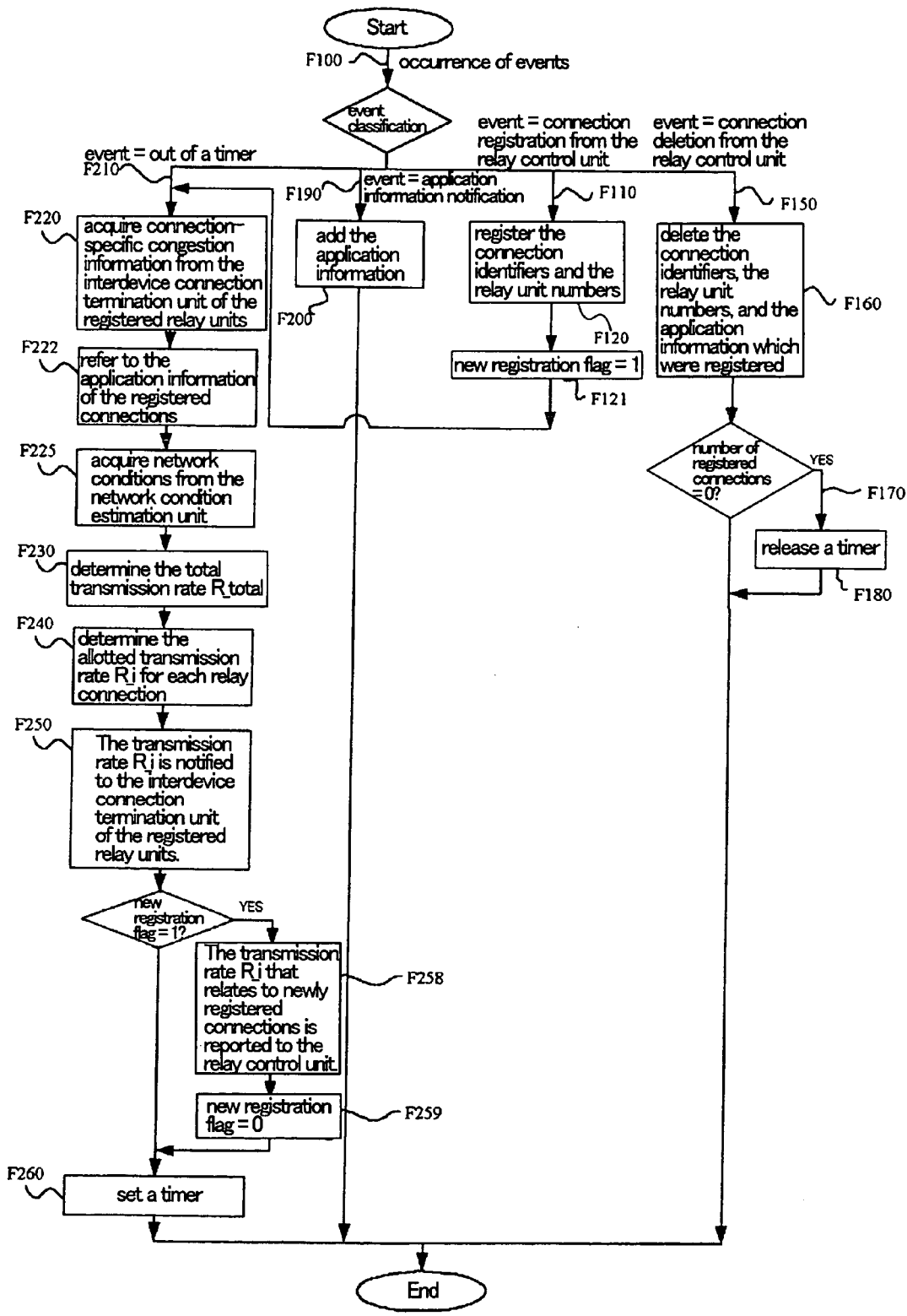
FIG. 21 is a flow chart of the operations of the rate control unit of the sixth embodiment of the present invention.

Explanation next regards points of difference regarding the operations of transmission rate control unit 6003 of transport layer relay device E006. FIG. 21 shows a flow chart of the operations of the transmission rate control unit. The transmission rate control unit is activated by any of various events that include the timing out of a timer, the registration or deletion of a relay unit from the relay control unit, and an application information notification from an application information analysis unit (F100). When the event is registration from the relay control unit (F110), the transmission rate control unit registers the connection identifiers and the relay unit numbers (F120), sets the new registration flag to "1," (F121) and proceeds to F220.

If the event is a deletion from the relay control unit (T150), the transmission rate control unit deletes the connection identifiers, the relay unit numbers, and the application information (if application information exists) (F160). If the number of registered connections is "0" (F170), the transmission rate control unit releases the timer (F180). If the event is an application information notification from an application information analysis unit (F190), the transmission rate control unit adds the application information relating to that connection identifier to the registered information (F200). If the event is the timing out of a timer (F210), the transmission rate control unit acquires connection-specific congestion information from the interdevice connection termination unit of the relay units that correspond to relay unit numbers that have been registered (F220). The transmission rate control unit further refers to application information (the information that was added at F200) of the connections that are currently registered (F222). The transmission rate control unit then acquires network conditions from the network condition estimation unit (F225), and further, using the number of connections that are currently registered, the transmission rate control unit determines the total transmission rate R_total (F230). As the method for this determination, a method can be adopted such as total transmission rate determination methods A2, B2, C2, D2, E2, and F2 that were described in the explanation of transmission rate control unit 2003. The transmission rate control unit next determines the transmission rate for each connection that is currently registered (F240). As the method for this determination, a method can be adopted such as Transmission Rate Allotment Methods 1, 2, and 3 that were described in the explanation of transmission rate control unit 2003. The transmission rate of each connection that is determined here is then notified to the corresponding interdevice connection termination unit (F250). If the new registration flag is "1," the transmission rate R_i that relates to newly registered connections is notified to the relay control unit (F258) and the new registration flag is set to "0" (F259). Finally, the transmission rate control unit sets the timer to T (F260).

Merits of the Sixth Embodiment of the Present Invention

The merits of the present invention that are obtained by the sixth embodiment of the present invention, in addition to the merits that are obtained by the second embodiment of the present invention, include the ability to shorten the time interval that is required for a terminal to learn the network conditions by providing information of the initial transmission rate when establishing a connection with a terminal, thereby enabling more efficient congestion control. Seventh Embodiment of the Present Invention

Explanation of the Configuration of the Seventh Embodiment of the Present Invention Explanation next regards the details of the configuration of the seventh embodiment of the present invention with reference to the accompanying figures.

Figure 22:
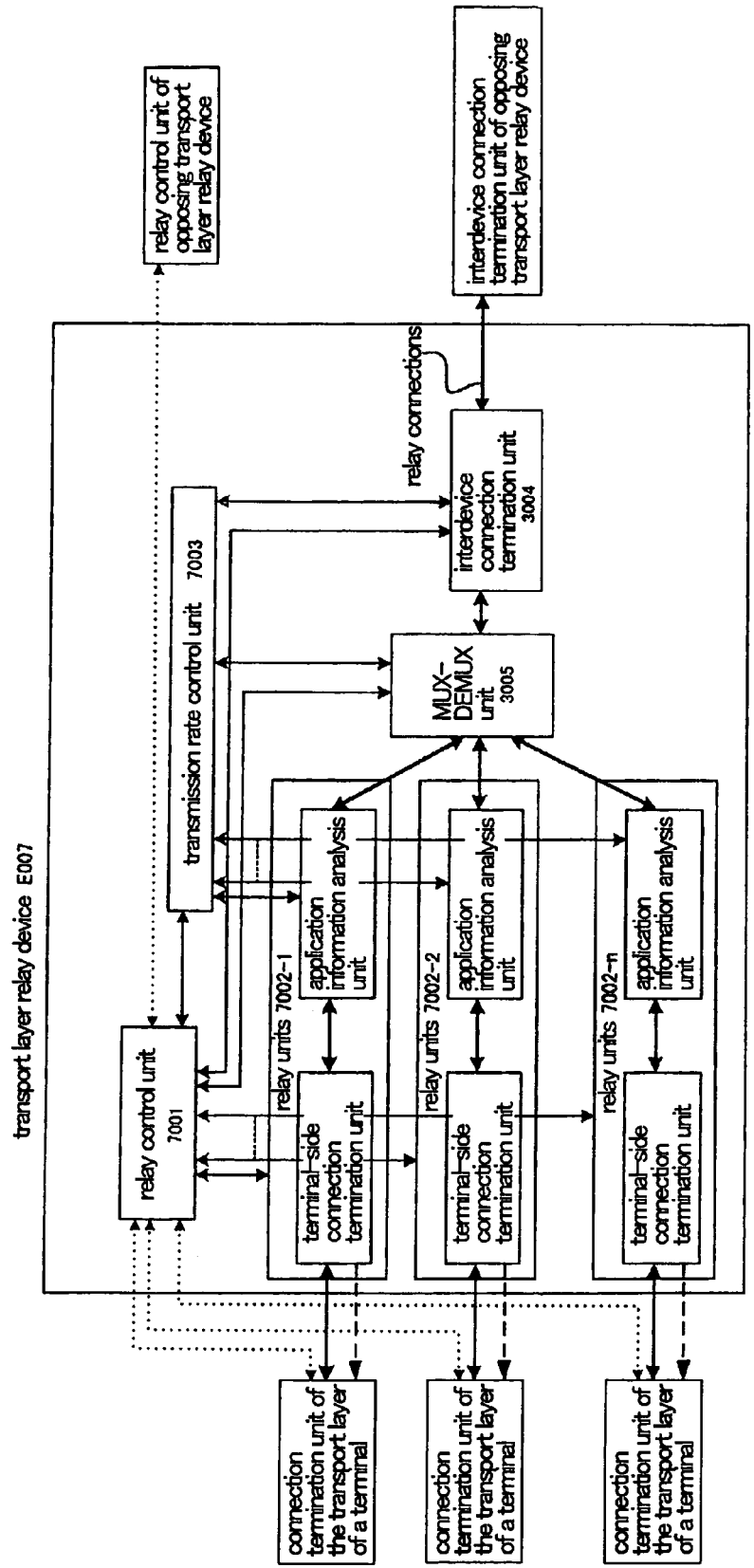
FIG. 22 shows the configuration of the transport layer relay device of the seventh embodiment of the present invention.

FIG. 22 is a block diagram of the interior of transport layer relay device E007 of the seventh embodiment of the present invention. Compared to transport layer relay device E003 of the third embodiment of the present invention, only the operations of transmission rate control unit 7003, relay control unit 7001, relay units 7002-1-7002-*n* and the terminal-side connection termination units that are inside the relay units have been changed. It is further assumed that the transport layer connection termination units of the terminals are provided with an initial transmission rate from the partner of a connection establishment when establishing a connection, begin transmission at this rate, and subsequently transmit at a rate that accords with the normal rate control (flow control and congestion control). Only the changed portions will be described. Transport layer relay device E007 can be realized by a computer. When realized by a computer, a program for realizing relay control unit 7001, relay units 7002-1-7002-*n*, transmission rate control unit 7003, interdevice connection termination unit 3004, and MUX-DEMUX unit 3005 is recorded on a disk, a semiconductor memory, or other recording medium. This program is read by the computer, and through the control of the operations of the computer, relay control unit 7001, relay units 7002-1-7002-*n*, transmission rate control unit 7003, interdevice connection termination unit 3004, and MUX-DEMUX unit 3005 are realized on the computer.

Relay Control Unit 7001:

Relay control unit 6001 receives connection establishment requests from the connection termination units of the transport layer of terminals, relay start requests from opposing transport layer relay devices E007, connection disconnected notifications from relay units, and relay end requests from opposing transport layer relay devices E007. The operations when receiving each of these requests and notifications is next described.

When Receiving a Connection Establishment Request from a Terminal:

A connection establishment request from a terminal includes a set of five items of information (referred to as a "connection identifier"): the IP address and port number of the terminal that is the source of the request to establish a connection, the IP address and port number of the terminal that is the destination of the connection establishment request, and an identifier of the transport protocol that is to be used in the connection. Relay control unit 7001, having received a connection establishment request, transmits to the relay control unit of the opposing transport layer relay device E007 a relay start request that contains the information of the connection establishment request. At this time, the relay control units communicate the numbers (1-*n*) of relay units (70021-7002-*n*) that are not being used and thus determine one relay unit number that is not being used on either side. The relay control unit next registers in transmission rate control unit 7003 the identification number (1-*n*) of relay unit that has been determined and the connection identifiers of connections. At this time, the relay control unit receives the optimum initial transmission rate value relating to these connections from transmission rate control unit 7003. The relay control unit then registers the relay unit number that has been determined in MUX-DEMUX unit 3005.

Relay control unit 6001 further transfers to relay units (70021-7002-*n*) of the relay unit numbers that have been determined the initial transmission rate value and instructs the relay units to establish connections from the terminal. Relay control unit 6001 further instructs interdevice connection termination unit 3004 to establish connections if transport layer connections (relay connections) for relay are not already extended to the opposing transport layer relay device.

When Receiving a Relay Start Request from Opposing Transport Layer Relay Device E007:

Upon receiving a relay start request from an opposing transport layer relay device E007, the relay control units exchange with each other the numbers (1-*n*) of relay units (70021-7002-*n*) that are not being used to determine one relay unit number that is not being used on either side. Relay control unit 6001 next registers in transmission rate control unit 7003 the identification number (1-*n*) of the relay unit that has been determined and the connection identifiers of connections. At this time, relay control unit 6001 receives from transmission rate control unit 7003 the optimum initial transmission rate value relating to these connections. Relay control unit 6001 then registers the relay unit number that has been determined in MUX-DEMUX unit 3005. Relay control unit 6001 further transfers the initial transmission rate value to the relay unit (70021-7002-*n*) of the relay unit number that has been determined and instructs the relay unit to establish connections with the terminal that is the destination of the connection establishment request based on the information of the connection establishment request that is contained in the relay start request.

When Receiving a Connection Disconnected Notification from a Relay Unit:

Relay control unit 6001 sends to the relay control unit of the opposing transport layer relay device E007 a relay end request that includes the number of the relay unit that supplied the connection disconnected notification. Relay control unit 6001 further instructs MUX-DEMUX unit 3005 to delete the registration of the relay unit number of the relay unit that supplied the connection disconnected notification. Finally, Relay control unit 6001 reports the relay unit number of the relay unit to transmission rate control unit 7003 and thus deletes the registration.

When Receiving a Relay End Request from an Opposing Transport Layer Relay Device E007:

Relay control unit 6001 instructs the relay unit of the relay unit number that is contained in the relay end request to disconnect the connection with the terminal. Relay control unit 6001 further instructs MUX-DEMUX unit 3005 to delete the registration of the relay unit number of the relay unit that supplied the connection disconnected notification. Relay control unit 6001 further reports the relay unit number of the relay unit to transmission rate control unit 7003 and thus deletes the registration. If there are no relay units that are being used at this time, relay control unit 6001 instructs the interdevice connection termination unit to disconnect the connection.

Relay control unit 6001 has a table (space management table) showing whether each of relay units 70021-7002-*n* are currently being used or not, and upon receiving a connection establishment request from a terminal or a relay request of a relay start request from an opposing transport layer relay device E007, assigns relay units and sets the relevant relay unit in the space management table to "in use"; and upon receiving a connection disconnected notification from a relay unit or a relay end request from an opposing transport layer relay device E007, writes information identifying the relay unit as "not in use"; and thus manages which of the relay units is currently in use.

Relay Units 70021-7002-*n*

Relay units 70021-7002-*n* each contain a terminal-side connection termination unit and an application information analysis unit. In accordance with instructions from relay control unit 7001, the relay units each cause the terminal-side connection termination units to either establish transport layer connections with terminals or disconnect connections with terminals. When establishing a connection, the relay units communicate the initial transmission rate value that has been transferred from relay control unit 6001 to the transport layer connection termination unit of the terminal.

Terminal-side Connection Termination Unit:

The terminal-side connection termination unit has a transmission/reception buffer that is used in communication with terminals with which transport layer connections have been extended and carries out termination for transport layer connections. This termination processing for transport layer connections is carried out in accordance with the transport layer protocol that is used, and includes at least functions for establishing, maintaining, and ending transport layer connections as well as capabilities for flow control and congestion control. The terminal-side connection termination unit establishes and disconnects connections with terminals in accordance with the instructions of the relay unit. In addition, in the event of a connection disconnect request from a terminal, the terminal-side connection termination unit disconnects the connection and then sends a connection-disconnected notification to the relay unit. However, when establishing a connection with a terminal, the terminal-side connection termination unit communicates the initial transmission rate value that has been transferred from the relay unit to the transport layer connection termination unit of the terminal.

During the interval in which a connection is established with a terminal, a terminal-side connection termination unit both sends data in the transmission buffer to the terminal in accordance with the stipulations of the transport layer protocol, and in accordance with the stipulations of the transport layer protocol, receives data from the terminal and writes the data to the reception buffer. The terminal-side connection termination unit also receives data from the application information analysis unit that is connected and writes the data to the transmission buffer. The terminal-side connection termination unit further reads data from the reception buffer and transfers the data to the application information analysis unit that is connected.

Transmission Rate Control Unit 7003:

Transmission rate control unit 7003 takes the total transmission rate of connections that are currently being relayed as R_total, and this R_total is the transmission rate of the relay connections. The allotment is also carried out in the event of a request for connection registration from the relay control unit, and the transmission rate that is allotted to this connection is communicated to the relay control unit as the initial transmission rate. The details of this operation are described below. The operations of transmission rate control unit 7003 are otherwise the same as transmission rate control unit 3003 of the third embodiment of the present invention.

Explanation of Operations

The following explanation regards the details of the operations of the seventh embodiment of the present invention with reference to the accompanying figures.

Figure 23:
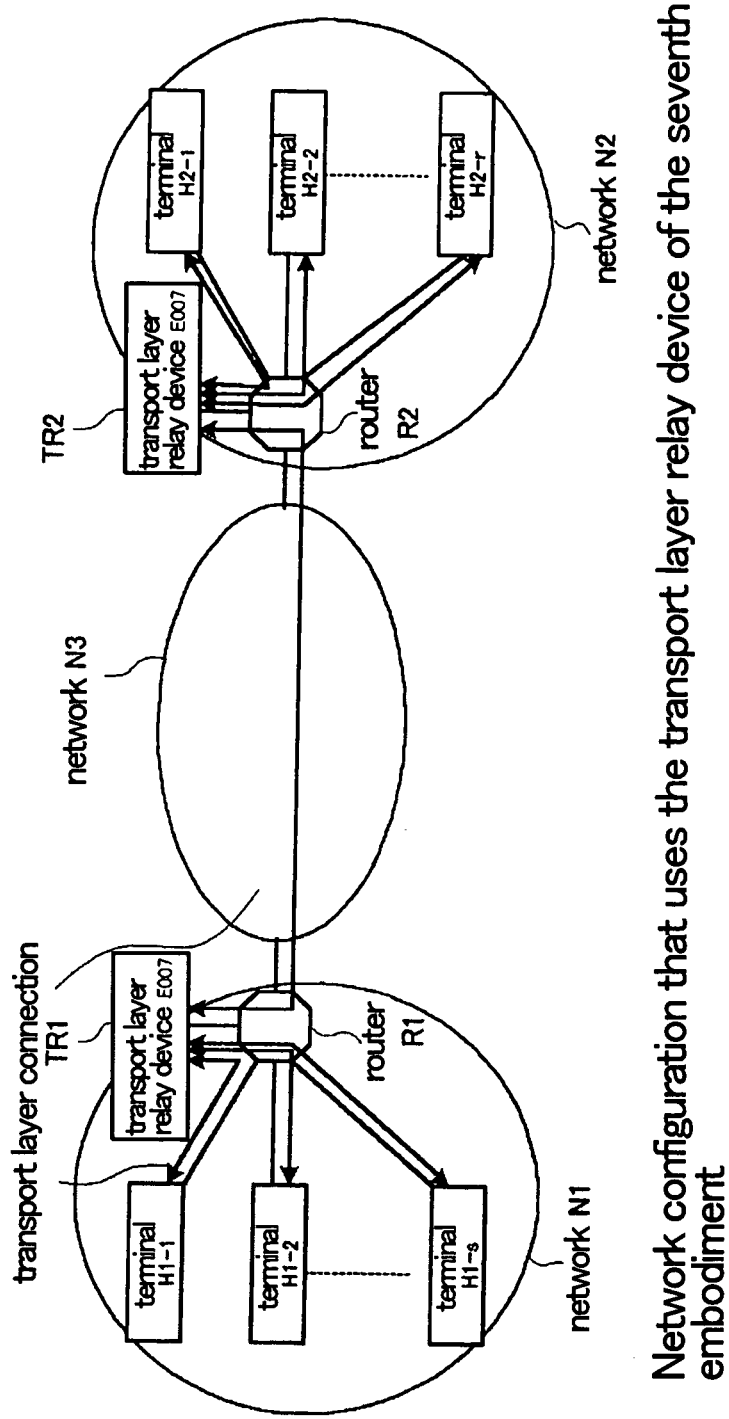
FIG. 23 shows a network configuration that uses the transport layer relay device of the seventh embodiment of the present invention.

FIG. 23 shows an example of the configuration of a communication network that uses transport layer relay devices E007 according to the seventh embodiment of the present invention. Compared with the network configuration of FIG. 9 that used the third embodiment of the present invention, the network configuration is identical with the exception that transport layer relay devices E003 of the third embodiment of the present invention that served as transport layer relay devices TR1 and TR2 in FIG. 9 are replaced by transport layer relay devices E007 of the seventh embodiment of the present invention.

Figure 24:
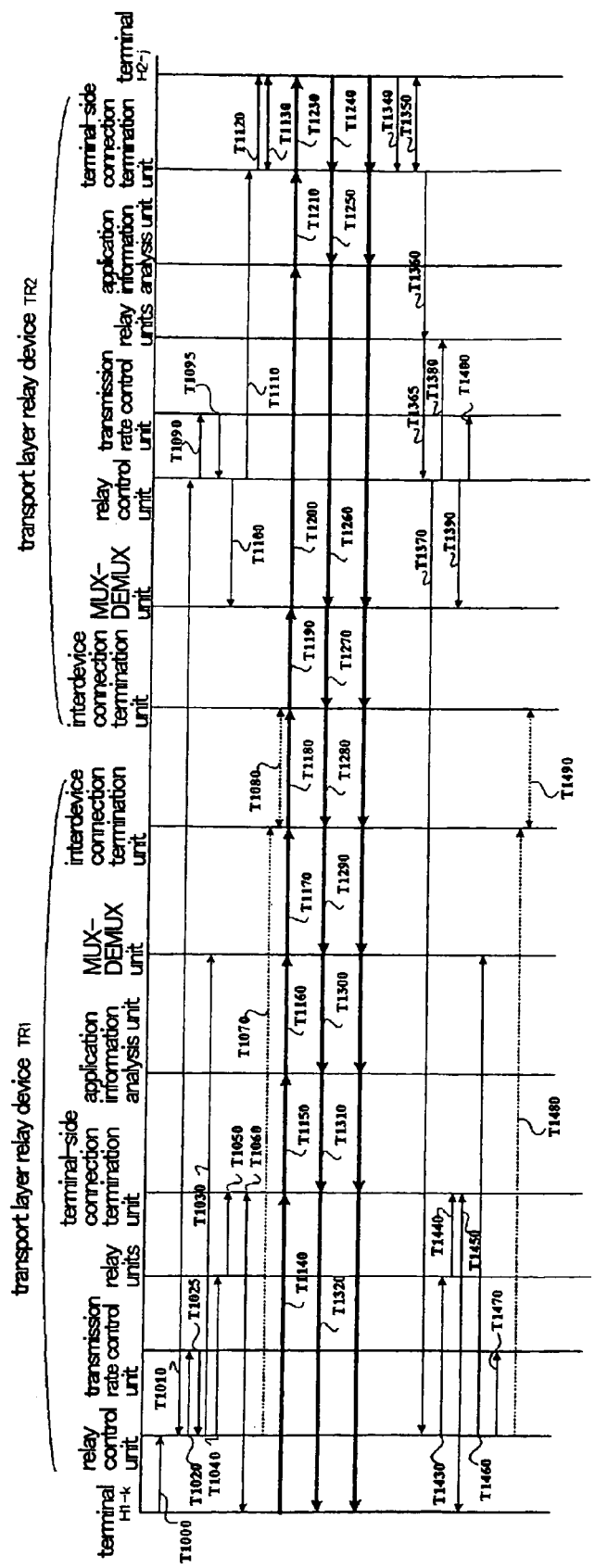
FIG. 24 is a timing chart of the relay operations of the transport layer relay device of the seventh embodiment of the present invention.

FIG. 24 shows the operations of transport layer relay devices E007 of the seventh embodiment that are arranged in network N1 and network N2 when performing communication between terminal H1-k in network N1 and terminal H2-j in network N2. Because these operations are nearly identical to the operations of the third embodiment of the present invention that were described using FIG. 10, only the difference will be explained.

As the differences: (1) After registration to the transmission rate control unit at T1020, the relay control unit receives the initial transmission rate (T1025) and communicates this initial transmission rate to the relay unit at T1040. (2) The relay unit communicates this initial transmission rate to the terminal-side connection termination unit at T1050. (3) The terminal-side connection termination unit communicates this initial transmission rate to terminal H1-k when establishing a connection at T1060. (4) After registering to the transmission rate control unit at T1090, the relay control unit receives the initial transmission rate (T1095) and then communicates the initial transmission rate to the relay unit at T1110. (5) The relay unit communicates the initial transmission rate to the terminal-side connection termination unit at T1120. (6) The terminal-side connection termination unit communicates this initial transmission rate to terminal H2-j when establishing a connection at T1130.

Apart from the above-described six points, the operations are completely identical. Because the operations are completely identical to the operations of the third embodiment of the present invention that were described using FIG. 10 with the exception of these six points, redundant explanation is here omitted.

Figure 25:
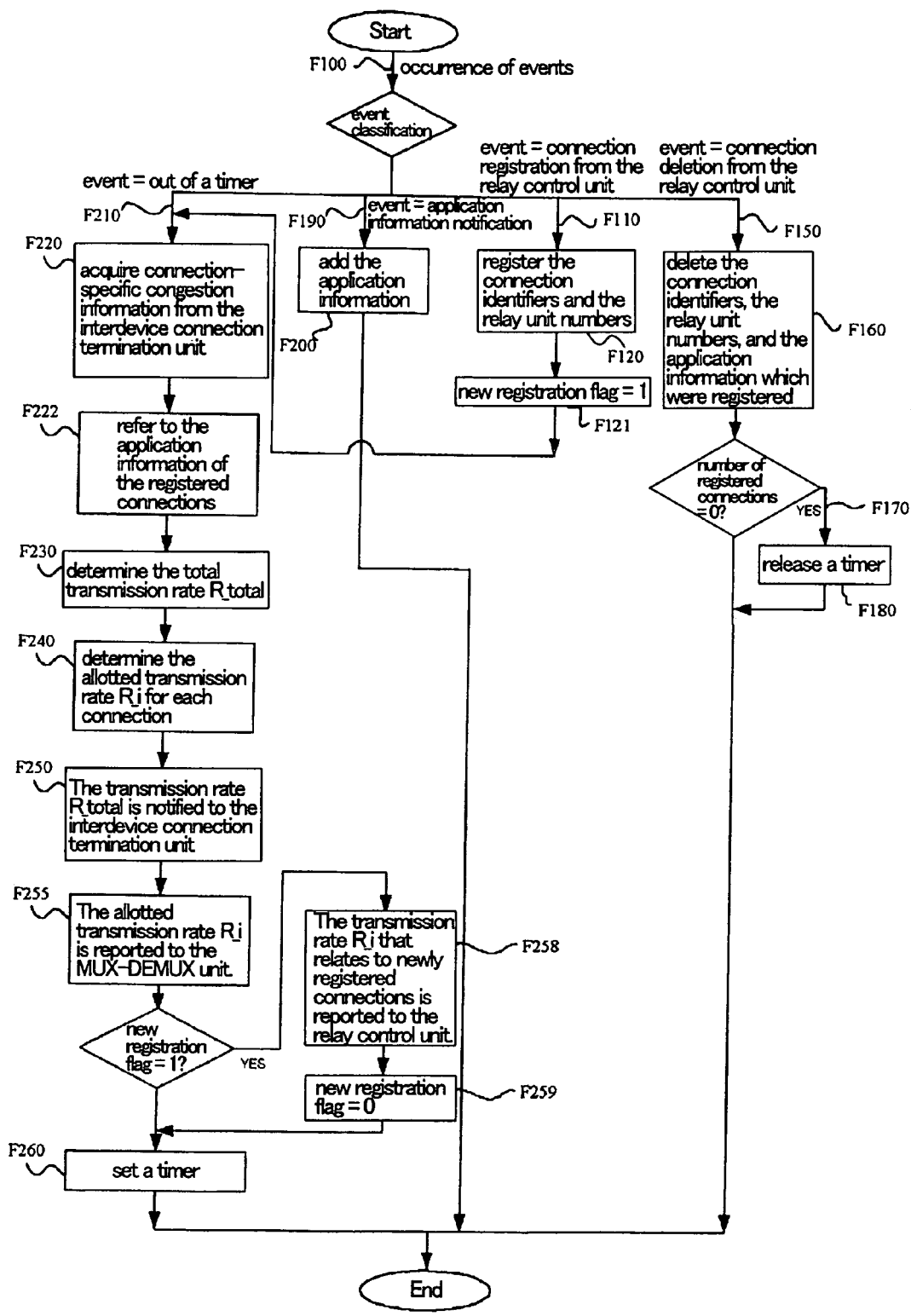
FIG. 25 is a flow chart of the operations of the rate control unit of the seventh embodiment of the present invention.

Explanation next regards the points that have been altered regarding the operation of transmission rate control unit 7003 of the transport layer relay device. FIG. 25 shows a flow chart of the operations of transmission rate control unit 7003. The transmission rate control unit is activated by the occurrence of an event such as any of: a timing-out of a timer, the registration or deletion of a relay unit from the relay control unit, or an application information notification from an application information analysis unit (F100). When the event is a registration from the relay control unit (F110), the transmission rate control unit registers the connection identifiers and the relay unit numbers (F120), sets the new registration flag to "1" (F121), and proceeds to F220. When the event is a deletion from the relay control unit (T150), the transmission rate control unit deletes the connection identifiers, relay unit numbers, and application information (if application information exists) (T160), and if the number of registered connections is "0" (F170), releases the timer (F180). If the event is an application information notification from an application information analysis unit (F190), the transmission rate control unit adds the application information that relates to the connection identifiers to the registration information (F200). If the event is the timing-out of a timer (F210), the transmission rate control unit acquires connection-specific congestion information from the interdevice connection termination unit (F220). The transmission rate control unit also refers to the application information (the information that was added in F200) of connections that are currently registered (F222). The transmission rate control unit then further uses the number of connections that are currently registered to determine the total transmission rate R_total (F230). As the determination method, a method such as the total transmission rate determination methods A3, B3, C3, D3, E3, and F3 that were described in the explanation of transmission rate control unit 3003 can be adopted. The transmission rate control unit next determines the transmission rate of each connection that is currently registered (F240). As the determination method, a method such as the transmission rate allotment methods 1, 2, and 3 that were described in the explanation of transmission rate control unit 3003 can be adopted. The total transmission rate R_total is next reported to the interdevice connection termination unit (F250). The transmission rates of each connection that were determined in F240 are further reported to the MUX-DEMUX unit (F255). If the new registration flag is "1," the transmission rate R_i that relates to newly registered connections is reported to the relay control unit (F258) and the new registration flag is set to "0" (F259). Finally, the timer is set to T (F260).

Transport layer relay device E007 that is shown in FIG. 22 is capable of establishing relay connections with no more than one predetermined opposing transport layer relay device, but to enable the establishment of relay connections with a plurality of opposing transport layer relay devices, a set of: relay units 70021-7002-n, transmission rate control unit 7003, interdevice connection termination unit 3004, and MUX-DEMUX unit 3005 may be provided in transport layer relay devices E007 for each of a plurality of opposing transport layer relay devices as explained in the third embodiment and the same operations as in relay control unit 3001 may be carried out in relay control unit 7001.

Merits of the Seventh Embodiment of the Present Invention

The merits of the present invention that are obtained by the seventh embodiment of the present invention, in addition to the merits that are obtained by the third embodiment of the present invention, include the ability to shorten the time interval that is required for a terminal to learn the network conditions by providing information of the initial transmission rate when establishing a connection with a terminal, thereby enabling more efficient congestion control.

Eighth Embodiment of the Present Invention

Explanation of the Configuration of the Eighth Embodiment of the Present Invention Explanation next regards the eighth embodiment of the present invention with reference to the accompanying figures.

Figure 26:
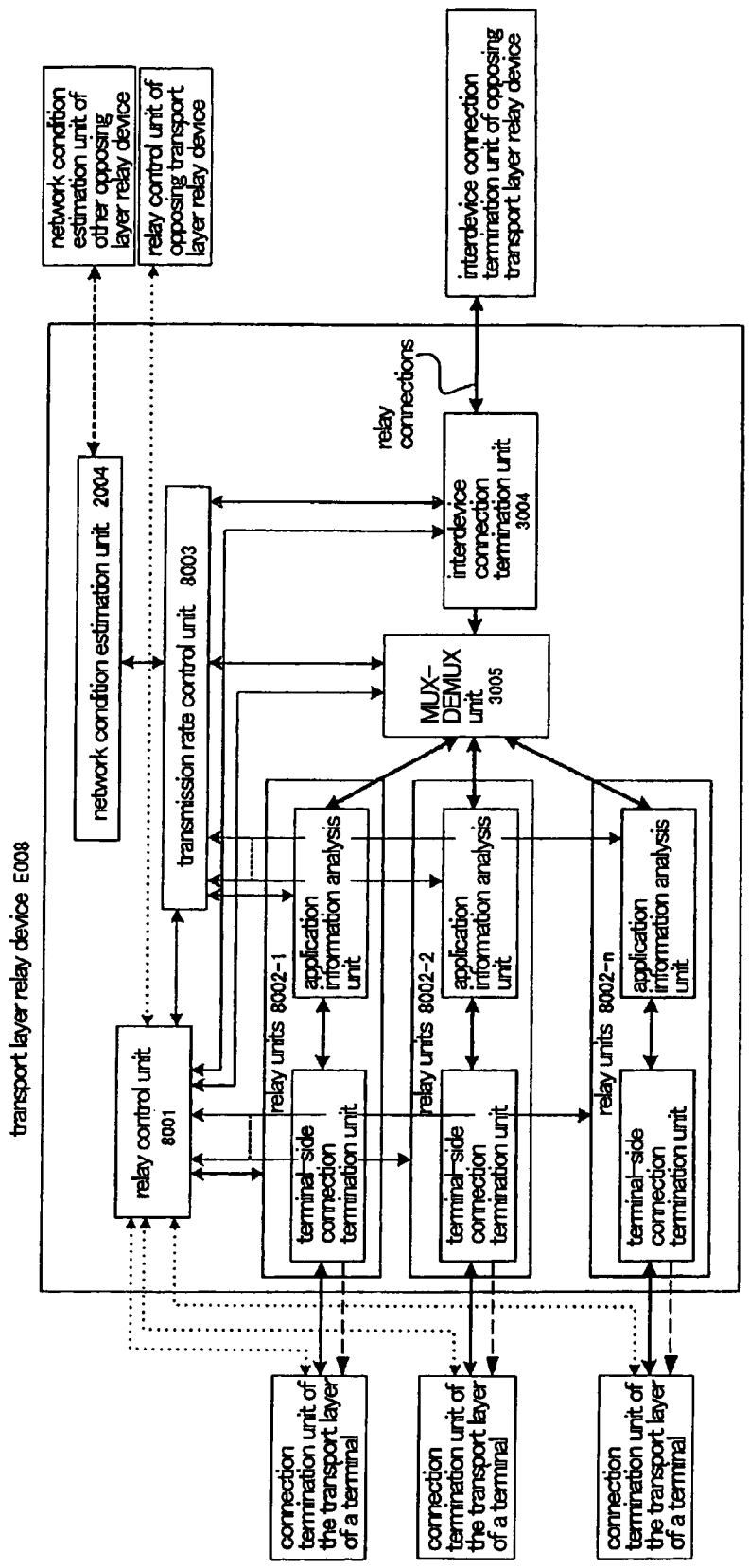
FIG. 26 shows the configuration of the transport layer relay device of the eighth embodiment of the present invention.

FIG. 26 is a block diagram of the interior of transport layer relay device E008 of the eighth embodiment of the present invention. Compared to transport layer relay device E004 of the fourth embodiment of the present invention, transmission rate control unit 8003, relay control unit 8001, relay units 8002-1-8002-n, and the terminal-side connection termination units that are inside the relay units replace the corresponding components of the fourth embodiment. It is further assumed that when the transport layer connection termination unit of a terminal is provided with the initial transmission rate from the partner of connection establishment at the time of establishing a connection, it begins transmission at this rate and subsequently performs transmission at a rate that accords with normal rate control (flow control and congestion control). The operations of relay control unit 8001 and relay units 8002-1-8002-n are the same as relay control unit 6001 and relay units 70021-7002-n that were explained in the seventh embodiment of the present invention, and explanation is therefore limited to transmission rate control unit 8003. Transport layer relay device E008 can be realized by a computer. When realized by a computer, a program for realizing relay control unit 8001, relay units 80021-8002-n, transmission rate control unit 8003, interdevice connection termination unit 3004, MUX-DEMUX unit 3005 and network condition estimation unit 2004 is recorded on a disk, a semiconductor memory, or other recording medium. This program is read by the computer, and through the control of the operations of the computer, realizes relay control unit 8001, relay units 8002-1-8002-n, transmission rate control unit 8003, interdevice connection termination unit 3004, MUX-DEMUX unit 3005 and network condition estimation unit 2004 on the computer.

Transmission Rate Control Unit 8003:

Transmission rate control unit 8003 takes the total transmission rate of the connections that are currently being relayed as R_total, and takes this R_total as the transmission rate of the relay connections. However, transmission rate control unit 8003 also makes the allotment in the event of a request to register a connection from relay control unit 8001 and communicates the transmission rate that is allotted to the connection to relay control unit 8001 as the initial transmission rate. The details of this operation are described below. The operation of transmission rate control unit 8003 is otherwise the same as transmission rate control unit 4003 of the fourth embodiment of the present invention.

Explanation of Operations

The following explanation regards the operations of the eighth embodiment of the present invention with reference to the accompanying figures.

Figure 27:
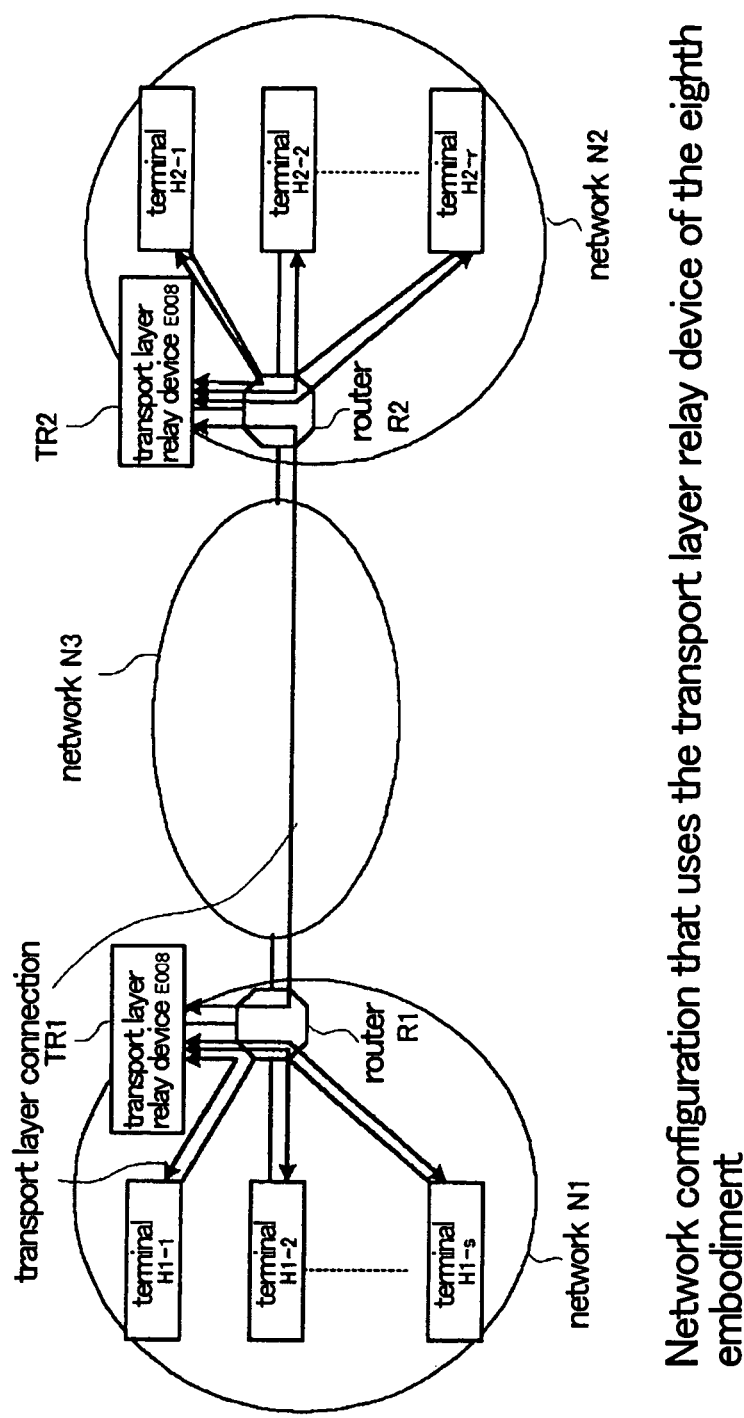
FIG. 27 shows a network configuration that uses the transport layer relay device of the eighth embodiment of the present invention.

FIG. 27 shows an example of the configuration of a communication network that uses transport layer relay devices E008 according to the eighth embodiment of the present invention. Compared with the network configuration of FIG. 13 that used the fourth embodiment of the present invention, the network configuration is identical with the exception that transport layer relay devices E004 of the fourth embodiment of the present invention that served as transport layer relay devices TR1 and TR2 are replaced by transport layer relay devices E008 of the eighth embodiment of the present invention in FIG. 27.

The operations in which transport layer relay devices TR1 and TR2 are used for starting and ending relay of communication between any terminal in network N1 and any terminal in network N2 are identical to the operations of the seventh embodiment of the present invention that were explained using FIG. 24, and redundant explanation is therefore here omitted.

Figure 28:
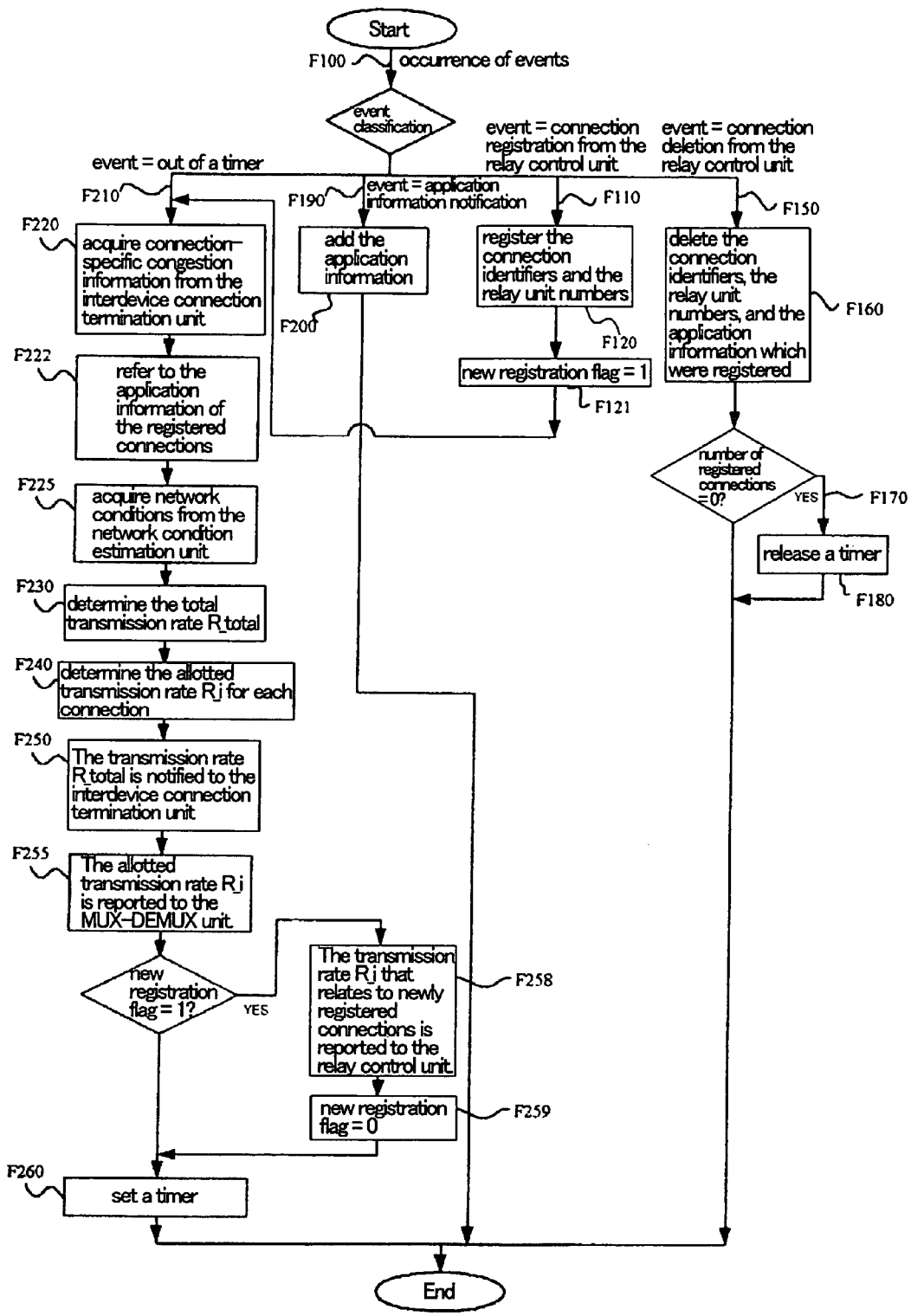
FIG. 28 is a flow chart of the operations of the rate control unit of the eighth embodiment of the present invention.

The following explanation regards only the points that have been changed in the operations of transmission rate control unit 8003 of transport layer relay device E008. FIG. 28 shows a flow chart of the operations of transmission rate control unit 8003.

The transmission rate control unit is activated by the occurrence of an event such as any of: a timing-out of a timer, the registration or deletion of a relay unit from the relay control unit, or an application information notification from an application information analysis unit (F100). When the event is a registration from the relay control unit (F110), the transmission rate control unit registers the connection identifiers and the relay unit numbers (F120), sets the new registration flag to "1" (F121), and proceeds to F220. When the event is a deletion from the relay control unit (T150), the transmission rate control unit deletes the connection identifiers, relay unit numbers, and application information (if application information exists) (T160), and if the number of registered connections is "0" (F170), releases the timer (F180). If the event is an application information notification from an application information analysis unit (F190), the transmission rate control unit adds the application information that relates to the connection identifiers to the registration information (F200). If the event is the timing-out of a timer (F210), the transmission rate control unit acquires connection-specific congestion information from the interdevice connection termination unit (F220). The transmission rate control unit also refers to the application information (the information that was added in F200) of connections that are currently registered (F222). The transmission rate control unit then acquires the network conditions from the network condition estimation unit (F225), and further, using the number of connections that are currently registered, determines the total transmission rate R_total (F230). As the determination method, a method such as the total transmission rate determination methods A4, B4, C4, D4, E4, and F4 that were described in the explanation of transmission rate control unit 4003 can be adopted. The transmission rate control unit next determines the transmission rate of each connection that is currently registered (F240). As the determination method, a method such as the transmission rate allotment methods 1, 2, and 3 that were described in the explanation of transmission rate control unit 4003 can be adopted. The total transmission rate R_total is next reported to the interdevice connection termination unit (F250). The transmission rates of each connection that were determined in F240 are further reported to the MUX-DEMUX unit (F255). If the new registration flag is "1," the transmission rate control unit reports the transmission rate R_i that relates to newly registered connections to the relay control unit (F258) and the new registration flag is set to "0" (F259). Finally, the timer is set to T (F260).

Transport layer relay device E008 that is shown in FIG. 26 is capable of establishing relay connections with no more than one predetermined opposing transport layer relay device, but to enable the establishment of relay connections with a plurality of opposing transport layer relay devices, a set of: relay units 8002-1-8002-n, transmission rate control unit 8003, interdevice connection termination unit 3004, MUX-DEMUX unit 3005, and network condition estimation unit 2004 may be provided in transport layer relay devices E008 for each of a plurality of opposing transport layer relay devices, and the same operations as in relay control unit 3001 may be carried out in relay control unit 8001.

Merits of the Eighth Embodiment of the Present Invention

The merits of the present invention that are obtained by the eighth embodiment of the present invention, in addition to the merits that are obtained by the fourth embodiment of the present invention, include the ability to shorten the time interval that is required for a terminal to learn the network conditions by providing information of the initial transmission rate when establishing a connection with a terminal, thereby enabling more efficient congestion control.

Ninth Embodiment of the Present Invention

Explanation of Configuration

The following explanation regards the details of the configuration of the ninth embodiment of the present invention with reference to the accompanying figures.

Figure 29:
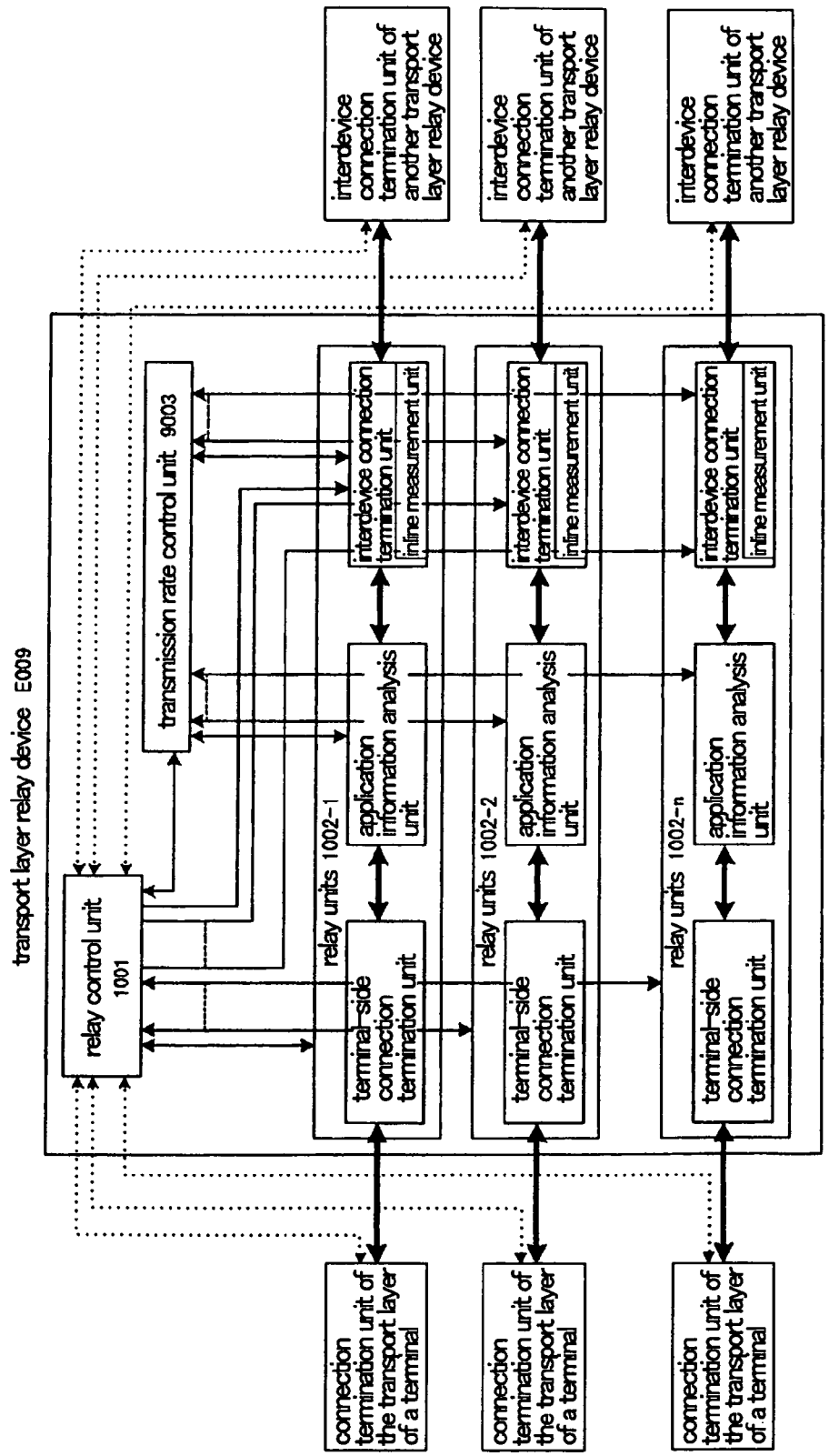
FIG. 29 shows the configuration of a transport layer relay device of the ninth embodiment of the present invention.

FIG. 29 is a block diagram of the interior of transport layer relay device E009 of the ninth embodiment of the present invention. Transport layer relay device E009 of the ninth embodiment differs from transport layer relay device E001 of the first embodiment of the present invention in that an inline measurement unit is added to the interdevice connection termination unit and transmission rate control unit 9003 is provided in place of transmission rate control unit 1003. Explanation regards only portions that are changed from the first embodiment of the present invention by the addition of the inline measurement unit. Transport layer relay device E009 can be realized by a computer. When realized by a computer, a program for realizing relay control unit 1001, relay units 1002-1-1002-$n$, and transmission rate control unit 9003 is recorded on a disk, a semiconductor memory, or other recording medium. This program is read by the computer, and through the control of the operations of the computer, realizes relay control unit 1001, relay units 1002-1-1002-$n$, and transmission rate control unit 9003 on the computer.

Inline Measurement Unit:

The inline measurement unit instructs the interdevice connection termination unit, uses transmission packets that are actually relayed as measurement packets, estimates information of the physical bandwidth of a bottleneck and the available bandwidth of the bottleneck, and contributes this information to the connection-specific congestion information that is transferred from the interdevice connection termination unit to the transmission rate control unit. As the method of inferring the physical bandwidth of a bottleneck that uses transmission packets as measurement packets, a method that uses, for example, the previously described packet-pair method when a plurality of transmission packets are continuously transmitted can be considered. As for a method of inferring the available bandwidth of a bottleneck that employs transmission packets as measurement packets, one method that can be used is described in Cao Le Thanh Man, Hasegawa Go, Murata Masayuki, "Inline Network Measurement via Active TCP Connections" (IEICE Society Conference, March 2003).

Interdevice Connection Termination Unit:

Compared to the interdevice connection termination unit of the first embodiment, the interdevice connection termination unit of the ninth embodiment differs only in that the interdevice connection termination unit: (1) performs packet transmission in accordance with the instructions of an inline measurement unit; (2) reports to inline measurement unit the arrival of ACK packets from the communication partner and the header information of these ACK packets; and (3) when reporting connection-specific congestion information to the transmission rate control unit, simultaneously reports the information of the physical bandwidth of a bottleneck and the available bandwidth of the bottleneck that were found by the inline measurement unit.

Transmission Rate Control Unit 9003:

Transmission rate control unit 9003 takes the total transmission rate of connections that are currently being relayed as R_total and allots this total transmission rate to each of the relay connections. As the method of determining the total transmission rate R_total, R_total may be determined depending on the number of connections that are currently being relayed, connection-specific congestion information from each interdevice connection termination unit, and information from an application information analysis unit, the following methods being examples.

Total Transmission Rate Determination Method A9

The total transmission rate is determined based on connection-specific congestion information from the interdevice connection termination units. As an example, for the estimated values of the bottleneck physical bandwidth and the estimated values of the available bandwidth that are derived from the connection-specific congestion information from each interdevice connection termination unit, average values are taken among the interdevice connection termination units, and these average values are taken as estimated value Rb of the physical bandwidth and estimated value Ra of the available bandwidth. If the desired effective rate R_target is smaller than the available bandwidth Ra of the bottleneck, then R_total is determined to be R_target·α, but if Ra is smaller than R_target and R_target is less than Rb, R_total is determined to be R_target·β, The values of α and β are determined in advance such that 1<α and 1<β.

Total Transmission Rate Determination Method B9

R_total is determined depending on the number of connections that are currently being relayed such that the desired effective rate R_target corresponds to the number of connections that are currently being relayed. For the estimated values of the bottleneck physical bandwidth and the estimated values of the available bandwidth that are derived from the connection-specific congestion information from each interdevice connection termination unit, values reasonably having the least estimation error among the interdevice connection termination units are taken as the estimated value Rb of the bottleneck physical bandwidth and estimated value Ra of available bandwidth (information relating to the estimation error such as the number of measurements may be added to the connection-specific congestion information). When the rate of R_o per connection is desired, R_target is determined as R_o*m based on the number m of connections that are currently registered by the relay control unit. If the desired bandwidth R_target is smaller than the available bandwidth Ra of the bottleneck, R_total is determined as R_target·α, and when Ra is less than R_target and R_target is in turn less than Rb, R_total is determined as R_target·β. The values of α and β are determined in advance such that 1<α and 1<β.

Total Transmission Rate Determination Method C9

The total transmission rate is determined using connection-specific congestion information from each interdevice connection termination unit. As an example, it is assumed that the total transmission rate is updated each time interval T, that the number m of current connections at time t are being relayed, and that during the interval from time t−T to time t, each relay connection sends C_i (i=1, . . . m) packets and detects L_i (i=1, . . . , m) instances of packet loss. It is assumed that during the time interval from time t−T to time t, each relay connection transmits Ci (i=1, . . . , m) packets and detects Li (i=1, . . . , m) instances of packet loss, and the average packet size of each relay connection is Di (i=1, . . . , m). During the time interval from time t−T to time t, the transmission of the following amount of data is attempted:

$$\sum_{i=1}^{m} C_i D_i \quad \text{[Equation 21]}$$

The following amount of data are not sent due to packet loss:

$$\sum_{i=1}^{m} L_i D_i \quad \text{[Equation 22]}$$

The consequent data loss rate is:

$$P = \left(\sum_{i=1}^{m} L_i D_i\right) / \left(\sum_{i=1}^{m} C_i D_i\right) \quad \text{[Equation 23]}$$

In order to secure the effective rate R_target if it is assumed that the same conditions continue, R_total is determined to be R_target/(1−P). However, to avoid severe congestion, R_total is determined as R_target/(1−P_0) where P is greater than P_0 for the threshold value P_0 of a particular packet loss rate.

Total Transmission Rate Determination Method D9

R_total is determined using connection-specific congestion information from each interdevice connection termination unit such that the greatest possible effective rate is obtained. As an example, it is assumed that the total transmission rate is updated each time interval T, that m connections are currently being relayed at time t, and that during the interval from time t−T to time t, each relay connection sends Ci (i=1, ..., m) packets and detects Li (i=1, ..., m) instances of packet loss. It is assumed that during the time interval from time t−T to time t, each relay connection transmits Ci (i=1, ..., m) packets and detects Li (i=1, ..., m) instances of packet loss, and the average packet size of each relay connection is Di (i=1, ..., m). During the time interval from time t−T to time t, the transmission of the following amount of data is attempted:

$$\sum_{i=1}^{m} C_i D_i \quad \text{[Equation 24]}$$

The following amount of data are not sent due to packet loss:

$$\sum_{i=1}^{m} L_i D_i \quad \text{[Equation 25]}$$

The consequent data loss rate is:

$$P = \left(\sum_{i=1}^{m} L_i D_i\right) / \left(\sum_{i=1}^{m} C_i D_i\right) \quad \text{[Equation 26]}$$

A table is prepared in which the relation between transmission rates and the rates of actual arrival on the receiving side (=R_total*(1−P)) is found based on past transmission rates R_total and the data loss rates P at these times. The data for preparing this table are successively updated. R_total is taken as the value of the transmission rate for which the rate of actual arrival on the receiving side reaches a maximum. However, if sufficient past transmission rates R_total have not been accumulated, R_total that has been set in advance is used.

Total Transmission Rate Determination Method E9

R_total is also determined using information from application information analysis units such that a desired effective rate R_target is obtained that corresponds to the application that is currently being relayed. As an example, when only streaming connections are being relayed, streaming rate information is obtained from the application information analysis units, R_-target is taken as the sum value of this streaming rate information, and R_total is found in accordance with transmission rate determination method C2.

Total Transmission Rate Determination Method F9

R_total is determined using the current number of connections m and connection-specific congestion information from the interdevice connection termination units such that an effective rate is obtained that confers priorities to other traffic that share bottlenecks (packets that are not relayed by transport layer relay device E009 that influence packets that are relayed by transport layer relay device E009). As an example, the RTT and the packet loss rate p of the network through which the relay connections pass that are obtained from connection-specific congestion information are used to estimate the effective rate per TCP, and an a-multiple of this rate is then multiplied by m. As the method of estimating the transmission rate per TCP, a calculation equation that gives X may be used such as the "throughput equation" in section 3.1 of M. Handley, S. Floyd, J. Padhye, and J. Widmer, "TCP Friendly Rate Control (TFRC): Protocol Specification" (Internet Society, RFC 3448, January 2003). In other words, using connection-specific congestion information from the interdevice connection termination units and with the packet loss occurrence rate p, index average value R of RTT, estimated value t_RTO of the TCP time-out interval (for example, two times R), the average TCP packet size value s (bytes) of the network of the relay connections (where s may be a value learned through experience), and b as "2," X is found from:

$$X = \frac{s}{R \cdot \sqrt{2 \cdot b \cdot p/3} + \left(t\_RTO \cdot \left(3\sqrt{3 \cdot b \cdot p/8} \cdot p \cdot (1 + 32 \cdot p^2)\right)\right)} \text{(bit/sec)} \quad \text{[Equation 27]}$$

and R_total is determined to be m·α·X (bit/sec). If α is made greater than "1," the transmission rate per TCP can be made higher than for other traffic, and the priority of traffic that is relayed can be raised relative to other traffic. Conversely, if α is set to less than "1," the transmission rate per TCP can be made lower than for other traffic, and the priority of traffic that is relayed can be lowered relative to other traffic.

R_total that has been determined in this way is allotted to each relay connection. This rate allotment may be determined depending on the number of current connections and information from the application information analysis unit, the following methods being examples that can be considered.

Transmission Rate Allotment Method 1

Rates are allotted equally to all connections. In other words, if there are m connections, a rate of R_total/m is allotted to each connection.

Transmission Rate Allotment Method 2

Rates are allotted in accordance with rules that have been determined depending on the port number information of the connection identifiers. As an example, priorities are conferred to each port number, and rates are allotted in accordance with these priorities.

Transmission Rate Allotment Method 3

Rates are determined depending on information from the application information analysis unit. As an example, when relaying a plurality of connections of an application that performs data transfer by HTTP connections, bandwidth allotment is performed that confers priorities depending on the value of the HTTP Content-type field that is obtained from the application information analysis unit. As another example, when relaying a plurality of connections of an application that acquires files by HTTP, higher bandwidth is allotted to connections that transfer data of shorter size depending on information of the HTTP Content-length field that is obtained from the application information analysis unit. As yet another example, a case is considered for relaying Ns streaming-type application connections and Nf file transfer-type application connections that use HTTP. Each streaming rate that is obtained from the application information analysis unit is RSi (i=1, ..., Ns), and the file sizes of the file transfer-type connections that are obtained from the application information analysis unit is FLi (i=1, ..., Nf). For the streaming-type connections, the streaming rates RSi (i=1, ..., NsO) are allotted to connections having a lower rate than an equal rate (in which R_total is divided by the number of current connections Ns+Nf. The remaining rate:

$$\left( R\_total - \sum_{i=1}^{N_{SO}} RS_i \right)$$ [Equation 28]

is allotted with priority given to streaming connections that have not yet been allotted, and the still remaining rate is then allotted with higher rates being allotted in order to file transfer-type connections in which the file size is shorter.

Explanation of Operations

The operations of the ninth embodiment of the present invention are similar to the operations of the first embodiment of the present invention. The only differences are: the interdevice connection termination units confer the information of the estimated value of the physical bandwidth and available bandwidth of a bottleneck that is obtained from the inline measurement units inside the interdevice connection termination units and report connection-specific congestion information to transmission rate control unit 9003; and when determining the transmission rate, the transmission rate control unit carries out a determination of the transmission rate such as shown in A9 and B9 that uses information of the estimated values of the physical bandwidth and available bandwidth of a bottleneck from the inline measurement units.

Merits of the Ninth Embodiment of the Present Invention

In addition to the merits that are obtained by the first embodiment of the present invention, the ninth embodiment of the present invention obtains the following merits. By carrying out transmission rate determination that, through the use of total transmission rate determination methods A9 and B9, takes into consideration of the estimated values of the physical bandwidth and available bandwidth of bottlenecks, a desired effective rate can be secured with high accuracy, and an effective rate that confers priorities to other traffic can be secured with high accuracy.

Tenth Embodiment of the Present Invention

Explanation of the Configuration

The following explanation regards the details of the configuration of the tenth embodiment of the present invention with reference to the accompanying figures.

Figure 30:
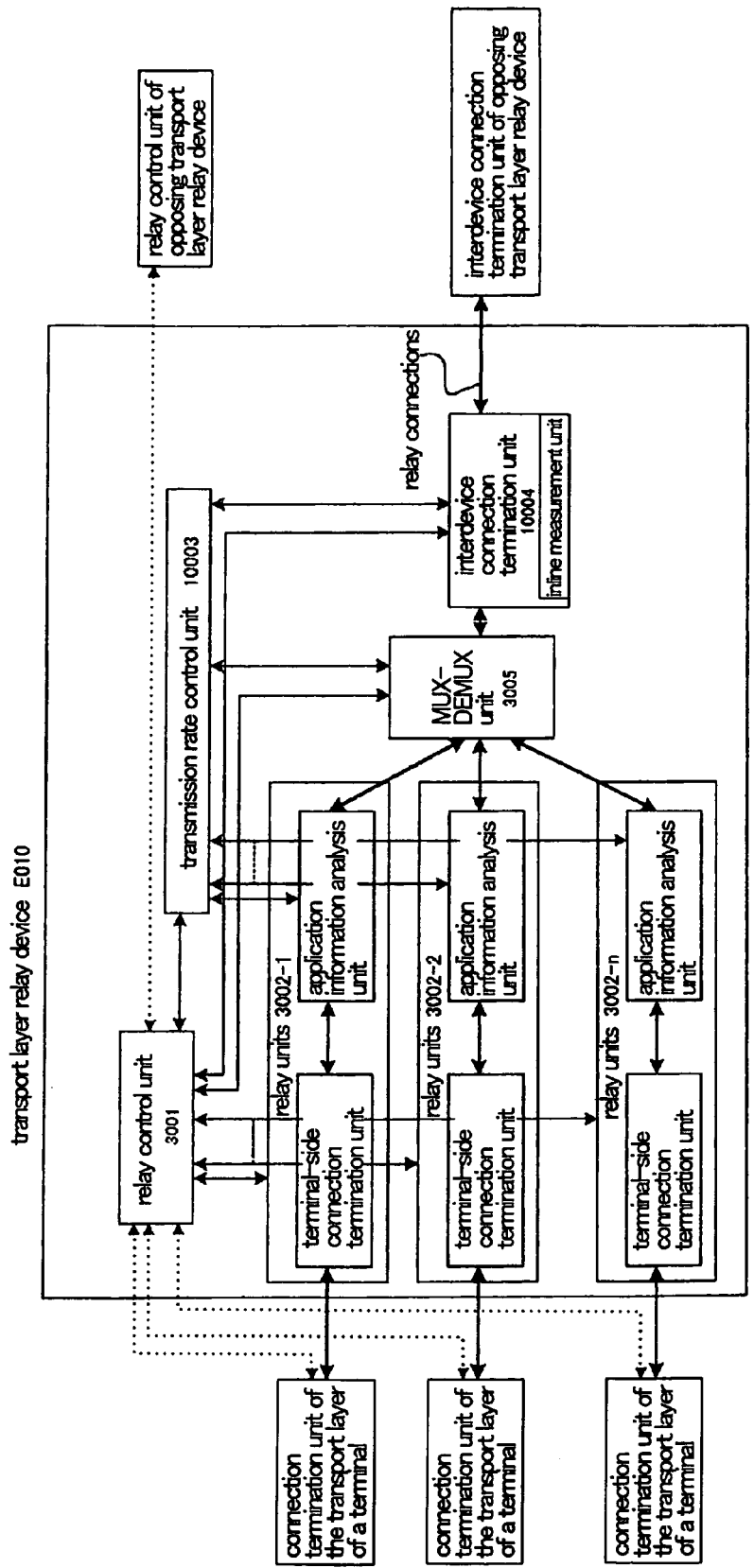
FIG. 30 shows the configuration of the transport layer relay device of the tenth embodiment of the present invention.

FIG. 30 is a block diagram of the interior of transport layer relay device E010 of the tenth embodiment of the present invention. As the differences between transport layer relay device E010 and transport layer relay device E003 of the third embodiment of the present invention, inline measurement unit is added to the interdevice connection termination unit, and transmission rate control unit 3003 is replaced by transmission rate control unit 10003. The following explanation regards only the portions that are changed from the third embodiment of the present invention due to the addition of the inline measurement unit. In addition, transport layer relay device E010 can be realized by a computer. When realized by a computer, a program for realizing relay control unit 3001, relay units 3002-1-3002-*n*, transmission rate control unit 10003, interdevice connection termination unit 10004 that includes an inline measurement unit, and MUX-DEMUX unit 3005 is recorded on a disk, a semiconductor memory, or other recording medium. This program is read by the computer, and through the control of the operations of the computer, relay control unit 3001, relay units 3002-1-3002-*n*, transmission rate control unit 10003, interdevice connection termination unit 10004 having an inline measurement unit, and MUX-DEMUX unit 3005 are realized on the computer.

Inline Measurement Unit:

The inline measurement unit instructs the interdevice connection termination unit, uses transmission packets as measurement packets, estimates information of the physical bandwidth of a bottleneck and the available bandwidth of the bottleneck, and contributes this information to the connection-specific congestion information that is transferred from the interdevice connection termination unit to the transmission rate control unit. As the method of inferring the physical bandwidth of a bottleneck using transmission packets as measurement packets, a method that uses, for example, the previously described packet-pair method when a plurality of transmission packets are continuously transmitted can be considered. As for a method of inferring the available bandwidth of a bottleneck that employs transmission packets as measurement packets, one method that can be used is described in Cao Le Thanh Man, Hasegawa Go, Murata Masayuki, "Inline Network Measurement via Active TCP Connections" (IEICE Society Conference, March 2003).

Interdevice Connection Termination Unit 10004:

Compared to the interdevice connection termination unit of the third embodiment, interdevice connection termination unit 10004 differs only in that interdevice connection termination unit 10004: (1) performs packet transmission in accordance with the instructions of the inline measurement unit; (2) reports to the inline measurement unit the arrival of ACK packets from the communication partner and the header information of these ACK packets; and (3) when reporting connection-specific congestion information to the transmission rate control unit, simultaneously reports the information of the physical bandwidth of a bottleneck and the available bandwidth of the bottleneck that were found by the inline measurement unit.

Transmission Rate Control Unit 10003:

Transmission rate control unit 10003 takes the total transmission rate of connections that are currently being relayed as R_total and allots this rate to each of the relay connections. As the method of determining the total transmission rate R_total, R_total may be determined depending on the number of connections that are currently being relayed, connection-specific congestion information from each interdevice connection termination unit, and information from an application information analysis unit, the following methods being examples.

Total Transmission Rate Determination Method A10

The total transmission rate is determined based on connection-specific congestion information from the interdevice connection termination units. As an example, of the connection-specific congestion information from each interdevice connection termination unit, the inferred value of the bottleneck physical bandwidth is Rb and the inferred value of the available bandwidth is Ra. If the desired effective rate R_target is determined as smaller than the available bandwidth Ra of the bottleneck, R_total is determined as R_target·α, and if R_target is greater than Ra but less than Rb, R_total is determined as R_target·β. The values of α and β are determined in advance such that 1<α and 1<β.

Total Transmission Rate Determination Method B10

R_total is determined depending on the number of connections that are currently being relayed such that the desired effective rate R_target corresponds to the number of connections that are currently being relayed. In the connection-specific congestion information from the interdevice connection termination unit, the inferred value of the bottleneck physical bandwidth is Rb and the inferred value of the available bandwidth is Ra. When the rate of R_o per connection is desired, R_target is determined as R_o*m based on the number m of connections that are currently registered by the relay control unit.

If the desired bandwidth R_target is smaller than the available bandwidth Ra of the bottleneck, R_total is determined as R_target·α, and when R_target is greater than Ra but less than Rb, R_total is determined as R_target·β. The values of α and β are determined in advance such that 1<α and 1<β.

Total Transmission Rate Determination Method C10

The total transmission rate is determined using connection-specific congestion information from interdevice connection termination units such that a desired effective rate R_target is obtained. As an example, if it is assumed that the total transmission rate is updated each time interval T and that during the interval from time t−T to time t, each relay connection sends C packets and detects L instances of packet loss, the packet loss rate is P=L/C. If it is assumed that the same congestion conditions continue, in order to attain the target rate (R_target), R_total is determined as R_target/(1−P). However, to avoid severe congestion, R_total is determined as R_target/(1−P_0) where P is greater than P_0 for the threshold value P_0 of a particular data loss rate.

Total Transmission Rate Determination Method D10

R_total is determined using connection-specific congestion information from each interdevice connection termination unit such that the greatest possible effective rate is obtained. As an example, if it is assumed that the total transmission rate is updated each time interval T and that during the interval from time t−T to time t, each relay connection sends C packets and detects L instances of packet loss, the packet loss rate is P=L/C. A table is prepared in which the relation between transmission rates and the rates of actual arrival on the receiving side (=R_total*(1−P)) is found based on past transmission rates R_total and the data loss rates P at these times. The data for preparing this table are successively updated. R_total is taken as the value of the transmission rate for which the rate of actual arrival on the receiving side reaches a maximum. However, if sufficient past transmission rates R_total have not been accumulated, R_total that has been set in advance is used.

Total Transmission Rate Determination Method E10

R_total is also determined using information from an application information analysis unit such that a desired effective rate R_target is obtained that corresponds to the application that is currently relayed. For example, when only streaming connections are being relayed, streaming rate information is obtained from the application information analysis unit, the sum value of this information is taken as R_target, and R_total is found in accordance with transmission rate determination method C3.

Total Transmission Rate Determination Method F10

R_total is determined using the number m of current connections and connection-specific congestion information from interdevice connection termination units so as to obtain an effective rate that confers priorities to other traffic that shares a bottleneck. For example, the RTT and the packet loss rate p of the network though which the relay connections pass that are obtained from connection-specific congestion information may be used to infer the effective rate per TCP, and the rate that is the multiple of a of this effective rate per TCP may then be multiplied by m. As the method for estimating the effective rate per TCP, the equation may be used that gives X in the "throughput equation" of Section 3.1 in "TCP Friendly Rate Control (TFRC): Protocol Specification" by M. Handley, S. Floyd, J. Padhye, and J. Widmer (Internet Society, RFC 3448, January 2003). In other words, using the connection-specific congestion information from interdevice connection termination units, and with the rate of occurrence of packet loss p (when calculating p, calculation is carried out taking packet loss within RTT as one loss event), the index average value R of RTT, the inferred value t_RTO of the time-out time interval of TCP (for example, R times 2), the average value s (bytes) of the TCP packet size of the network in which the relay connections exist (s may be a value learned from experience), and b as 2: X is found as follows:

$$X = \frac{s}{R \cdot \sqrt{2 \cdot b \cdot p / 3} + \left(t\_RTO \cdot \left(3\sqrt{3 \cdot b \cdot p / 8} \cdot p \cdot (1 + 32 \cdot p^2)\right)\right)} \text{(bit/sec)} \quad \text{[Equation 29]}$$

R_total is thus determined as m·α·X (bit/sec). If α is made greater than 1, the transmission rate per TCP can be made higher than for other traffic and the priority of traffic that is being relayed can be raised relative to other traffic. On the other hand, if α is made less than 1, the transmission rate per TCP can be made lower than for other traffic, and the priority of traffic that is being relayed can be lowered relative to other traffic.

R_total that has been determined in this way is allotted to each relay connection. This rate allotment may be determined depending on the number of current connections or information from the application information analysis unit, the following examples being methods that can be considered:

Transmission Rate Allotment Method 1

Rates are allotted equally to all connections. In other words, if there are m connections, a rate of R_total/m is allotted to each connection.

Transmission Rate Allotment Method 2

Rates are allotted according to rules that are determined depending on the port number information of the connection identifier. For example, priorities are conferred to each port number, and rates are allotted in accordance with these priorities.

Transmission Rate Allotment Method 3

Rates are determined depending on information from the application information analysis unit. For example, in the case of relaying a plurality of connections of an application for carrying out data transfer by an HTTP connection, bandwidth allotment is carried out in which priorities are conferred that have been determined depending on values in Content-type fields of HTTP that have been obtained from the application information analysis unit. As another example, in the case of relaying a plurality of connections of an application that acquires files in HTTP, higher bandwidths are allotted to connections that transfer data of shorter size in accordance with information of the HTTP Content-length field that is obtained from the application information analysis unit. As yet another example, when relaying Ns connections of a streaming-type application and Nf file transfer-type application connections that use HTTP, each of the streaming rates that are obtained from application information analysis unit are RSi (i=1, . . . , Ns), and the file size of each file transfer-type connection that is obtained from the application information analysis unit is FLi (i=1, . . . , Nf). For streaming type connections, the streaming rates RSi (i=1, . . . , NsO) are allotted to connections having rates lower than equal rates (in which R_total is divided by the number of current connections Ns+Nf). The remaining rate:

$$\left( R\_total - \sum_{i=1}^{N_{SO}} RS_i \right)$$ [Equation 30]

is allotted with priority conferred to streaming connections that have not yet been allotted, and still remaining rate is allotted in order with higher rates being allotted to the file transfer-type connections in which the file size is shorter.

Explanation of Operations

The operations of the tenth embodiment of the present invention are similar to the operations of the third embodiment of the present invention. As differences: the interdevice connection termination unit confers information of the inferred values of the physical bandwidth and available bandwidth of a bottleneck from the inline measurement unit that is in the interdevice connection termination unit, and reports connection-specific congestion information to the transmission rate control unit; the transmission rate control unit, when determining transmission rate, carries out transmission rate determination using information of the inferred values of the physical bandwidth and the available bandwidth of a bottleneck from the inline measurement unit such as shown in A10 and B10.

Merits of the Tenth Embodiment of the Present Invention

In addition to the merits that are obtained by the third embodiment of the present invention, the tenth embodiment of the present invention obtains the following merits. By carrying out transmission rate determination that, through the use of total transmission rate determination methods A10 and B10, takes into consideration the inferred values of the physical bandwidth and available bandwidth of bottlenecks, a desired effective rate can be secured with high accuracy, and an effective rate that confers priorities to other traffic can be secured with high accuracy.

The invention claimed is:

1. A transport layer relay method performed by a transport layer relay device, the method comprising:
    terminating, at the transport layer relay device, a first transport layer connection between a first source terminal and a first destination terminal at a first transmission rate in the transport layer and a second transport layer connection between a second source terminal and a second destination terminal at a second transmission rate in the transport layer;
    relaying data flow of said first transport layer connection to said first destination terminal as a first relay connection and data flow of said second transport layer connection to said second destination terminal as a second relay connection to respectively separate said first and second transport layer connections;
    determining a total transmission rate of said first and second relay connections based on the first and second transmission rates;
    determining a first reallocated transmission rate and a second reallocated transmission rate, the first reallocated transmission rate and the second reallocated transmission rate apportioned from the total transmission rate; and
    allocating the determined first reallocated transmission rate to said first relay connection and the determined second reallocated transmission rate to said second relay connection,
    wherein the first source terminal, the second source terminal, the first destination terminal, and the second destination terminal are different from each other.

2. The method according to claim 1, wherein said total transmission rate is determined in accordance with the number of transport layer connections that are being relayed and congestion conditions of a network through which the relay connections pass.

3. The method according to claim 1, wherein said total transmission rate is determined in accordance with the number of transport layer connections that are being relayed and congestion conditions of a network through which the relay connections pass such that desired effective transmission rates are attained for each relay connection.

4. The method according to claim 1, wherein said total transmission rate is determined in accordance with the number of transport layer connections that are being relayed and congestion conditions of a network through which the relay connections pass such that effective transmission rates are attained for each relay connection, and
    wherein transmission rates for traffic, other than the relay connections, that shares a bottleneck with the relay connections are allocated differently than transmission rates allocated to the relay connections.

5. The method according to claim 1, wherein said total transmission rate is allocated to transmission rates of each of said first and second relay connections depending on application information in said data flow of each of said first and second relay connections.

6. The method according to claim 1, further comprising estimating, by means of measurement packets, congestion conditions of a network through which the first and second relay connections pass,
    wherein said congestion conditions are used to determine said total transmission rate.

7. The method according to claim 1, further comprising estimating, by means of relay packets, congestion conditions of a network through which the first and second relay connections pass,
    wherein said congestion conditions are used to determine said total transmission rate.

8. The method according to claim 1, wherein, when establishing a new transport layer connection between a new source terminal and a new destination terminal, said total transmission rate is determined, said total transmission rate is allocated to each relay connection, and the allotted transmission rates are reported to a partner transport layer relay device in establishing said new transport layer connection.

9. A transport layer relay device comprising:
- a first terminal-side connection termination unit that terminates a first transport layer connection between a first source terminal and a first destination terminal in a transport layer;
- a second terminal-side connection termination unit that terminates a second transport layer connection between a second source terminal and a second destination terminal in a transport layer;
- a first interdevice connection termination unit that terminates a first transport layer connection with a first transport layer relay device that relays transport layer data between said first terminal-side connection termination unit and said first interdevice connection termination unit;
- a second interdevice connection termination unit that terminates a second transport layer connection between a second transport layer device that relays transport layer data between said second terminal-side connection termination unit and said second interdevice connection termination unit; and
- a transmission rate control unit that controls transmission rates of said first and second interdevice connection termination units,
- wherein the transmission rate control unit determines a total transmission rate of all interdevice connection termination units, determines a first reallocated transmission rate and a second reallocated transmission rate, the first reallocated transmission rate and the second reallocated transmission rate apportioned from said total transmission rate, allocates the determined first reallocated transmission rate to said first interdevice connection termination unit and the determined second reallocated transmission rate to said second interdevice connection termination unit, and reports a transmission rate that has been allocated to said first and second interdevice connection termination units, said first interdevice connection termination unit relaying said first transport layer connection to said first destination terminal as a first relay connection based on said first reallocated transmission rate and said second interdevice connection termination unit relaying said second transport layer connection to said second destination terminal as a second relay connection based on said second reallocated transmission rate, and
- wherein the first source terminal, the second source terminal, the first destination terminal, and the second destination terminal are different from each other.

10. The device according to claim 9, wherein said transmission rate control unit determines said total transmission rate in accordance with the number of transport layer connections that are being relayed and connection-specific congestion information reported from each interdevice connection termination unit.

11. The device according to claim 9, wherein said transmission rate control unit determines said total transmission rate in accordance with the number of transport layer connections that are being relayed and connection-specific congestion information reported from each interdevice connection termination unit such that effective transmission rates for each relay connection attain a desired transmission rate.

12. The device according to claim 9, wherein said transmission rate control unit determines said total transmission rate in accordance with the number of transport layer connections that are being relayed and connection-specific congestion information reported from each interdevice connection termination unit such that effective transmission rates for each relay connection are attained, and
- wherein transmission rates for traffic, other than the relay connections, that shares a bottleneck with the relay connections are allocated differently than transmission rates allocated to the relay connections.

13. The device according to claim 9, further comprising:
- an application information analysis unit that, when relaying transport layer data between each of said first and second terminal-side connection termination units and each of said first and second interdevice connection termination units, analyzes application information in said transport layer data,
- wherein said transmission rate control unit allocates said total transmission rate among the transmission rates of each of said first and second relay connections based on the application information analyzed by said application information analysis unit.

14. The device according to claim 9, further comprising:
- a network condition estimation unit that, based on measurement packets, estimates congestion conditions of a network through which said first and second relay connections pass,
- wherein said transmission rate control unit uses the congestion conditions estimated by said network condition estimation unit to determine said total transmission rate.

15. The device according to claim 9, further comprising:
- an inline measurement unit that, by means of packets that are relayed, estimates congestion conditions of a network through which said first and second relay connections pass,
- wherein said transmission rate control unit uses the results estimated by said inline measurement unit to determine said total transmission rate.

16. The device according to claim 9, wherein, when establishing a transport layer connection between a new source terminal and a new destination terminal, an initial transmission rate is reported to the destination from said transmission rate control unit.

17. A transport layer relay method performed by a transport layer relay device, the method comprising:
- terminating, at the transport relay device, each of a plurality of transport layer connections in a first transport layer and each of a plurality of transport layer connections in a second transport layer;
- grouping the plurality of connections in the first transport layer into a first relay connection in the first transport layer and the plurality of connections in the second transport layer into a second relay connection in the second transport layer;
- determining a total transmission rate of the first and second relay connections;
- determining a first reallocated transmission rate and a second reallocated transmission rate, the first reallocated transmission rate and the second reallocated transmission rate apportioned from the total transmission rate;
- allocating the determined first reallocated transmission rate to said first relay connection and the determined second reallocated transmission rate to said second relay connection,
- wherein the plurality of connections in said first transport layer are grouped as the first relay connection in accordance with the first reallocated transmission rate allocated from the total transmission rate and the plurality of connections in the second transport layer are grouped as the second relay connection in accordance with the second reallocated transmission rate allocated from the total transmission rate.

18. The method according to claim 17, wherein said total transmission rate is determined in accordance with the number of transport layer connections that are being relayed and congestion conditions of a network through which the relay connections pass.

19. The method according to claim 17, wherein said total transmission rate is determined in accordance with the number of transport layer connections that are being relayed and congestion conditions of a network through which the relay connections pass such that desired effective transmission rates are attained for each relay connection.

20. The method according to claim 17, wherein said total transmission rate is determined in accordance with the number of transport layer connections that are being relayed and congestion conditions of a network through which the relay connections pass such that effective transmission rates are attained for each relay connection, and
wherein transmission rates for traffic, other than the relay connections, that shares a bottleneck with the relay connections are allocated differently than transmission rates allocated to the relay connections.

21. The method according to claim 17, wherein data flows from each of said plurality of connections in the first transport layer and the plurality of connections in the second transport layer are grouped in accordance with transmission rates for which said total transmission rate has been allocated based on application information in said plurality of connections in the first transport layer and the plurality of connections in the second transport layer.

22. The method according to claim 17 further comprising estimating, by means of measurement packets, congestion conditions of network through which the first and second relay connections pass,
wherein said congestion conditions are used to determine said total transmission rate.

23. The method according to claim 17 further comprising estimating, by means of relay packets, congestion conditions of a network through which the first and second relay connections pass,
wherein said congestion conditions are used to determine said total transmission rate.

24. The method according to claim 17, wherein, when establishing new transport layer connection between a new source terminal and a new destination terminal, said total transmission rate is allocated and the allocated transmission rates are reported to a partner transport layer relay device in establishing said new transport layer connection.

25. A transport layer relay device comprising:
a plurality of terminal-side connection termination units that terminate transport layer connections between a plurality of source terminals and a plurality of destination terminals in the transport layer;
an interdevice connection termination unit that terminates a plurality of transport layer connections with a plurality of transport layer relay devices that relay transport layer data between said plurality of terminal-side connection termination units and said interdevice connection termination unit; and
an MUX-DEMUX unit that groups transport layer data from each of said plurality of terminal-side connection termination units as a plurality of relay connections and transfers the plurality of relay connections to said interdevice connection termination unit; and
a transmission rate control unit that determines a total transmission rate of the plurality of relay connections, determines reallocated transmission rates apportioned from the total transmission rate, and allocates the reallocated transmission rates to the plurality of relay connections,
wherein said interdevice connection termination unit transmits said plurality of relay connections to said plurality of destination terminals in accordance with the reallocated transmission rates,
wherein said MUX-DEMUX unit groups data from the plurality of terminal-side connection termination units in accordance with the reallocated transmission rates allocated by the transmission rate control unit, and
wherein the transmission rate control unit determines the reallocated transmission rates of said interdevice connection termination unit and reports the allocation of the reallocated transmission rates among the plurality of relay connections to said MUX-DEMUX unit.

26. The device according to claim 25, wherein said transmission rate control unit determines said total transmission rate in accordance with the number of transport layer connections that are being relayed and congestion information of connections reported from the interdevice connection termination unit.

27. The device according to claim 25, wherein said transmission rate control unit determines said total transmission rate in accordance with the number of transport layer connections that are being relayed and congestion information of connections reported from the interdevice connection termination unit such that effective transmission rates for each of the plurality of relay connections attain a desired rate.

28. The device according to claim 25, wherein said transmission rate control unit determines said total transmission rate in accordance with the number of transport layer connections that are being relayed and congestion information of connections that from each interdevice connection termination unit such that effective rates for each of the plurality of relay connections are attained, and
wherein transmission rates for traffic, other than relay connections, that share a bottleneck with the plurality of relay connections are allocated differently than transmission rates allocated to the relay connections.

29. The device according to claim 25, further comprising:
an application information analysis unit that analyzes application information in transport layer data when transport layer data are transferred between each of said terminal-side connection termination units and said MUX-DEMUX unit,
wherein said transmission rate control unit allocates said total transmission rate among the transmission rates of each of the plurality of relay connections and reports the allocated transmission rates to said MUX-DEMUX unit based on the application information analyzed by said application information analysis unit.

30. The device according to claim 25, further comprising:
a network condition estimation unit that, by means of measurement packets, estimates congestion conditions of a network through which plurality of relay connections pass,
wherein said transmission rate control unit uses congestion conditions estimated by said network condition estimation unit to determine said total transmission rate.

31. The device according to claim 25, further comprising:
an inline measurement unit that, by means of packets that are relayed, estimates congestion conditions of a network through which the plurality of relay connections pass,
wherein said transmission rate control unit uses the congestion conditions estimated by said inline measurement unit to determine said total transmission rate.

32. The device according to claim 25, wherein, when establishing a transport layer connection between a new source terminal and a new destination terminal, an initial transmission rate that is reported from said transmission rate control unit is reported to the new destination terminal.

33. A program embodied on a non-transitory computer-readable medium, which when executed by a computer, causes the computer to function as a transport layer relay device comprising:
a first terminal-side connection termination unit that terminates a first transport layer connection between a first source terminal and a first destination terminal in a first transport layer; a second terminal-side connection termination unit that terminates a second transport layer connection between a second source terminal and a second destination terminal in a transport layer;
a first interdevice connection termination unit that terminates a first transport layer connection with a first transport layer relay device that relays transport layer data between said first terminal-side connection termination unit and said first interdevice connection termination unit;
a second interdevice connection termination unit that terminates a second transport layer connection between a second transport layer device that relays transport layer data between said second terminal-side connection termination unit and said second interdevice connection termination unit; and
a transmission rate control unit that controls transmission rates of said first and second interdevice connection termination units, wherein the transmission rate control unit determines a total transmission rate of all interdevice connection termination units, determines a first reallocated transmission rate and a second reallocated transmission rate, the first reallocated transmission rate and the second reallocated transmission rate apportioned from said total transmission rate, allocates the determined first reallocated transmission rate to said first interdevice connection unit and the determined second reallocated transmission rate to said second interdevice connection termination unit, and reports a transmission rate that has been allocated to said first and second interdevice connection termination units, said first interdevice connection termination unit relaying said first transport layer connection to said first destination terminal as a first relay connection based on said first reallocated transmission rate and said second interdevice connection termination unit relaying said second transport layer connection to said second destination terminal as a second relay connection based on said second reallocated transmission rate, and
wherein the first source terminal, the second source terminal, the first destination terminal, and the second destination terminal are different from each other.

34. A program embodied on a non-transitory computer-readable medium, which when executed by a computer, causes the computer to function as a transport layer relay device comprising:
a plurality of terminal-side connection termination units that terminate transport layer connections between a plurality of source terminals and a plurality of destination terminals in the transport layer;
an interdevice connection termination unit that terminates a plurality of transport layer connections with a plurality of transport layer relay devices that relay transport layer data between said plurality of terminal-side connection termination units and said interdevice connection termination unit;
a MUX-DEMUX unit that groups transport layer data from each of said plurality of terminal-side connection termination units as a plurality of relay connections and transfers the plurality of relay connections to said interdevice connection termination unit; and
a transmission rate control unit that determines a total transmission rate of the plurality of relay connections, determines reallocated transmission rates apportioned from the total transmission rate, and allocates the reallocated transmission rates to the plurality of relay connections, wherein said interdevice connection termination unit transmits said plurality of relay connections to said plurality of destination terminals in accordance with the reallocated transmission rates, wherein said MUX-DEMUX unit groups data from the plurality of terminal-side connection termination units in accordance with the reallocated transmission rates allocated by the transmission rate control unit, and
wherein the transmission rate control unit determines the reallocated transmission rates of said interdevice connection termination unit and reports the allocation of the reallocated transmission rates among the plurality of relay connections to said MUX-DEMUX unit.

* * * * *

UNITED STATES PATENT AND TRADEMARK OFFICE
CERTIFICATE OF CORRECTION

PATENT NO. : 8,503,294 B2
APPLICATION NO. : 10/563879
DATED : August 6, 2013
INVENTOR(S) : Masayoshi Kobayashi It is certified that error appears in the above-identified patent and that said Letters Patent is hereby corrected as shown below:

In the Specification

Column 9, Line 22: Delete "FrP" and insert -- FTP --

Column 14, Line 43: Delete "Ns)" and insert -- Ns0) --

Column 15, Line 63: Delete "TR" and insert -- TR1 --

Column 16, Line 15: Delete "(T-400)." and insert -- (T400). --

Column 20, Line 29: Delete "Ci" and insert -- C_i --

Column 20, Line 29: Delete "Li" and Insert -- L_i --

Column 21, Line 21: Delete "(i=1, . . . m)" and insert -- (i=1, . . . , m) --

Column 22, Line 9: Delete "a" and insert -- α --

Column 22, Line 34: Delete "a" and insert -- α --

Column 23, Line 5: Delete "Nf." and insert -- Nf). --

Column 23, Line 7: Delete "NsO)" and insert -- Ns0) --

Column 29, Line 26: Delete "W_max R/B" and insert -- W_max·R/B --

Column 29, Line 29: Delete "(4·N–1)·W_max_R/" and insert -- (4·N–1)·W_max·R/ --

Column 32, Line 7 (Approx.): Delete "m·αX" and insert -- m·α·X --

Signed and Sealed this
Eighteenth Day of November, 2014

Michelle K. Lee
*Deputy Director of the United States Patent and Trademark Office*

CERTIFICATE OF CORRECTION (continued)
U.S. Pat. No. 8,503,294 B2

Column 32, Line 49: Delete "NsO)" and insert -- Ns0) --

Column 33, Line 25: Delete "E003(TR1" and insert -- E003 (TR1 --

Column 33, Line 59: Delete "(T070" and insert -- (T1070 --

Column 34, Line 2: Delete "(T100)." and insert -- (T1100). --

Column 34, Line 8: Delete "(T110," and insert -- (T1110, --

Column 34, Line 11: Delete "TR" and insert -- TR1 --

Column 34, Line 36: Delete "H2" and insert -- H2-j --

Column 34, Line 56: Delete "TR" and insert -- TR1 --

Column 35, Line 61: Delete "hexplanation" and insert -- explanation --

Column 41, Line 24: Delete "Ns)." and insert -- Nf). --

Column 41, Line 26: Delete "NsO)" and insert -- Ns0) --

Column 41, Line 42 (Approx.): Delete "the" and insert -- The --

Column 47, Line 19: Delete ""1,"" and insert -- "1" --

Column 49, Line 18: Delete ""1,"" and insert -- "1" --

Column 50, Line 3-4: Delete "Seventh Embodiment of the Present Invention" and insert the same on Col. 50, Line 5 as a new line.

Column 50, Line 39: Delete "6001" and insert -- 7001 --

Column 50, Line 62: Delete "(70021-7002-n)" and insert -- (7002-1-7002-n) --

Column 51, Line 5: Delete "6001" and insert -- 7001 --

Column 51, Line 6: Delete "(70021-7002-n)" and insert -- (7002-1-7002-n) --

Column 51, Line 9: Delete "6001" and insert -- 7001 --

Column 51, Line 18: Delete "(70021-7002-n)" and insert -- (7002-1-7002-n) --

Column 51, Line 20: Delete "6001" and insert -- 7001 --

CERTIFICATE OF CORRECTION (continued)
U.S. Pat. No. 8,503,294 B2

Column 51, Line 23: Delete "6001" and insert -- 7001 --

Column 51, Line 26: Delete "6001" and insert -- 7001 --

Column 51, Line 28: Delete "6001" and insert -- 7001 --

Column 51, Line 29: Delete "(70021-7002-n)" and insert -- (7002-1-7002-n) --

Column 51, Line 37: Delete "6001" and insert -- 7001 --

Column 51, Line 41: Delete "6001" and insert -- 7001 --

Column 51, Line 44: Delete "6001" and insert -- 7001 --

Column 51, Line 49: Delete "6001" and insert -- 7001 --

Column 51, Line 52: Delete "6001" and insert -- 7001 --

Column 51, Line 55: Delete "6001" and insert -- 7001 --

Column 51, Line 58: Delete "6001" and insert -- 7001 --

Column 51, Line 61: Delete "6001" and insert -- 7001 --

Column 51, Line 62: Delete "(70021-7002-n)" and insert -- (7002-1-7002-n) --

Column 52, Line 6: Delete "(70021-7002-n)" and insert -- (7002-1-7002-n) --

Column 52, Line 7: Delete "(70021-7002-n)" and insert -- (7002-1-7002-n) --

Column 52, Line 14: Delete "6001" and insert -- 7001 --

Column 53, Line 7: Delete "E003of" and insert -- E003 of --

Column 53, Line 45: Delete "7003of" and insert -- 7003 of --

Column 54, Line 29: Delete "70021-7002-n," and insert -- 7002-1-7002-n, --

Column 55, Line 4: Delete "6001" and insert -- 7001 --

Column 55, Line 5: Delete "70021-7002-n" and insert -- 7002-1-7002-n --

Column 55, Line 10: Delete "80021-8002-n," and insert -- 8002-1-8002-n, --

Column 58, Line 46 (Approx.): Delete "(i=1, ... m)" and insert -- (i=1, ... , m) --

CERTIFICATE OF CORRECTION (continued)
U.S. Pat. No. 8,503,294 B2

Column 59, Line 22: Delete "Ci" and insert -- C_i --

Column 59, Line 22: Delete "Li" and insert -- L_i --

Column 60, Line 1: Delete "R_-target" and insert -- R_target --

Column 61, Line 12: Delete "NsO)" and insert -- Ns0 --

Column 61, Line 14: Delete "Nf." and insert -- Nf). --

Column 64, Line 10: Delete "a" and insert -- $\alpha$ --

Column 65, Line 10: Delete "NsO)" and insert -- Ns0) --